(12) United States Patent
Smith et al.

(10) Patent No.: US 11,896,180 B2
(45) Date of Patent: Feb. 13, 2024

(54) FLOOR CLEANING SYSTEM

(71) Applicant: Unger Marketing International, LLC, Bridgeport, CT (US)

(72) Inventors: Robert F. Smith, Waterbury, CT (US); Joseph K. Patterson, Monroe, CT (US); William Harrington, Newtown, CT (US); Paul H. Adams, Monroe, CT (US)

(73) Assignee: Unger Marketing International, LLC, Bridgeport, CT (US)

(*) Notice: Subject to any disclaimer, the term of this patent is extended or adjusted under 35 U.S.C. 154(b) by 726 days.

(21) Appl. No.: 16/423,817

(22) Filed: May 28, 2019

(65) Prior Publication Data

US 2019/0365193 A1    Dec. 5, 2019

Related U.S. Application Data

(60) Provisional application No. 62/677,376, filed on May 29, 2018, provisional application No. 62/695,486, (Continued)

(51) Int. Cl.
*A47L 13/58*    (2006.01)
*A47L 13/60*    (2006.01)
(Continued)

(52) U.S. Cl.
CPC .......... *A47L 13/256* (2013.01); *A46B 5/0041* (2013.01); *A46B 5/0045* (2013.01);
(Continued)

(58) Field of Classification Search
CPC ........ A47L 13/20; A47L 13/258; A47L 13/58; A47L 13/60
See application file for complete search history.

(56) References Cited

U.S. PATENT DOCUMENTS 355,522 A * 1/1887 Harris .................... A47L 13/60
395,960 A    1/1889 Drew
(Continued)

FOREIGN PATENT DOCUMENTS

AU    2014215927 B2    9/2014
BE    1009731 A6    7/1997
(Continued)

OTHER PUBLICATIONS

European Search Report for Application No. 19810956.3 dated Feb. 10, 2022.
(Continued)

*Primary Examiner* — Randall E Chin
(74) *Attorney, Agent, or Firm* — McCarter & English, LLP

(57) ABSTRACT

A floor cleaning system having a flat headed mop is provided. The system includes a bucket having a plurality of compartments. At least one compartment is provided for cleaning the flat headed mop to remove dirt and debris accumulated during use. A second compartment is provided for recharging the mop pad with water or a cleaning solution. At least one wringing device is operably coupled to one of the plurality of compartments. The at least one wringing device having an extractor element to remove at least a portion of water or cleaning solution from the mop pad.

14 Claims, 38 Drawing Sheets

Related U.S. Application Data filed on Jul. 9, 2018, provisional application No. 62/767,579, filed on Nov. 15, 2018, provisional application No. 62/795,239, filed on Jan. 22, 2019, provisional application No. 62/833,255, filed on Apr. 12, 2019.

(51) Int. Cl.
*A47L 13/256* (2006.01)
*F16C 11/04* (2006.01)
*A47L 13/20* (2006.01)
*A47L 11/40* (2006.01)
*A47L 13/51* (2006.01)
*B62B 3/10* (2006.01)
*B65F 1/14* (2006.01)
*A46B 5/00* (2006.01)
*A47L 13/258* (2006.01)

(52) U.S. Cl.
CPC .......... *A46B 5/0058* (2013.01); *A46B 5/0083* (2013.01); *A47L 11/4083* (2013.01); *A47L 13/20* (2013.01); *A47L 13/258* (2013.01); *A47L 13/51* (2013.01); *A47L 13/58* (2013.01); *A47L 13/60* (2013.01); *B62B 3/106* (2013.01); *B65F 1/141* (2013.01); *F16C 11/045* (2013.01); *B62B 2207/02* (2013.01)

(56) References Cited

U.S. PATENT DOCUMENTS

| | | | |
|---|---|---|---|
| 493,340 A * | 3/1893 | Prescott | A47L 13/60 |
| 1,517,187 A | 11/1924 | Bonsall | |
| 1,673,473 A * | 6/1928 | Sands | A47L 13/60 |
| | | | 15/262 |
| 2,286,944 A | 6/1942 | Altland | |
| 2,796,617 A | 7/1953 | Bradshaw | |
| 2,671,239 A | 3/1954 | Wisner | |
| 2,740,146 A | 4/1956 | Vaughn | |
| 2,852,794 A | 9/1958 | Blum | |
| 2,966,689 A | 1/1961 | Antonucci, Jr. | |
| 3,280,418 A | 10/1966 | Schonberger | |
| 3,341,876 A | 9/1967 | Campbell | |
| D212,831 S | 11/1968 | Koch | |
| 3,593,359 A | 7/1971 | Strauss | |
| D236,075 S | 7/1975 | Golden | |
| D250,245 S | 11/1978 | Bebb | |
| 4,161,799 A | 7/1979 | Sorrells | |
| 4,704,763 A | 11/1987 | Sacks et al. | |
| D296,254 S | 6/1988 | Jaros et al. | |
| 4,852,210 A | 8/1989 | Krajicek | |
| 4,912,804 A | 4/1990 | Pasbol | |
| 5,094,559 A | 3/1992 | Rivera et al. | |
| 5,115,535 A | 5/1992 | Casademunt Ferre et al. | |
| 5,131,111 A | 7/1992 | Richardson et al. | |
| 5,191,166 A | 3/1993 | Smirlock et al. | |
| D338,299 S | 8/1993 | Delmerico et al. | |
| 5,274,877 A | 1/1994 | Morad et al. | |
| 5,333,353 A | 8/1994 | Taylor | |
| D358,238 S | 5/1995 | Barnett | |
| 5,414,892 A | 5/1995 | Clark, Jr. | |
| 5,419,015 A | 5/1995 | Garcia | |
| 5,438,427 A | 8/1995 | Yoshida | |
| 5,438,727 A | 8/1995 | Specht | |
| 5,440,778 A | 8/1995 | De Guzman | |
| D362,941 S | 10/1995 | Delmerico et al. | |
| 5,548,865 A | 8/1996 | Pagani | |
| D374,321 S | 10/1996 | Mandell | |
| 5,774,929 A | 7/1998 | Jurgens et al. | |
| 5,836,039 A | 11/1998 | Rimer | |
| D402,776 S | 12/1998 | Carlson | |
| D404,862 S | 1/1999 | Johnson | |
| 5,864,914 A | 2/1999 | Salmon | |
| 5,915,437 A | 6/1999 | Petner | |
| 5,918,343 A | 7/1999 | Young | |
| 5,945,193 A | 8/1999 | Pollard et al. | |
| D417,051 S | 11/1999 | Dickinson et al. | |
| 5,983,441 A | 11/1999 | Willaims et al. | |
| 6,062,389 A | 5/2000 | Kent | |
| D426,361 S | 6/2000 | Young | |
| 6,115,877 A | 9/2000 | Morad et al. | |
| 6,115,878 A | 9/2000 | McLaughlin et al. | |
| 6,128,803 A | 10/2000 | Dickinson et al. | |
| 6,158,089 A | 12/2000 | Monahan et al. | |
| 6,260,226 B1 | 7/2001 | Specht | |
| 6,279,195 B1 | 8/2001 | Biggs | |
| 6,283,170 B1 | 9/2001 | Robinson | |
| 6,374,867 B1 | 4/2002 | Maiuro | |
| 6,457,203 B1 | 10/2002 | Williams | |
| 6,460,230 B2 | 10/2002 | Shimamura et al. | |
| 6,487,745 B2 | 12/2002 | Specht | |
| 6,543,081 B1 | 4/2003 | Cohen | |
| D477,447 S | 7/2003 | Calaicone | |
| 6,588,045 B2 | 7/2003 | Fernandez | |
| 6,640,348 B1 | 11/2003 | Clune et al. | |
| 6,671,923 B2 | 1/2004 | Gromnicki | |
| D489,852 S | 5/2004 | Perelli | |
| 6,737,147 B2 | 5/2004 | Kennedy et al. | |
| D490,952 S | 6/2004 | Ajluni | |
| D494,721 S | 8/2004 | Kotani | |
| 6,810,554 B2 | 11/2004 | McKay | |
| D503,836 S | 4/2005 | Hall et al. | |
| D506,050 S | 6/2005 | Lalanne et al. | |
| 6,996,873 B2 | 2/2006 | Salmon | |
| D525,404 S | 7/2006 | Petner et al. | |
| D527,506 S | 8/2006 | Camp, Jr. et al. | |
| D528,729 S | 9/2006 | Van Landingham, Jr. | |
| D530,870 S | 10/2006 | Lauer | |
| D531,368 S | 10/2006 | Lauer | |
| D531,772 S | 11/2006 | Lauer | |
| D533,705 S | 12/2006 | Bertucci et al. | |
| D533,977 S | 12/2006 | Bensussan et al. | |
| D536,851 S | 2/2007 | Lauer | |
| 7,174,600 B2 | 2/2007 | Kresse et al. | |
| D542,494 S | 5/2007 | Lauer et al. | |
| D542,992 S | 5/2007 | Lauer | |
| D546,012 S | 7/2007 | Casteel et al. | |
| D548,913 S | 8/2007 | Van Landingham, Jr. | |
| 7,254,863 B1 * | 8/2007 | Morad | A47L 13/60 |
| | | | 15/260 |
| D550,418 S | 9/2007 | Weaver et al. | |
| D554,815 S | 11/2007 | Harper et al. | |
| 7,293,317 B2 | 11/2007 | Tsuchiya et al. | |
| D563,068 S | 2/2008 | Jiang et al. | |
| 7,516,508 B2 | 4/2009 | Stackpole, Jr. et al. | |
| 7,536,743 B2 | 5/2009 | Goh et al. | |
| D597,718 S | 8/2009 | McNeil et al. | |
| 7,607,191 B2 | 10/2009 | Morris et al. | |
| D615,260 S | 5/2010 | Koenig | |
| D617,066 S | 6/2010 | Koenig et al. | |
| 7,827,649 B2 | 11/2010 | Horian | |
| 7,946,445 B2 | 5/2011 | Tytar | |
| D643,982 S | 8/2011 | Franklin | |
| D644,386 S | 8/2011 | Tawara | |
| 8,056,178 B2 | 11/2011 | Bar-Noy et al. | |
| 8,099,824 B2 | 1/2012 | Dingert et al. | |
| D653,826 S | 2/2012 | Lee | |
| D657,928 S | 4/2012 | Byrne | |
| D658,836 S | 5/2012 | Ediger et al. | |
| D677,031 S | 2/2013 | Best et al. | |
| 8,381,931 B1 | 2/2013 | Ernest, III | |
| 8,393,047 B2 | 3/2013 | Van Landingham, Jr et al. | |
| 8,419,024 B1 | 4/2013 | Arroyo-Ferrer | |
| D684,329 S | 6/2013 | Church | |
| 8,474,089 B2 | 7/2013 | Goentzel | |
| 8,479,352 B2 | 7/2013 | Rivadulla Oliva | |
| 8,544,141 B1 | 10/2013 | Kyde et al. | |
| 8,567,616 B2 | 10/2013 | Mishan et al. | |
| 8,584,300 B2 | 11/2013 | Weis | |
| D694,975 S | 12/2013 | Lambertson, Jr. et al. | |
| D694,977 S | 12/2013 | Libman | |
| D694,979 S | 12/2013 | Ambertson, Jr. et al. | |
| 8,652,263 B2 | 2/2014 | Goentzel | |

(56) References Cited

U.S. PATENT DOCUMENTS

| | | |
|---|---|---|
| 8,701,238 B1 | 4/2014 | Morad et al. |
| 8,771,428 B1 | 7/2014 | Goentzel |
| D720,906 S | 1/2015 | Baldwin |
| D723,233 S | 2/2015 | Gidwell et al. |
| 8,990,998 B1 | 3/2015 | McBride, Jr. et al. |
| D728,883 S | 5/2015 | Kempton |
| D728,884 S | 5/2015 | Waffensmith et al. |
| 9,161,673 B2 | 10/2015 | Tronconi et al. |
| D742,609 S | 11/2015 | Irwin |
| 9,216,751 B2 | 12/2015 | Adams et al. |
| D759,926 S | 6/2016 | Leonard et al. |
| 9,433,335 B2 | 6/2016 | Nolan et al. |
| D766,528 S | 9/2016 | Choi et al. |
| 9,504,366 B2 | 11/2016 | Kasper et al. |
| D792,043 S | 7/2017 | Buckley |
| D793,639 S | 8/2017 | Schuller et al. |
| D801,610 S | 10/2017 | Nadin |
| 9,932,056 B2 | 4/2018 | Eisenhut et al. |
| 9,943,207 B1 | 4/2018 | Patterson |
| D824,627 S | 7/2018 | Brugora |
| 10,743,737 B1 | 8/2020 | Parrott |
| 10,858,139 B2 | 12/2020 | Eason |
| D922,712 S | 6/2021 | Harrington et al. |
| D923,896 S | 6/2021 | Harrington et al. |
| D955,075 S | 6/2022 | Harrington et al. |
| D962,575 S | 8/2022 | Harrington et al. |
| 11,576,550 B2 | 2/2023 | Huda et al. |
| 2002/0120997 A1 | 9/2002 | Alt |
| 2003/0019954 A1 | 1/2003 | Clarke |
| 2003/0121530 A1 | 7/2003 | Borgonjon et al. |
| 2004/0074520 A1 | 4/2004 | Truong et al. |
| 2004/0128786 A1 | 7/2004 | Policicchio et al. |
| 2004/0139585 A1 | 7/2004 | McVicker |
| 2004/0231700 A1 | 11/2004 | Bell et al. |
| 2005/0086760 A1 | 4/2005 | Young |
| 2005/0086980 A1 | 4/2005 | Young |
| 2005/0100403 A1 | 5/2005 | Kruepke |
| 2005/0229352 A1 | 10/2005 | Lecompte et al. |
| 2006/0018706 A1 | 1/2006 | Bensussan et al. |
| 2006/0048327 A1 | 3/2006 | Lacotta et al. |
| 2006/0048330 A1 | 3/2006 | Rust et al. |
| 2006/0070196 A1 | 4/2006 | Lacotta et al. |
| 2006/0151054 A1 | 7/2006 | Deaton |
| 2006/0213021 A1 | 9/2006 | Ducharme |
| 2006/0272115 A1 | 12/2006 | Kacher et al. |
| 2007/0026181 A1 | 2/2007 | Roberts |
| 2007/0061985 A1 | 3/2007 | Fischer |
| 2007/0074365 A1 | 4/2007 | Erdman et al. |
| 2007/0107155 A1 | 5/2007 | Kacher et al. |
| 2007/0134465 A1 | 6/2007 | Vanbenschoten et al. |
| 2007/0266518 A1 | 11/2007 | Hoyle et al. |
| 2007/0289084 A1 | 12/2007 | Damrath et al. |
| 2008/0006640 A1 | 1/2008 | Natale |
| 2008/0141477 A1 | 6/2008 | Damrath et al. |
| 2008/0155775 A1 | 7/2008 | Damrath et al. |
| 2009/0007351 A1 | 1/2009 | Horian |
| 2009/0035507 A1 | 2/2009 | Kurtz, Jr. |
| 2009/0035509 A1 | 2/2009 | Kurtz, Jr. |
| 2010/0050363 A1 | 3/2010 | Young |
| 2011/0010900 A1 | 1/2011 | Gilardi |
| 2011/0099745 A1 | 5/2011 | Van Landingham, Jr. et al. |
| 2011/0203613 A1 | 8/2011 | Roberts |
| 2012/0042462 A1 | 2/2012 | Milanese et al. |
| 2012/0096668 A1 | 4/2012 | Treacy |
| 2012/0110774 A1 | 5/2012 | Matola |
| 2012/0145189 A1 | 6/2012 | Knopow et al. |
| 2012/0151703 A1 | 6/2012 | Chow |
| 2013/0312211 A1 | 11/2013 | Matola |
| 2014/0215739 A1 | 8/2014 | Lindner et al. |
| 2014/0263105 A1 | 9/2014 | Kontorovich et al. |
| 2014/0289985 A1 | 10/2014 | Hoying et al. |
| 2015/0201821 A1 | 7/2015 | McBride, Jr. et al. |
| 2015/0305590 A1 | 10/2015 | Rashid |
| 2015/0351603 A1 | 12/2015 | Katsnelson |
| 2016/0068176 A1 | 3/2016 | Adams et al. |
| 2016/0113471 A1 | 4/2016 | Zhu et al. |
| 2016/0128540 A1 | 5/2016 | Hoying et al. |
| 2016/0309980 A1 | 10/2016 | Lecompte et al. |
| 2016/0316988 A1 | 11/2016 | Balz et al. |
| 2017/0027403 A1 | 2/2017 | Zhu |
| 2017/0049292 A1 | 2/2017 | Harrington et al. |
| 2017/0086637 A1 | 3/2017 | Zhu et al. |
| 2017/0231457 A1 | 8/2017 | Cloud |
| 2017/0369342 A1 | 12/2017 | Hom et al. |
| 2018/0035862 A1 | 2/2018 | Polti et al. |
| 2018/0055327 A1 | 3/2018 | Li |
| 2018/0199788 A1 | 7/2018 | Huang |
| 2019/0365191 A1 | 12/2019 | Huda et al. |
| 2021/0177229 A1 | 6/2021 | Smith et al. |

FOREIGN PATENT DOCUMENTS

| | | |
|---|---|---|
| CA | 1306592 C | 8/1992 |
| CA | 2993591 A1 | 12/2017 |
| CN | 2081281 U | 7/1991 |
| CN | 200987655 Y | 12/2007 |
| CN | 201227258 Y | 4/2009 |
| CN | 201227259 Y | 4/2009 |
| CN | 201384477 Y | 1/2010 |
| CN | 101843468 A | 9/2010 |
| CN | 201675888 U | 12/2010 |
| CN | 202211661 U | 5/2012 |
| CN | 202313166 U | 7/2012 |
| CN | 102711578 A | 10/2012 |
| CN | 102846284 A | 1/2013 |
| CN | 202821248 U | 3/2013 |
| CN | 203029178 U | 7/2013 |
| CN | 103445735 A | 12/2013 |
| CN | 204146974 U | 2/2015 |
| CN | 104853664 A | 8/2015 |
| CN | 303421390 | 10/2015 |
| CN | 204744046 U | 11/2015 |
| CN | 204889883 U | 12/2015 |
| CN | 105286740 A | 2/2016 |
| CN | 105286740 B | 2/2016 |
| CN | 107456180 A | 2/2016 |
| CN | 105640460 A | 6/2016 |
| CN | 105769071 A | 7/2016 |
| CN | 205391076 U | 7/2016 |
| CN | 205493747 U | 8/2016 |
| CN | 105996932 A | 10/2016 |
| CN | 205625834 U | 10/2016 |
| CN | 205697619 U | 11/2016 |
| CN | 205729277 U | 11/2016 |
| CN | 205831737 U | 12/2016 |
| CN | 205866707 U | 1/2017 |
| CN | 206080445 U | 4/2017 |
| CN | 206080446 U | 4/2017 |
| CN | 106725163 A | 5/2017 |
| CN | 106725164 A | 5/2017 |
| CN | 206151396 U | 5/2017 |
| CN | 206183214 U | 5/2017 |
| CN | 206381142 U | 8/2017 |
| CN | 107115077 A | 9/2017 |
| CN | 206548456 U | 10/2017 |
| CN | 107456178 A | 12/2017 |
| CN | 107456179 A | 12/2017 |
| CN | 107456181 A | 12/2017 |
| CN | 107456184 A | 12/2017 |
| CN | 107456185 A | 12/2017 |
| CN | 107495914 A | 12/2017 |
| CN | 107518843 A | 12/2017 |
| CN | 206761652 U | 12/2017 |
| CN | 107684406 A | 2/2018 |
| CN | 107684407 A | 2/2018 |
| CN | 107692938 A | 2/2018 |
| CN | 107811591 A | 3/2018 |
| CN | 207152550 U | 3/2018 |
| CN | 207186587 U | 4/2018 |
| CN | 207202839 U | 4/2018 |
| DE | 382754 A | 10/1923 |
| DE | 4318792 A1 | 12/1994 |
| DE | 19635620 A1 | 3/1998 |
| DE | 10065373 A1 | 7/2002 |

(56) References Cited

FOREIGN PATENT DOCUMENTS

| | | | |
|---|---|---|---|
| DE | 10 2016 118 256 B3 * | 1/2018 | |
| EP | 0991355 A1 | 4/2000 | |
| EP | 1219226 A1 | 7/2002 | |
| EP | 1651089 A1 | 5/2006 | |
| EP | 2033565 A2 | 3/2009 | |
| EP | 1219224 B1 | 3/2010 | |
| EP | 2769660 A1 | 8/2014 | |
| EP | 2848178 A2 | 3/2015 | |
| FR | 3058627 A1 | 5/2018 | |
| GB | 232798 A * | 4/1925 | |
| GB | 379946 A | 9/1932 | |
| GB | 396469 A | 8/1933 | |
| GB | 932579 A | 7/1963 | |
| GB | 1168635 A | 10/1969 | |
| GB | 1277932 A | 6/1972 | |
| JP | H10304998 A | 11/1998 | |
| JP | 2014030815 A | 2/2014 | |
| KR | 485755 Y1 | 2/2018 | |
| KR | 2018025263 A | 3/2018 | |
| WO | 199210968 A1 | 7/1992 | |
| WO | 2000001328 A1 | 1/2000 | |
| WO | 200200089 A1 | 1/2002 | |
| WO | 2004080265 A2 | 9/2004 | |
| WO | 2005013794 A1 | 2/2005 | |
| WO | 2006027383 A1 | 3/2006 | |
| WO | 2006074687 A1 | 7/2006 | |
| WO | 2007046211 A1 | 4/2007 | |
| WO | 2015090356 A1 | 6/2015 | |
| WO | 2016116067 A1 | 7/2016 | |
| WO | 2017193609 A1 | 11/2017 | |
| WO | 2017206511 A1 | 12/2017 | |
| WO | 2018024160 A1 | 2/2018 | |
| WO | 2018040920 A1 | 3/2018 | |

OTHER PUBLICATIONS

International Search Report and Written Opinion for International Application No. PCT/US2019/03427 dated Oct. 4, 2019, 19 pgs.
International Search Report and Written Opinion for International Application No. PCT/US2019/034281 dated Aug. 20, 2019, 15 pgs.
International Search Report and Written Opinion for International Application No. PCT/US2019/03428 dated Aug. 22, 2019, 33 pgs.
Partial Supplementary European Search Report for Application No. 19810953.0 dated Mar. 11, 2022; 9 pg.
Extended European Search Report for Application No. 19811600.6 dated Mar. 16, 2022 ; 6 pgs.
Extended European Search Report for Application No. 19810211.3 dated Mar. 14, 2022; 6 pgs.
Dual Bucket Omniclean Kit, https://www.amazon.com/Unger-CLBK1-Dual-Bucket-Omniclean/dp/B08PMDRDJ5/ref=sr_1_4?dchild=1&keywords=omniclean&qid=1609341253&sr=8-4 (Year: 2020).
Omni Clean, https://usa.ungerglobal.com/product-category/unger-omniclean/ (Year: 2020).
U.S. Appl. No. 29/678,327, filed Jan. 28, 2019.
U.S. Appl. No. 29/789,446, filed Sep. 23, 2021.
U.S. Appl. No. 29/678,328, filed Jan. 28, 2019.
U.S. Appl. No. 16/423,804, filed May 28, 2019.
U.S. Appl. No. 17/984,792, filed Nov. 10, 2022.
U.S. Appl. No. 16/423,792, filed May 28, 2019.

* cited by examiner

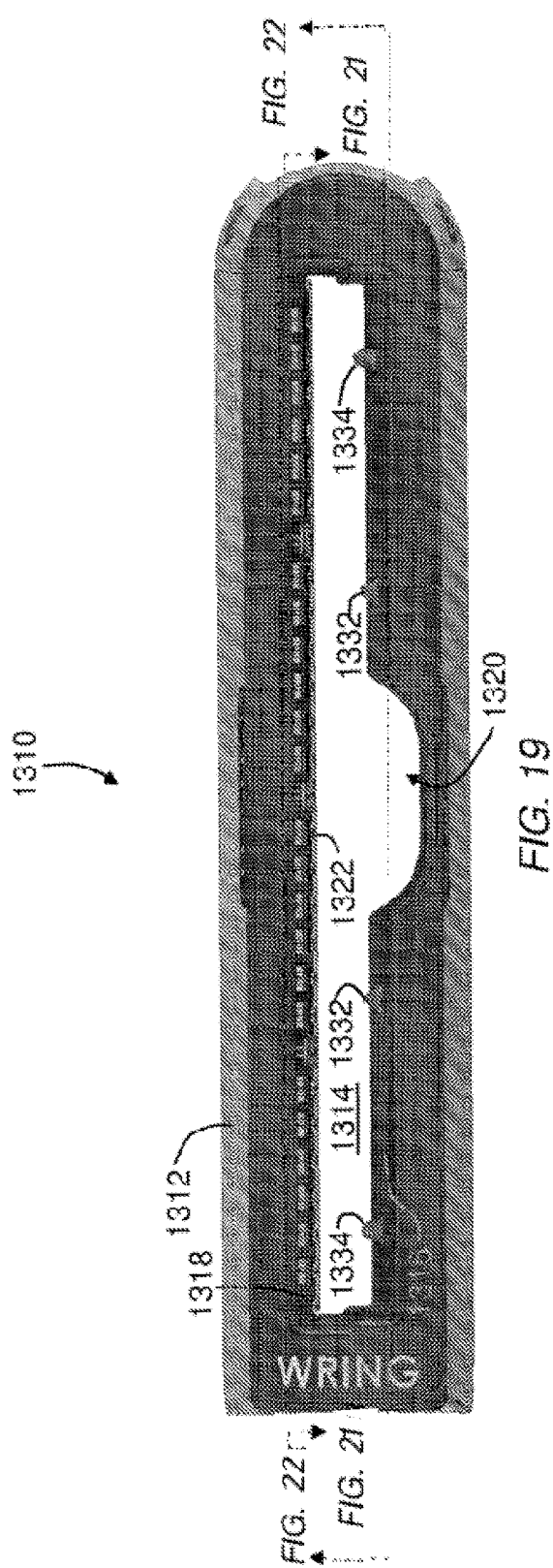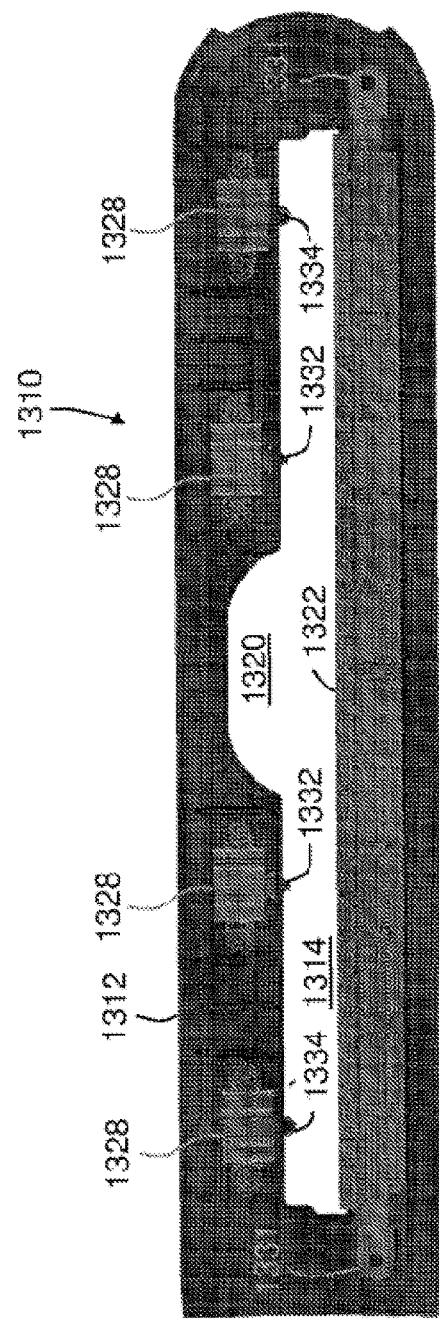

FLOOR CLEANING SYSTEM

CROSS-REFERENCE TO RELATED APPLICATIONS

The present application is a nonprovisional application and claims the benefit of U.S. Provisional Application Ser. No. 62/677,376 filed on May 29, 2018, U.S. Provisional Application Ser. No. 62/695,486 filed on Jul. 9, 2018, U.S. Provisional Application Ser. No. 62/767,579 filed on Nov. 15, 2018, U.S. Provisional Application Ser. No. 62/795,239 filed on Jan. 22, 2019, U.S. Provisional Application Ser. No. 62/833,255 filed on Apr. 12, 2019, the contents of all of which are incorporated by reference herein in their entirety.

BACKGROUND

The subject matter disclosed herein relates to a system for cleaning a floor, and in particular to a system having a multi-compartment bucket with a fluid extraction device for removing dirty or clean fluid from a flat mop.

Mops have been traditionally used to clean floors. Mops come in different styles, such as a string, strip, foam or flat mop for example. A flat mop has a generally planar end member with a flat microfiber pad coupled to one side. Further, one property of the microfiber pad is that it releases dirt when placed in water or a fluid. The microfiber pad is then wrung-out, such as by pressing the mop head against a plate. One issue with many mop and bucket combinations it that the same water is used to both clean and recharge the microfiber pad. However, this means that the water or fluid used for recharging is dirty after the first time the microfiber pad is cleaned. Thus, after only a short while the user is left with a bucket of dirty water/fluid. If the water/fluid in this bucket is continued to be used, dirty water/fluid will be spread on the floor being cleaned.

A second issue that arises with current flat mops is the amount of water/fluid contained in the microfiber pad. Depending on the type of floor being cleaned, the desired amount of water/fluid will change. For example, when cleaning wood floors, it is desired to have only a small amount of water/fluid when compared to cleaning tile floors. The technique of pressing the microfiber pad against a plate is requires significant effort.

Accordingly, while existing floor cleaning systems are suitable for their intended purposes the need for improvement remains, particularly in providing a floor cleaning system having the features described herein.

BRIEF DESCRIPTION

According to one aspect of the disclosure, a bucket for a floor cleaning system having a flat headed mop having a pole with mop head disposed on one end is provided. The mop head having a mop pad, the mop head movable between an operating position and a folded position, a plane of the mop pad being substantially parallel to the pole in the folded position. The bucket including at least one compartment and a wringing assembly. The wringing assembly being in fluid communication with the at least one compartment, the wringing assembly comprising at least one roller movable from a first position when the mop head is being inserted to a second position when the mop head is being withdrawn.

In addition to one or more of the features described herein, or as an alternative, in further embodiments the bucket includes a housing having a slot sized to receive the mop head, the at least one roller being movably coupled to the housing and is at least partially disposed within the slot. In addition to one or more of the features described herein, or as an alternative, in further embodiments the bucket includes the housing having a blade positioned to compress the mop pad as the mop head is inserted into the slot to extract fluid from the mop pad. In addition to one or more of the features described herein, or as an alternative, in further embodiments the bucket includes the blade being integral to the housing. In addition to one or more of the features described herein, or as an alternative, in further embodiments the bucket includes the blade being positioned on an opposite side of the slot from the at least one roller.

In addition to one or more of the features described herein, or as an alternative, in further embodiments the slot further includes a first lead-in portion adjacent the at least one roller and a second lead-in portion adjacent the blade, the second lead-in portion being configured to at least partially compress the mop pad as the mop head is moved through the slot. In addition to one or more of the features described herein, or as an alternative, in further embodiments the housing further includes a plurality of openings adjacent a surface of the blade to define a fluid flow path. In addition to one or more of the features described herein, or as an alternative, in further embodiments the bucket includes the plurality of openings being at least partially formed in the second lead-in portion.

In addition to one or more of the features described herein, or as an alternative, in further embodiments the bucket includes the wringing assembly further having a roller holder, the at least one roller being movably coupled to the roller holder. In addition to one or more of the features described herein, or as an alternative, in further embodiments the bucket includes the wringing assembly further having a housing, the roller holder is integral with the housing. In addition to one or more of the features described herein, or as an alternative, in further embodiments the bucket the roller holder having a pair of slots and the at least one roller includes a pair of axles disposed with the pair of slots, each slot having a first portion and a second portion, the first portion arranged to position the at least one roller in the first position, the second portion arranged to position the at least one roller in the second position.

In addition to one or more of the features described herein, or as an alternative, in further embodiments the bucket includes the at least one roller extending a first distant into the slot when in the first position and a second distance into the slot when in the second position, the first distance being larger than the second distance. In addition to one or more of the features described herein, or as an alternative, in further embodiments the bucket includes the at least one roller extending a first distant relative to the blade when in the first position and a second distance relative to the blade when in the second position, the first distance being smaller than the second distance.

In addition to one or more of the features described herein, or as an alternative, in further embodiments the bucket includes the at least one roller cooperating with the mop head to compress the mop pad a first amount when in the first position to extract fluid from the mop pad. In addition to one or more of the features described herein, or as an alternative, in further embodiments the bucket includes the at least one roller cooperating with the mop head to compress the mop pad a second amount when in the second position. In addition to one or more of the features described herein, or as an alternative, in further embodiments the bucket includes the first amount being larger than the second amount.

In addition to one or more of the features described herein, or as an alternative, in further embodiments the bucket includes the blade and the at least one roller defining a gap therebetween, the amount of fluid extracted by the mop pad being based at least in part on the gap. In addition to one or more of the features described herein, or as an alternative, in further embodiments the bucket includes the gap being configured to provide an insertion force of the mop head and mop pad into the wringing assembly of less than 40 pounds.

According to one aspect of the disclosure, a bucket for a floor cleaning system having a flat headed mop having a pole with mop head disposed on one end is provided. The mop head having a mop pad, the bucket having a wringing assembly. The wringing assembly having a blade disposed to engage the mop pad when the mop head is within the wringing assembly. The blade includes an edge, a plurality of first openings and a plurality of second openings. The plurality of first openings disposed on one side of the edge, each of the plurality of first openings being arranged adjacent a first angled portion, the first angled portion being configured to compress the mop pad as the mop head is inserted to the wringing assembly. The plurality of second openings on an opposite side of the edge from the plurality of first openings, each of the plurality of second openings being arranged adjacent a second angled portion, the second angled portion being configured to compress the mop pad as the mop head is withdrawn from the wringing assembly.

In addition to one or more of the features described herein, or as an alternative, in further embodiments the bucket includes the wringing assembly having a slot sized to receive the flat headed mop, the edge being disposed in the slot; and the first angled portion includes a first angled surface having a first end that is a greater distance from a centerline of the slot than a second end, the second end being adjacent the edge. In addition to one or more of the features described herein, or as an alternative, in further embodiments the bucket includes the second angled portion having a second angled surface having a third end that is a greater distance from the centerline of the slot than a fourth end, the fourth end being adjacent the edge.

According to one aspect of the disclosure, a bucket for a floor cleaning system having a flat headed mop is provided. The bucket having at least a first compartment, a second compartment, and a wringing assembly. The wringing assembly arranged adjacent to at least the first compartment or the second compartment, the winging assembly being fluidly coupled to the first compartment, the winging assembly having an extractor that moves between a first position and a second position, the extractor having a first level of engagement with the flat headed mop in the first position and a second level of engagement with the flat headed mop in the second position, the second level of engagement being less than the first level of engagement.

In addition to one or more of the features described herein, or as an alternative, in further embodiments the bucket includes the extractor being in the first position when the flat headed mop is inserted into the wringing assembly and moves to the second position as the flat headed mop is removed from the wringing assembly. In addition to one or more of the features described herein, or as an alternative, in further embodiments the bucket includes the extractor further comprising a plurality of openings that define slots, the slots being in fluid communication with the first compartment.

According to one aspect of the disclosure, a bucket for a floor cleaning system having a flat headed mop is provided. The bucket having a body, a cleaning plate and a wringing assembly. The body having a first compartment and a second compartment. The cleaning plate disposed within the first compartment, the cleaning plate having cleaning elements on a first side. The wringing assembly disposed between the first compartment and the second compartment, the wringing assembly including a slot sized to receive the flat headed mop, the wringing assembly further including an extractor disposed within the slot, the extractor having a portion disposed to engage a mop pad of the flat headed mop, wherein the portion and the cleaning plate are oriented such that the mop pad may be serially engaged with the cleaning plate and the extractor without rotating the flat headed mop.

In addition to one or more of the features described herein, or as an alternative, in further embodiments the bucket includes the extractor translating from a first position to a second position when the flat headed mop is withdrawn from the wringing assembly. In addition to one or more of the features described herein, or as an alternative, in further embodiments the bucket includes the slot having a first lead-in surface adjacent the portion, the first lead-in surface being angled to compress the mop pad as the flat headed mop is inserted into the wringing assembly. In addition to one or more of the features described herein, or as an alternative, in further embodiments the bucket includes the first lead-in surface having a plurality of openings, the plurality of openings being fluidly coupled to one of the first compartment or the second compartment.

In addition to one or more of the features described herein, or as an alternative, in further embodiments the bucket includes the extractor further having a second lead-in surface arranged on an opposite side of the portion from the first lead-in surface. In addition to one or more of the features described herein, or as an alternative, in further embodiments the bucket includes the first lead-in surface and second lead-in surface being disposed on an angle of 14 degrees relative to a vertical plane. In addition to one or more of the features described herein, or as an alternative, in further embodiments the bucket includes the body having at least one opening, the at least one opening defining a fluid path from the wringing assembly to the first compartment, wherein the flat headed mop is outside of the fluid path when fully inserted.

In addition to one or more of the features described herein, or as an alternative, in further embodiments the bucket includes the portion compressing the mop pad to extract about 30%-50% of a fluid in a saturated mop pad when the flat headed mop is inserted into the wringing assembly a first time. In addition to one or more of the features described herein, or as an alternative, in further embodiments the bucket includes the portion compressing the mop pad to extract about 5%-30% of the fluid in the saturated mop pad when the flat headed mop is inserted into the wringing assembly a second time. In addition to one or more of the features described herein, or as an alternative, in further embodiments the bucket includes the portion compressing the mop pad to extract about 5%-20% of the fluid in the saturated mop pad when the flat headed mop is inserted into the wringing assembly a third time. In addition to one or more of the features described herein, or as an alternative, in further embodiments the bucket includes the portion compressing the mop pad to extract about 1%-15% of the fluid in the saturated mop pad when the flat headed mop is inserted into the wringing assembly a fourth time.

According to one aspect of the disclosure, a bucket for a floor cleaning system having a flat headed mop having a pole with mop head disposed on one end is provided. The mop head having a mop pad, the mop head movable between an operating position and a folded position, a plane of the mop pad being substantially parallel to the pole in the folded position. The bucket including a first compartment, a second compartment adjacent the first compartment, and a wringing assembly fluidly coupled to the first compartment. The wringing assembly comprising: a housing having a slot sized to receive the flat headed mop when the mop head is in the folded position, the slot having a first lead-in surface angled with respect to a vertical plane, a size of the slot being larger than a width of the mop head at a first end of the first lead-in surface and smaller than the width of the mop head at an opposing second end of the first lead-in surface, wherein the mop pad is compressed when positioned adjacent the opposing second end of the first lead-in surface; an extractor operably coupled to the housing, the extractor having a portion adjacent the opposing second end of the first lead-in surface and positioned to compress the mop pad when the mop head is inserted into the slot; and a second lead-in surface disposed opposite the first lead-in surface from the portion, the second lead-in surface being angled to guide the mop pad as the mop pad is withdrawn from the wringing assembly.

In addition to one or more of the features described herein, or as an alternative, in further embodiments the bucket includes the extractor is movable from a first position to a second position; the first lead-in surface includes at least one first slot; and the extractor includes at least one tab at least partially disposed in the at least one first slot, the at least one tab having a pair of projection engaging and moving within the slot as the extractor moves from the first position to the second position. In addition to one or more of the features described herein, or as an alternative, in further embodiments the bucket includes the extractor being a blade. In addition to one or more of the features described herein, or as an alternative, in further embodiments the bucket includes the extractor being a roller.

In addition to one or more of the features described herein, or as an alternative, in further embodiments the bucket includes the wringing assembly further having at least one surface arranged to engage an edge of the mop head when the mop head is fully inserted in the wringing assembly. In addition to one or more of the features described herein, or as an alternative, in further embodiments the bucket includes a distance from the extractor to the at least one surface being less than the width of the mop head.

Technical effects of embodiments of the present disclosure include a floor cleaning system that allows a floor to be cleaned or mopped while reducing or eliminating the spreading of contaminated or dirty fluids.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIGS. 16-23 are various views of a two-compartment bucket with movable rollers and a fixed wringing blade in accordance with an embodiment.

DETAILED DESCRIPTION

Embodiments disclosed herein provide for a floor cleaning system having a flat mop with a microfiber pad and a bucket cleaning assembly. The bucket cleaning assembly includes a plurality of compartments that provides advantages in separating the dirty fluid used to rinse the flat mop from the clean fluid used to recharge the mop pad. Embodiments disclosed herein provide advantages in providing a wringing assembly that removes dirty fluid from the mop pad. Still further embodiments disclosed herein provide advantages in providing a wringing assembly that defines a desired amount of fluid in the mop pad when the mop pad is recharged.

Figure 1:
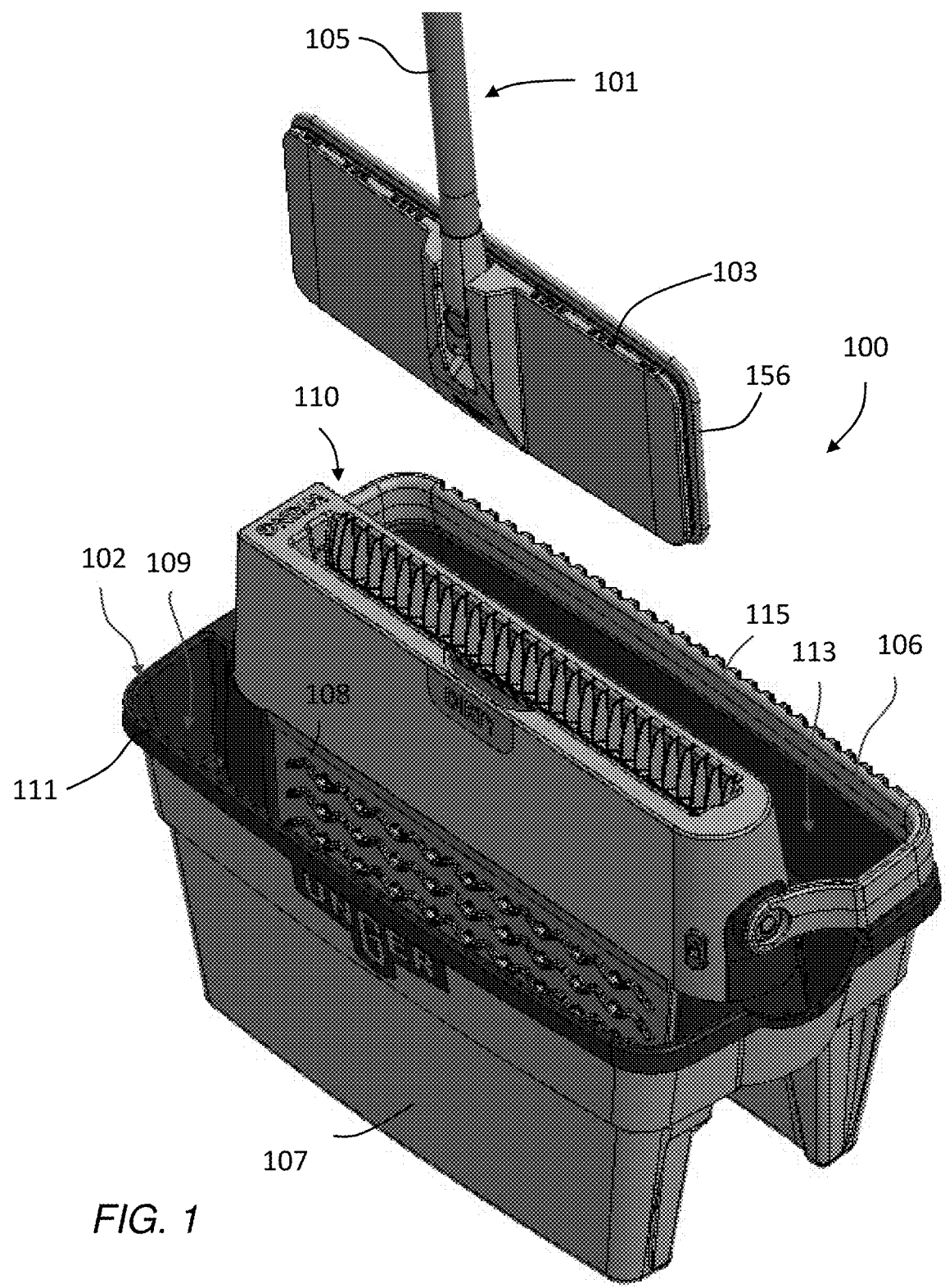
FIGS. 1-15 are various views of a two-compartment bucket with movable rollers and an integrated fixed wringing blade in accordance with an embodiment.

Referring now to FIG. 1, an embodiment of a bucket assembly 100 is shown for a floor cleaning system. The bucket assembly 100 is used with a flat headed mop 101 having a microfiber pad disposed thereon. The mop 101 has a head positioning assembly that allows the mop head 103 of the mop to rotate to a vertical or a horizontal position. When in the normal position, the mop head 103 is generally parallel with the floor with the pole 105 extending upward therefrom. As used herein, the term "vertical position" is where the mop head 103 is rotated to the position shown in FIG. 1 where the long axis of the mop head 103 may be generally or substantially perpendicular, or the short axis of the mop head 103 is generally or substantially parallel, to the centerline of the mop pole 105. It should be appreciated that the axis of the pole and the axis of mop head may not be perpendicular or parallel to the pole and there may at an angle of up to 45 degrees, provided that the pole fits within the wringing assembly as described in more detail herein. It should be appreciated that while embodiments described herein may illustrate the mop head 103 rotated to the vertical position, this for exemplary purposes and the claims should not be so limited. Any of the bucket assemblies described herein may be configured, shaped, or sized to receive the mop head 103 in either the vertical position shown (e.g. the short axis of the mop head being parallel to the pole axis), or with the mop head rotated 90 degrees such that the mop head 103 extends vertically with the length of the mop head 103 being parallel with the pole axis (e.g. the long axis is parallel to the pole axis).

In an embodiment, the mop 101 is the same as that described in commonly owned United States Patent Application Attorney Docket Number UMI0007US8 entitled Flat Headed Mop filed concurrently herewith, the contents of which are incorporated by reference herein.

The bucket assembly 100 includes a bucket 107 a first compartment 102 that is used to clean the mop pad when after the mop has been used. The first compartment 102 may be referred to as the "dirty water" compartment because the fluid within the first compartment 102 will quickly become contaminated with dirt, particulates or debris during use. It should be appreciated that while embodiments herein may refer to a "fluid", the liquid used in connection with bucket assembly 100 may be any suitable liquid for cleaning the desired surface, such as but not limited to water, a chemical cleaning solution, or a combination of the foregoing. The first compartment has a generally hollow interior 109 with an open side 111 sized to receive the planar head when the planar head is in the rotated position. The rotation of planar head may be in response to a force applied by the user, or due to the influence of gravity. In an embodiment, the first compartment may include an agitator or cleaning plate 108. As will be described in more detail herein, the cleaning plate 108 includes a plurality of features that engage the fibers of the microfiber mop pad when the planar head is moved against the cleaning plate 108. This allows the cleaning of the mop pad and the removal of particles such as hair and fur.

It should be appreciated that while the illustrated embodiments show the scrubbing plate as being a separate member, this is for exemplary purposes and the claims should not be so limited. In other embodiments, the agitating pattern is molded into a wall of the bucket 107. Further, while embodiments herein illustrate or describe the bucket 107 as being a unitary component, in other embodiments the bucket 107 may be made from multiple components for example.

The bucket assembly 100 further includes a second compartment 106. The second compartment 106, sometimes referred to as the "clean" compartment, is used for recharging the mop pad with a water/cleaning-solution fluid. The second compartment 106 includes a generally hollow interior 113 having an open side 115 sized to receive the planar head of the mop in the rotated position. The hollow interior 113 is sized and configured to contain a volume of water/cleaning-solution fluid.

Figure 2:
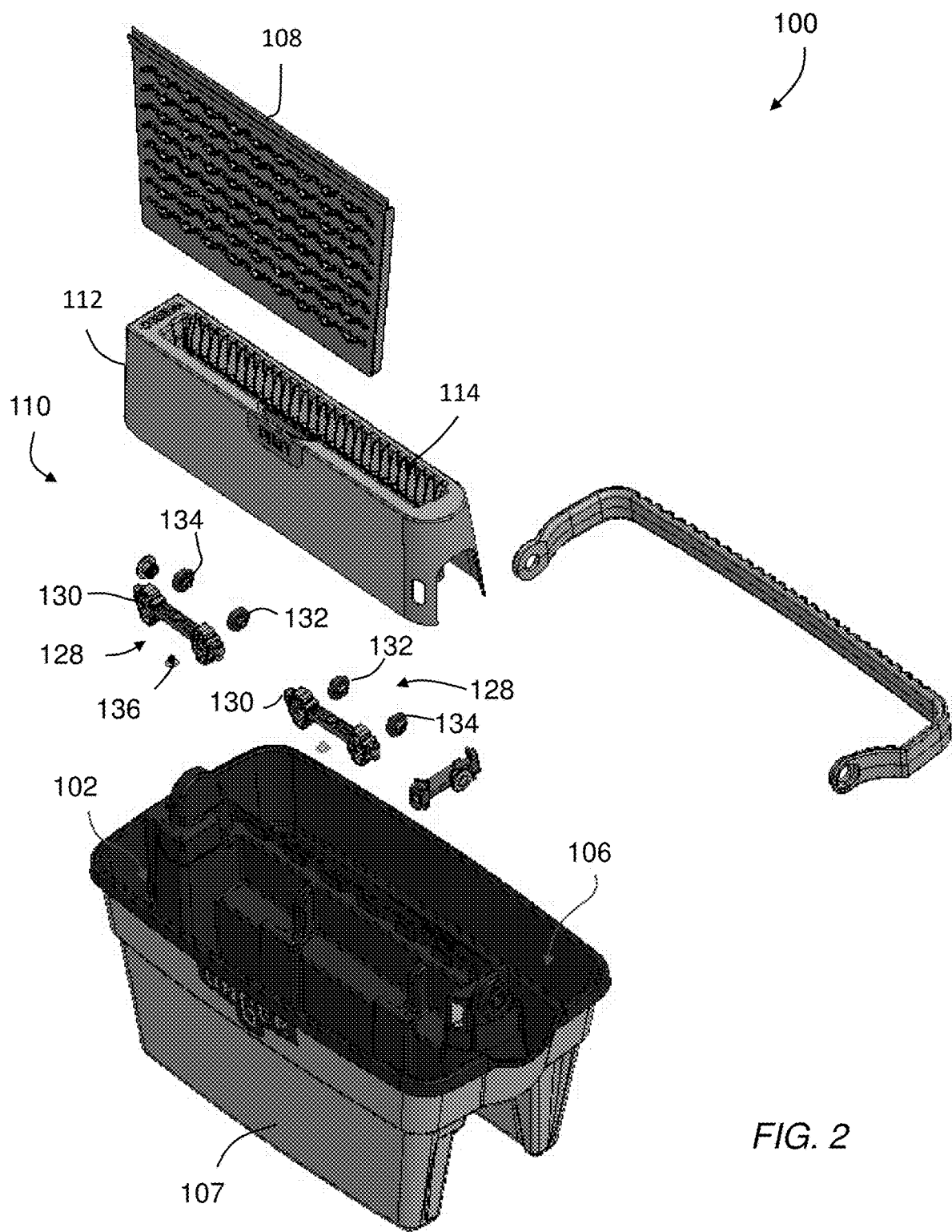
Figure 3:
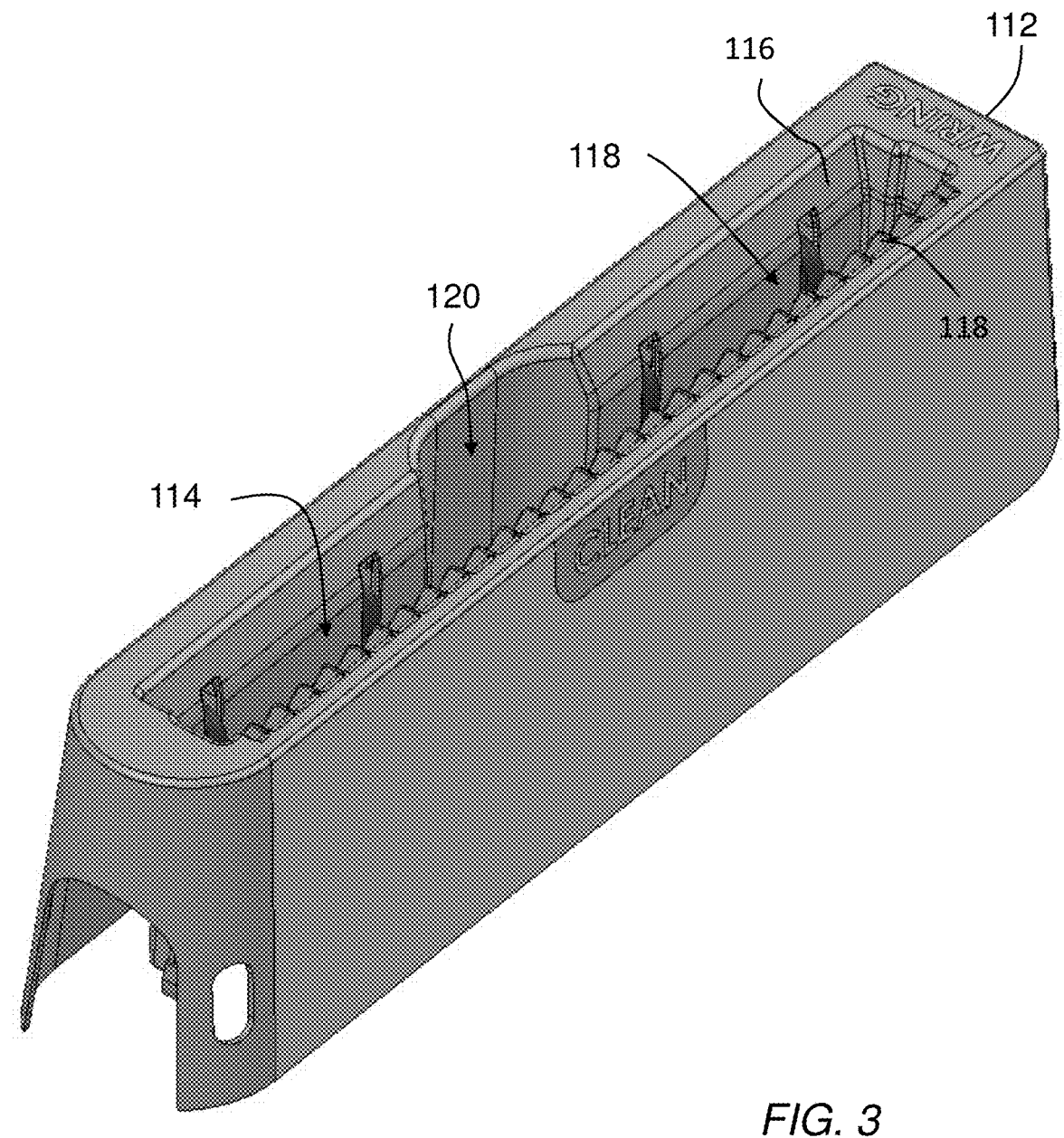
Figure 4:
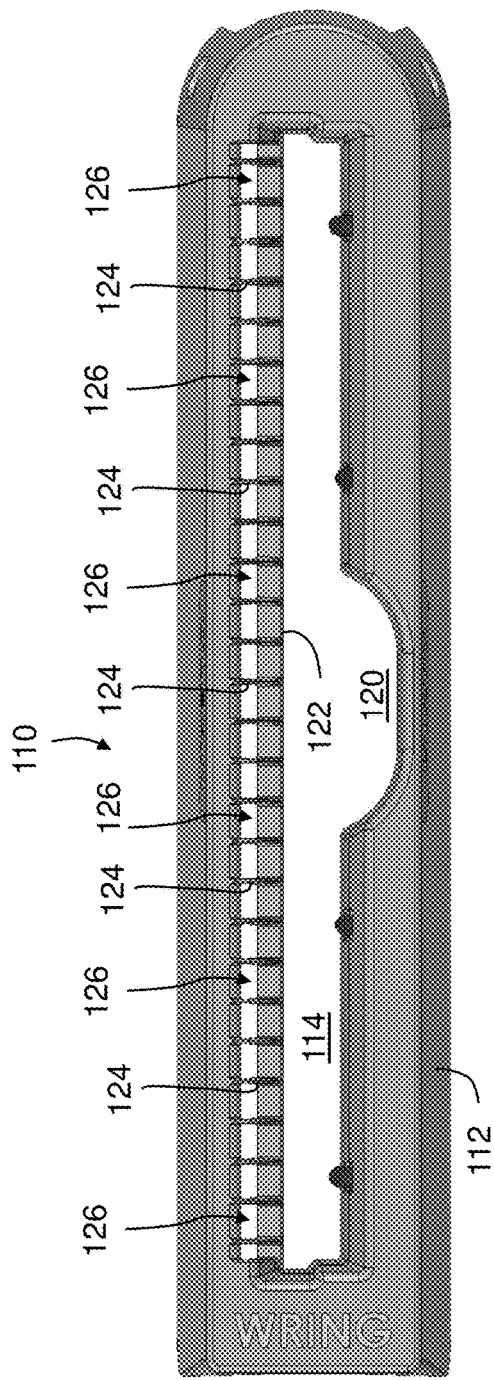
Figure 5:
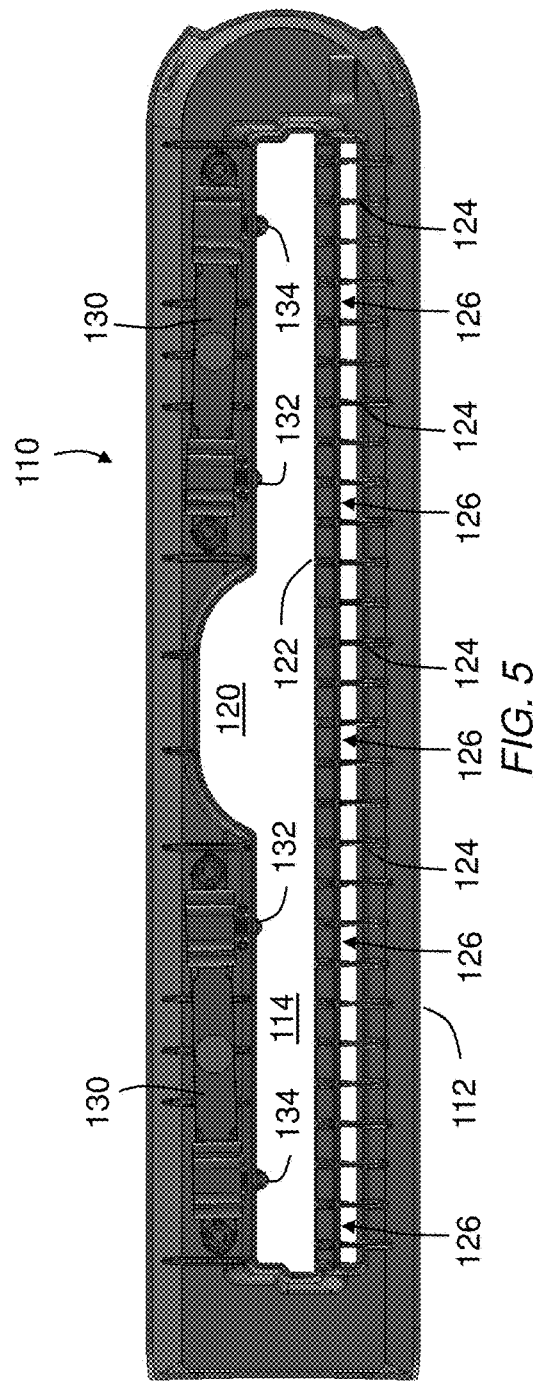
Figure 6:
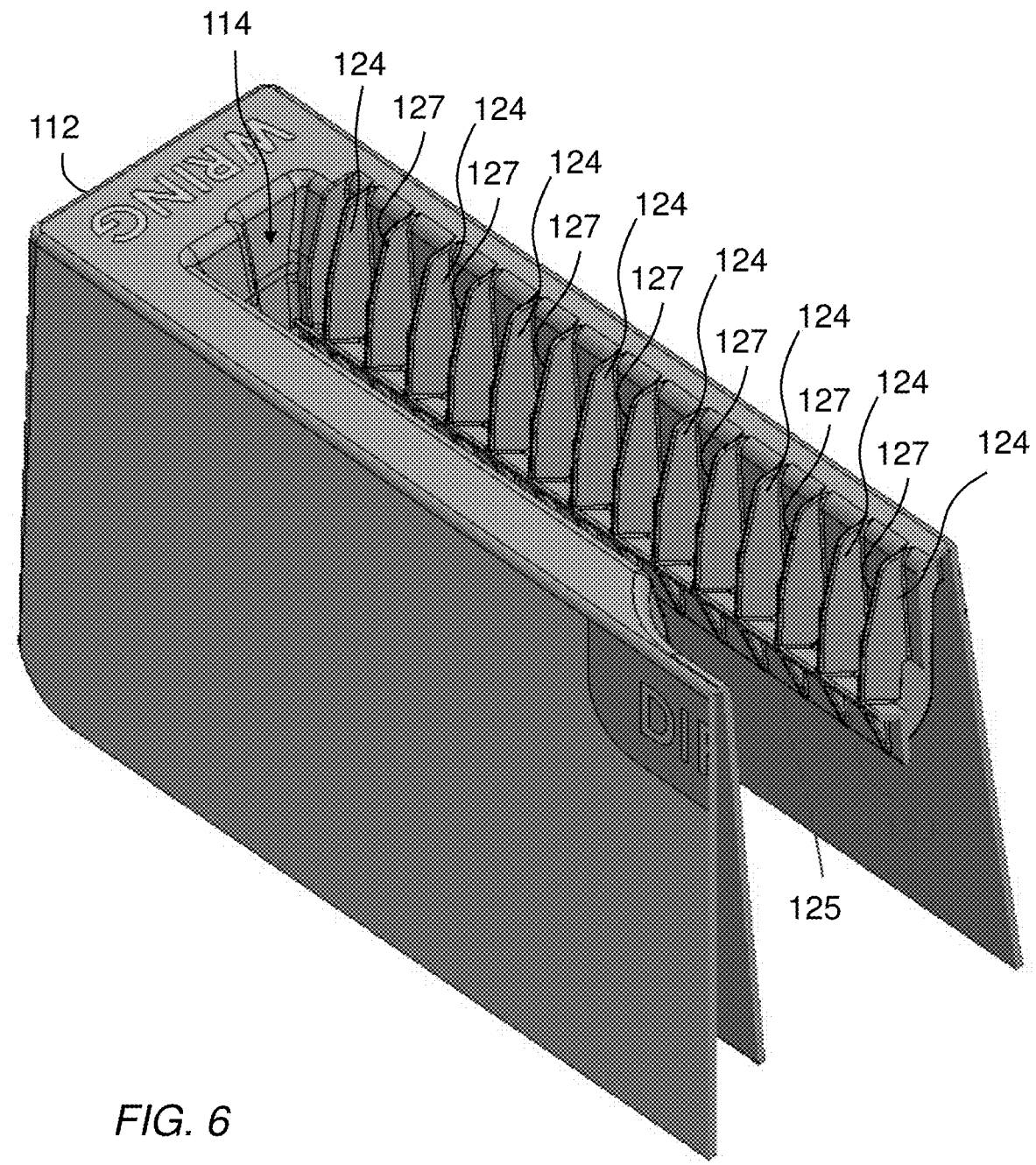

Disposed between the first compartment 102 and the second compartment 106 is a wringing assembly 110. The wringing assembly 110 is in fluid communication with the first compartment 102. The wringing assembly 110 includes a housing 112 (FIG. 2) that includes a slot 114 having a pair of lead-in portions 116, 118 (FIG. 3). In the illustrated embodiment, the second lead-in portion 118 is defined by a surface 127 (FIG. 6) on each of a plurality of ribs 124. In an embodiment, the slot 114 further includes a relief area 120 that provides clearance for the mop handle as the mop head is inserted into the slot 114. As will be discussed in more detail herein, the housing 112 includes a fixed integrated blade or extractor element 122. In an embodiment, the blade 122 is supported by the plurality of ribs 124. Each pair of the plurality of ribs 124 define an opening or slot 126 (FIG. 4). As will be discussed in more detail herein, the slots 126 provide a flow path for the fluid extracted by the blade 122 from the mop pad.

Figure 12:
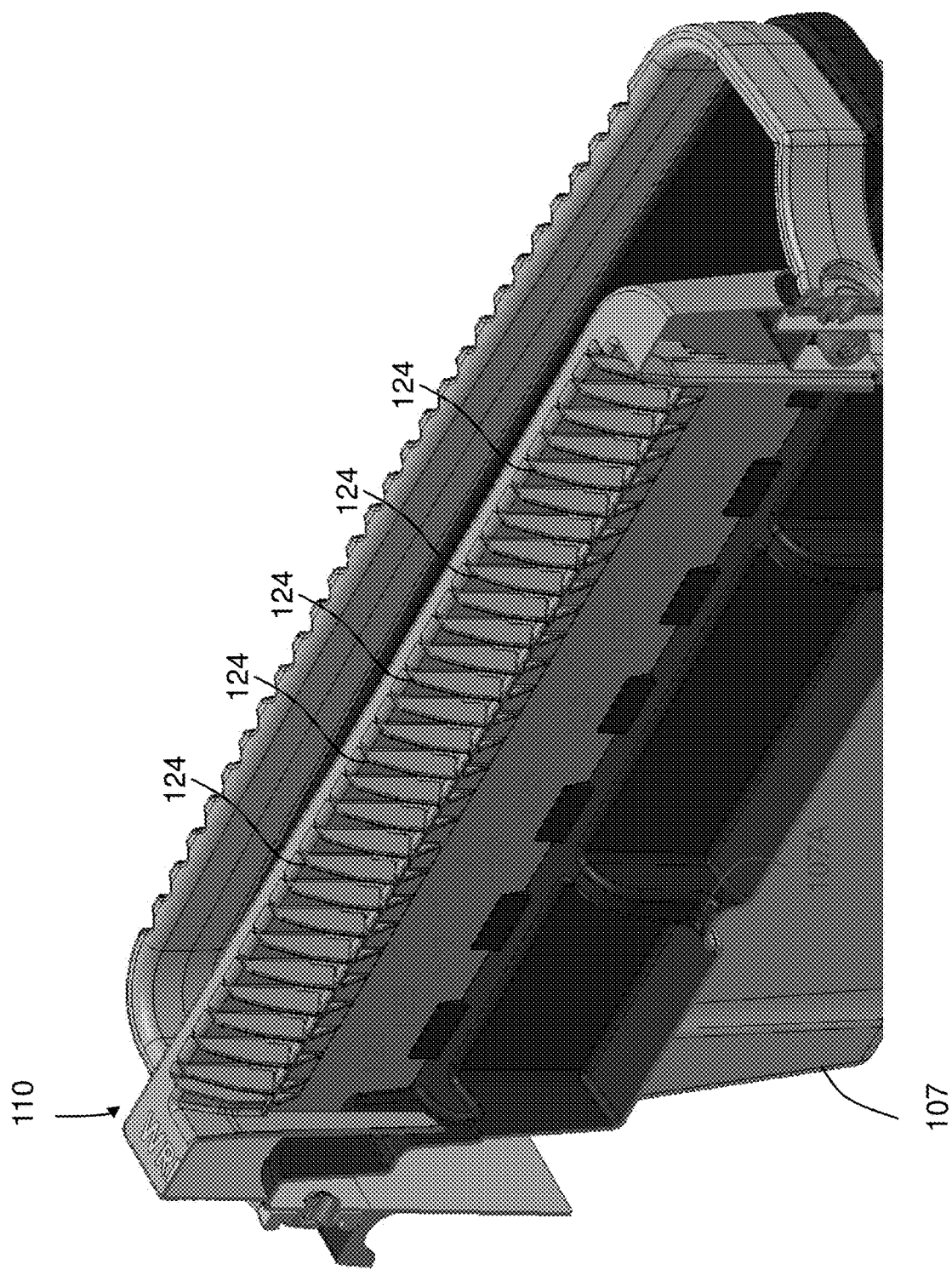

In an embodiment, the blade 122 further includes a plurality of second ribs 125 (FIG. 6, FIG. 12) disposed on an opposite side of the edge 123 from the plurality of ribs 124. In an embodiment, each of the plurality of second ribs 125 are aligned with one of the plurality of ribs 124. The second ribs 125 may be supported by a wall 227 that in some embodiments extends substantially parallel to the slot 114 or substantially perpendicular to edge 123 (FIG. 12). The second ribs 125 are angled away from the edge 123 such that a first end adjacent the edge 123 is closer to the centerline of the slot than the opposite end. In some embodiments function as a lead-in surface/element to slowly compress the mop pad as the mop head assembly is withdrawn from the wringing assembly 110. This further provides advantages in reducing the forces on the connection between the mop pad 156 and the mop head 103. In still other embodiments, the movement of the rollers (as described further herein) is sufficient to reduce or minimize compression of the mop pad and the lead-in surface/element guides the mop pad as it is being withdrawn.

It should be appreciated that the integrated blade 122 is advantageous in reducing manufacturing costs and assembly time. In some embodiments, the integrated blade 122 may provide further advantages in strength and stiffness and may also be more precisely positioned relative to the slot 114.

The wringing assembly 110 further includes at least one roller assembly 128. In the illustrated embodiment the wringing assembly includes two roller assemblies 128 that are coupled to the housing 112 and disposed on opposite sides of the relief area 120. In an embodiment, each roller assembly 128 consists of a frame 130 and a pair of rollers 132, 134. The frame 130 may be secured to the housing 112 by at least one fastener 136 for example. In an embodiment, the frame 130 is disposed on an angle relative to the blade 122. The angle of the frame 130 is selected to dispose the rollers 132, 134 on a tangent to the surface of the cover of the mop head, such as a cover member of mop head 103 for example. As a result, the rollers 132, 134 may be offset to each other relative to the slot 114. It should be appreciated that while the roller assemblies 128 are shown and described as being in pairs, this is for exemplary purposes and the claims should not be so limited. In other embodiments, the frame may have a single roller and the wringing assembly includes a single roller on each side of the relief area 120. In still further embodiments, the wringing assembly may have a single long roller that extends along a substantial portion of the length of the slot 114.

It should be appreciated that while embodiments herein describe the frame 130 as being a separate component, this is for example purposes and the claims should not be so limited. In other embodiments, the elements of the frame 130 described herein may be formed integrally with another component, such as the housing 112 for example.

In an embodiment, the rollers 132, 134 are movably coupled to the frame 130. In an embodiment, each roller 132, 134 includes an axle 137 (FIG. 13) on either side of a wheel 138. The axles 137 define the axis of rotation for the wheel 138. The frame 130 includes a pair of slots 140, each one sized to receive one of the rollers 132, 134. Each slot 140 includes a pair of recesses 142 disposed on either side of the slot 140. The recesses 142 are sized to receive the axles 138 such that the axles 138 (FIG. 13 and FIG. 14) can rotate freely therein.

Figure 13:
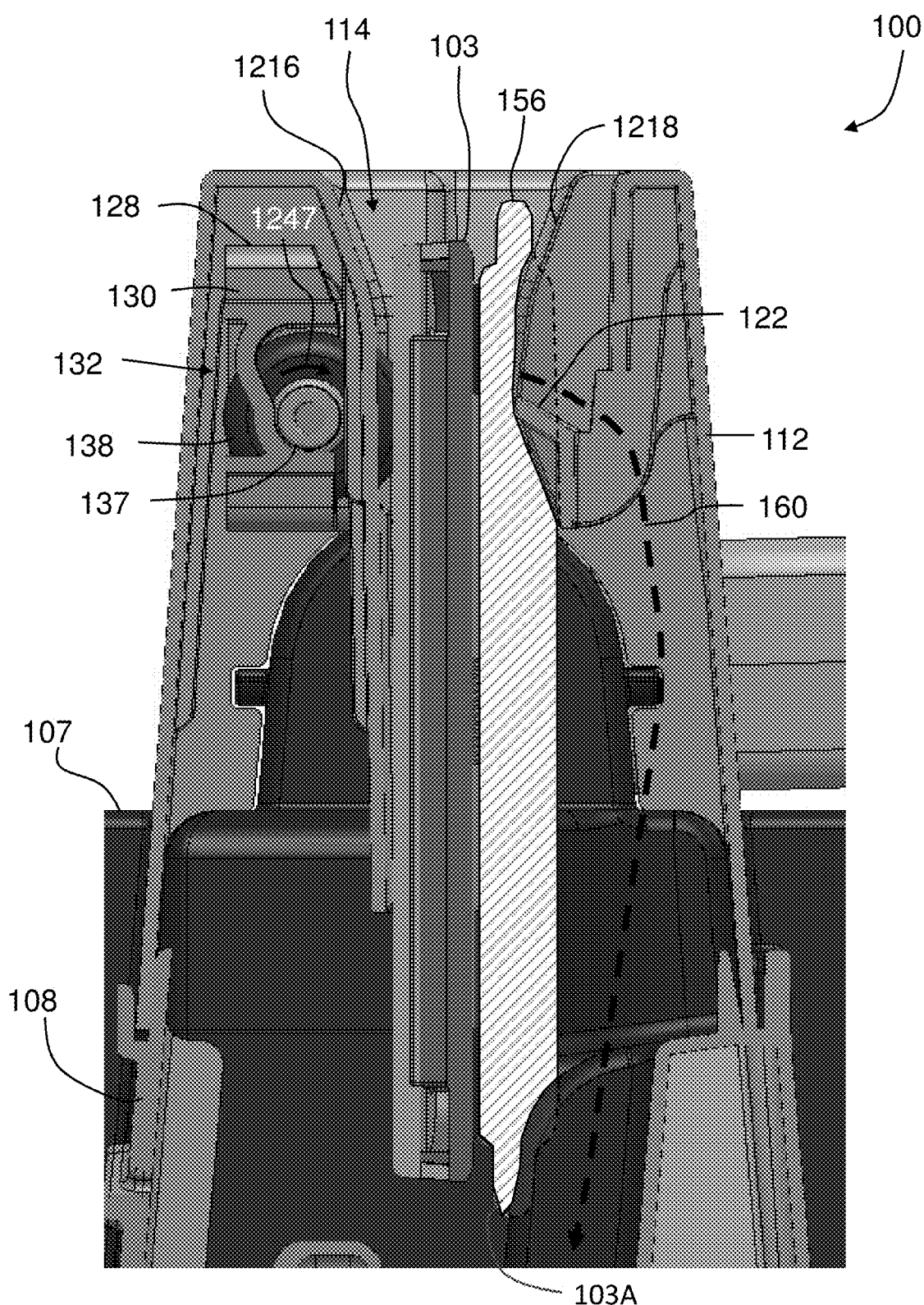
Figure 14:
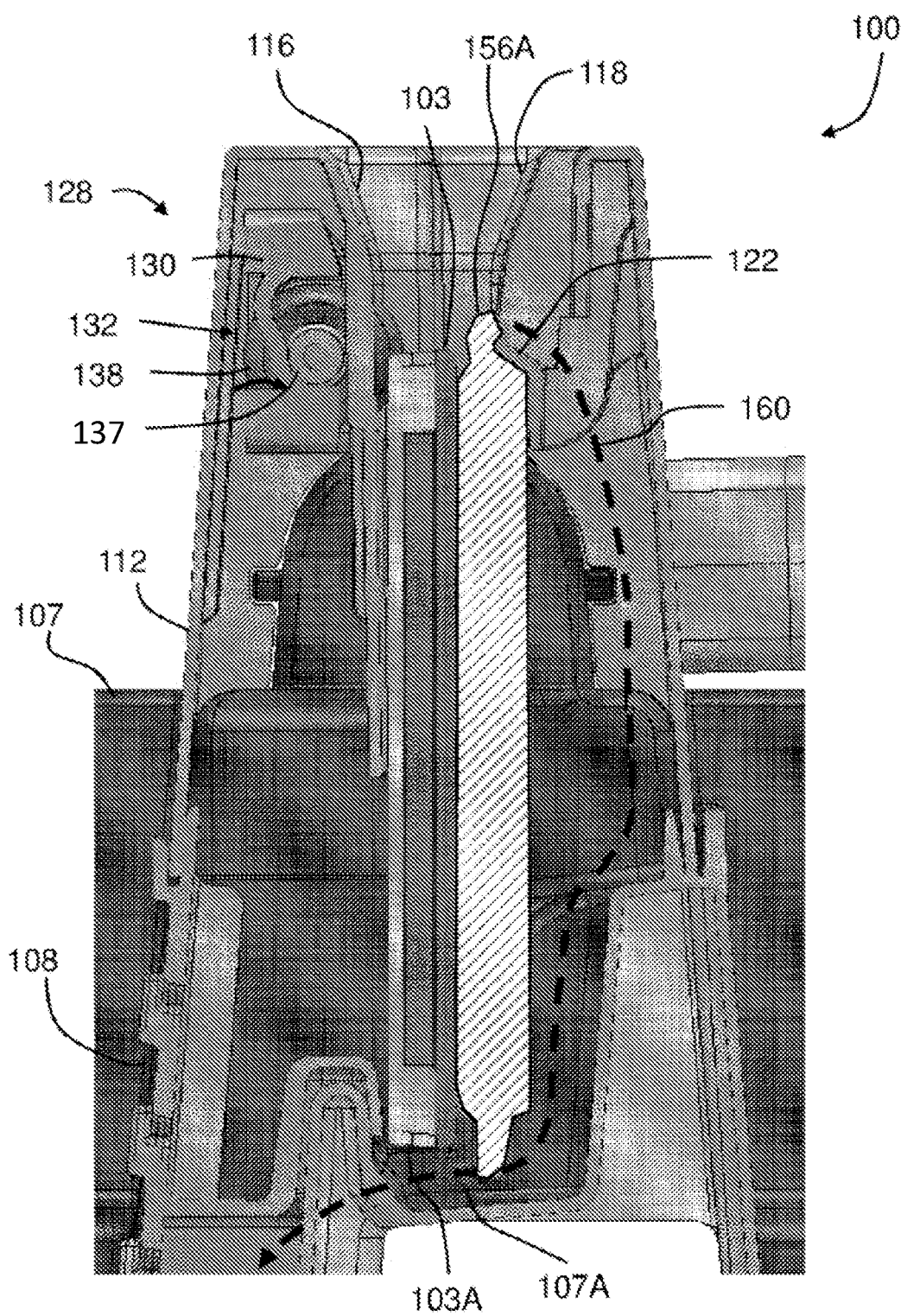

In the illustrated embodiment, the recesses 142 are defined by a wall 144. The wall 144 includes a first rotation area 146 and a second rotation area 148 with an angled portion 150 therebetween. In operation, the rollers 132, 134 rotate about their axis in the first rotation area 146 as the mop head is inserted into and moved through the slot 114 (FIG. 13). As the mop head is withdrawn from the wringing assembly 110, the rollers 132, 134 move to the second rotation area 148 and rotate about their axis on this location (FIG. 13). Without being constrained or bound to any theory, the rollers 132, 134 move from the first position at first rotation area 146 to a second position at second rotation area 148 due to the frictional contact between the mop head cover and the wheels 138.

Figure 7:
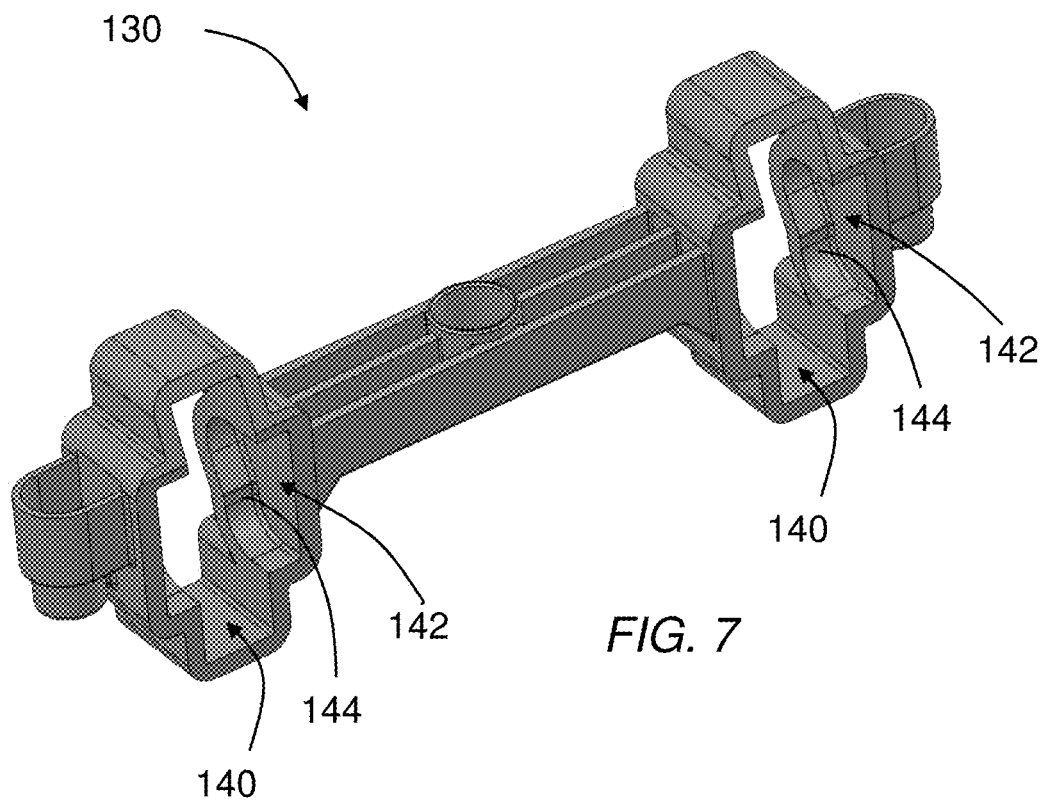
Figure 8:
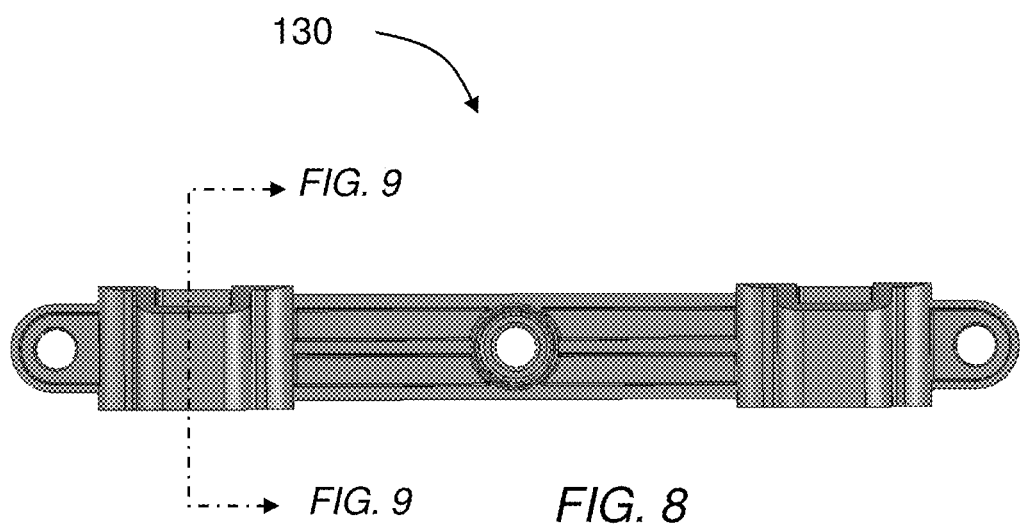
Figure 9:
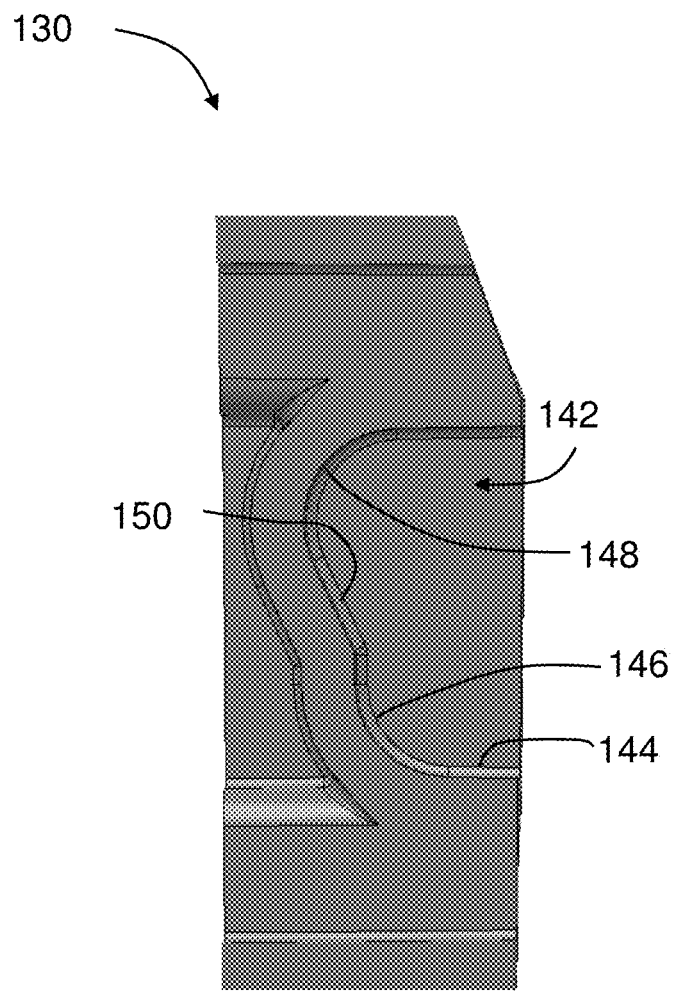
Figure 10:
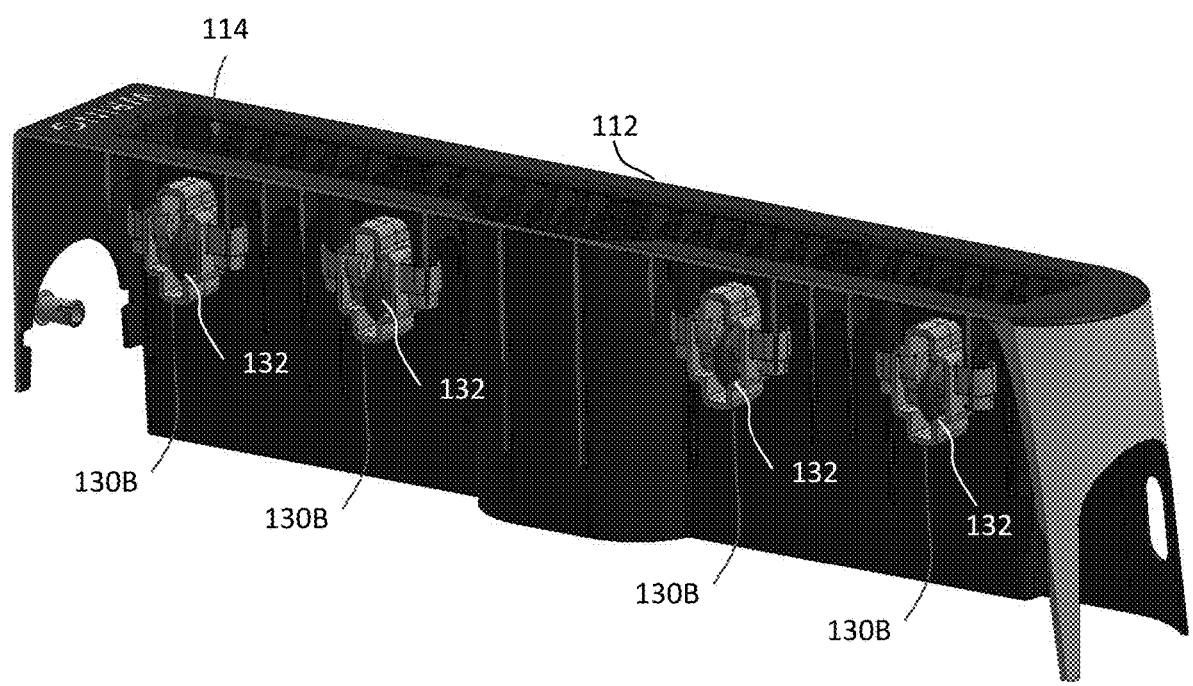
Figure 11:
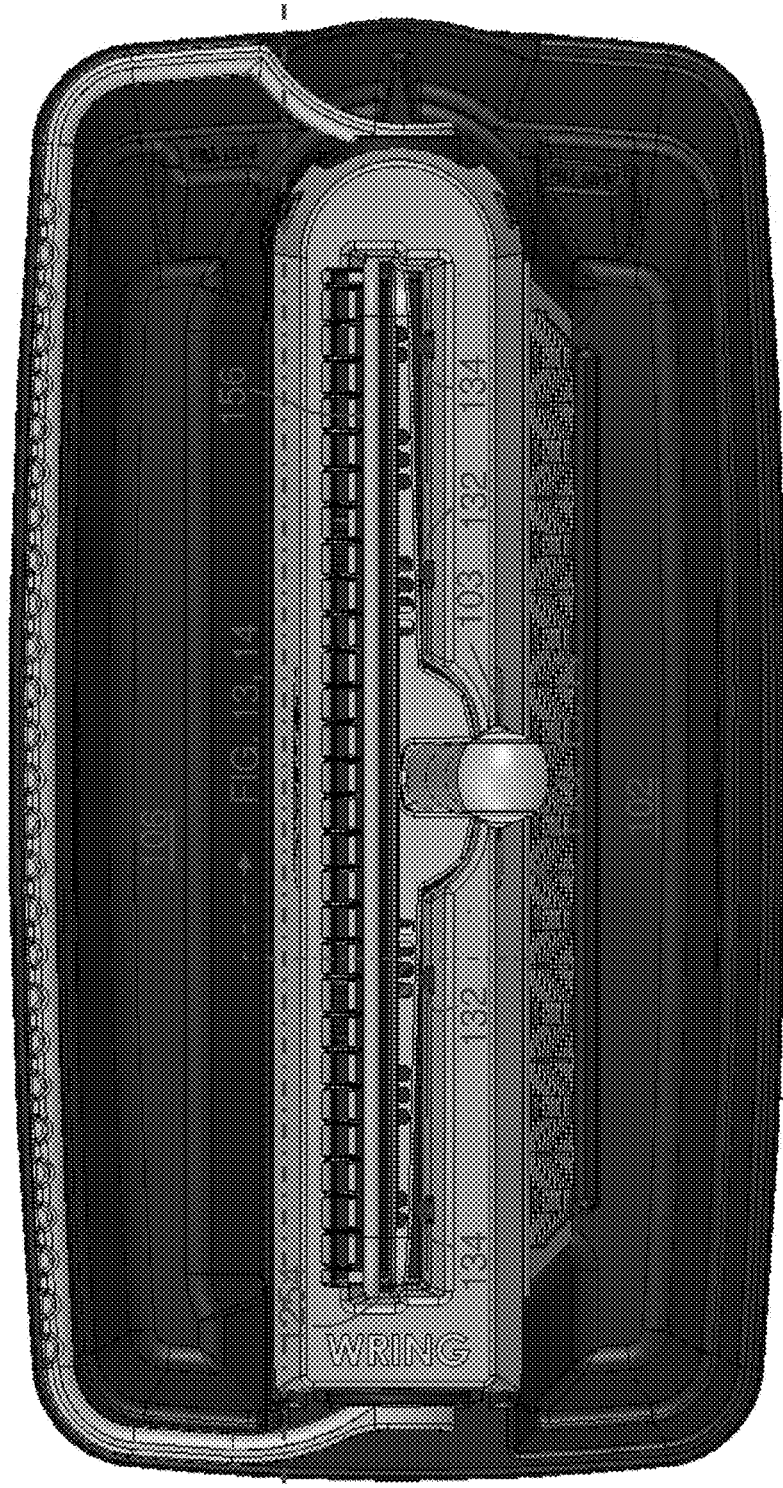

It should be appreciated that while embodiments of FIGS. 7-9 illustrate multiple rollers being coupled to a single frame 130 as an example, and the claims should not be so limited. In other embodiments, each roller 132 may be coupled to a single housing 130B as shown in FIG. 10.

In one or more embodiments disclosed herein, the first compartment 102, the second compartment 106 and the wringing assembly 110 are arranged such that the user can insert the mop head 103 into the first compartment, scrub the mop pad 156 against the cleaning plate 108, wring the mop pad 156 using the wringing assembly 110 and recharge the mop pad 156 in a serial manner without having to rotate the mop head 103. It should be appreciated that this provides advantages in reducing the time and effort for the user to clean and recharge the mop pad 156.

Referring now to FIG. 11-FIG. 15, the operation of the bucket assembly 100 to wring, remove, or extract a fluid from a mop 101 having a mop head 103 with a mop pad 156 attached thereto. The mop head 103 also includes a cover on a side of the mop head 103 opposite the mop pad 156. In an embodiment, the mop pad 156 is made from a microfiber material. The microfiber material may be made from a polyester, polyamide, polypropylene or a combination of the foregoing. In some embodiments, the mop pad may be made from, but is not limited to a pad made from: cotton, sponge, foam material for example. It should be appreciated that during the floor cleaning process, there are a number of instances where the user may desire wring, remove, or extract fluid from the mop pad. For example, after the user has cleaned the floor for a period of time, the mop pad may accumulate debris or otherwise become dirty or soiled. The user may then place the mop head 103 into the first compartment 102 to rinse the debris off, or optionally agitate the microfibers by rubbing the mop pad 156 against the cleaning plate 108. After rinsing the mop pad 156, the user may desire to remove fluid (e.g. dirty water) before recharging the mop pad 156 in the second compartment 106. Similarly, after recharging the mop pad 156, the user may desire to remove excess fluid from the mop pad 156.

To wring, remove, or extract fluid from the mop pad, the user rotates (or allows the rotation where the mop head is biased to rotate) to a position with the mop head 103 folded substantially flat against the pole in the vertical position (e.g. the edge of the mop head is substantially perpendicular to the axis of the pole), as is shown in FIG. 1. In this position, the mop head 103, cover, and mop pad 156 are positioned to be inserted into the slot 114. As the mop head assembly and end of the pole is inserted into the slot 114, the lead-in portions 116 and 118 cooperate to guide the mop head assembly into the slot and also initiate a gradual compression of the mop pad 156. In the exemplary embodiment, the attachment mechanism between the mop pad 156 and the mop head 103 is a hook and loop fastener where the edges of the mop pad 156 may not be connected to the fastener (e.g. the fastener is offset from the edge of the mop pad). In an embodiment, the fastener is 4 mm-6 mm from the edge of the mop head. These lead-in surfaces have been advantageously found to place less force on the leading edge of the mop pad 156 and reduces the risk of the mop pad 156 separating, becoming distorted, folded or bunched-over from the mop head 103 during insertion or when the mop pad comes in contact with the blade. As the mop head assembly continues to be inserted, the mop pad 156 engages the edge of the blade 122 and removed or extracted fluid flows through the slots 126 and along a flow path, such as that indicated by arrow 160, into the first compartment 102. The mop pad 156 is held against the blade 122 by the rollers 132, 134 which engage the cover. The rollers 132, 134 rotate (in the direction indicated by arrow 1247) as the mop head assembly moves through the slot 114. The rollers 132, 134 rotate in the first position (FIG. 13) as the mop head assembly is inserted. In an embodiment, the end of the mop head 103A contacts stop surface, such as rib 107A when in the fully inserted position. In an embodiment, the rib 107A is integral with or molded into the bucket 107. In the illustrated embodiment, the end 156A of the mop pad 156 remains above the edge of the blade 122 thus reducing or minimizing stress on the connection between the mop pad 156 and the mop head 103.

Figure 15:
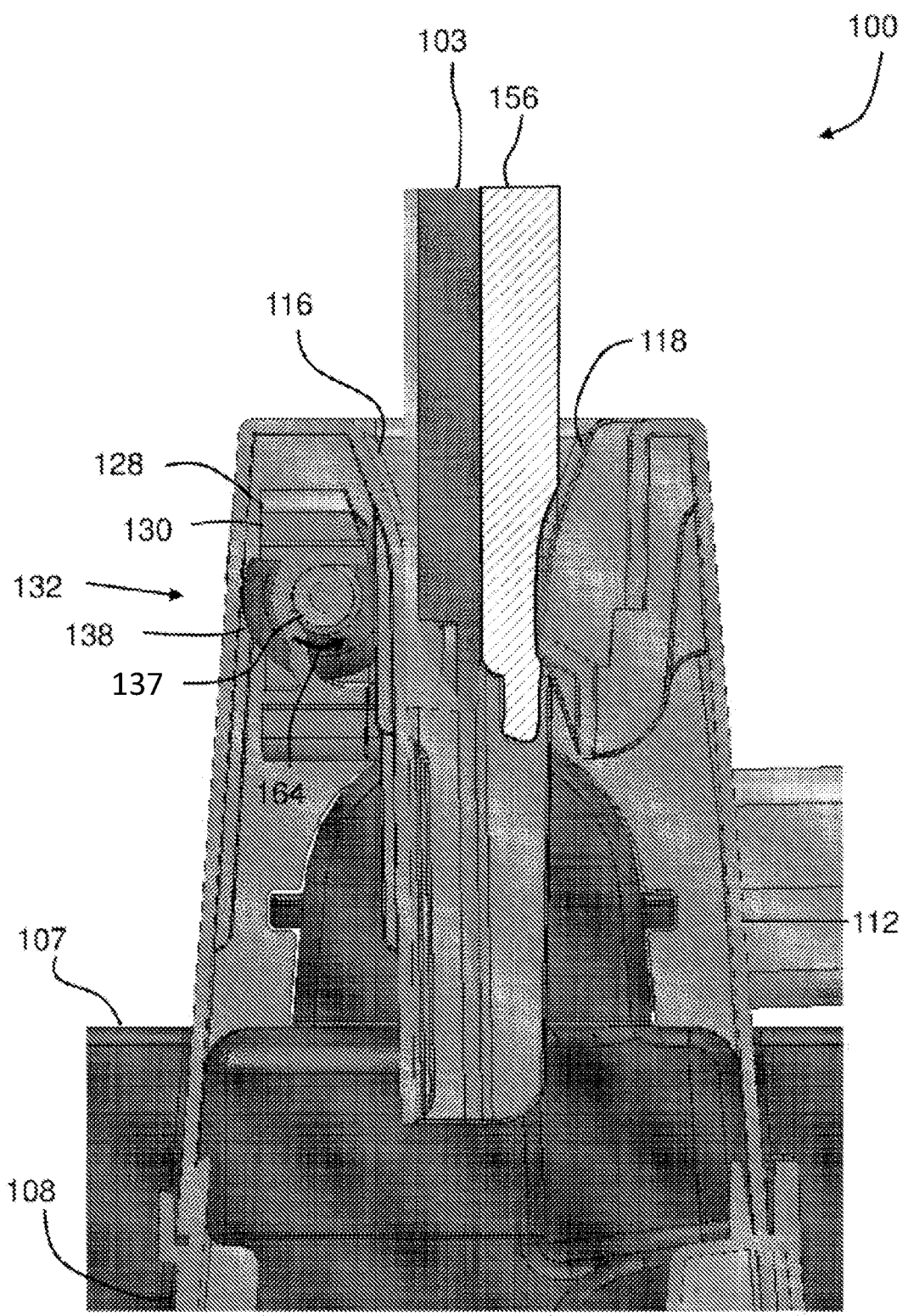
Figure 16:
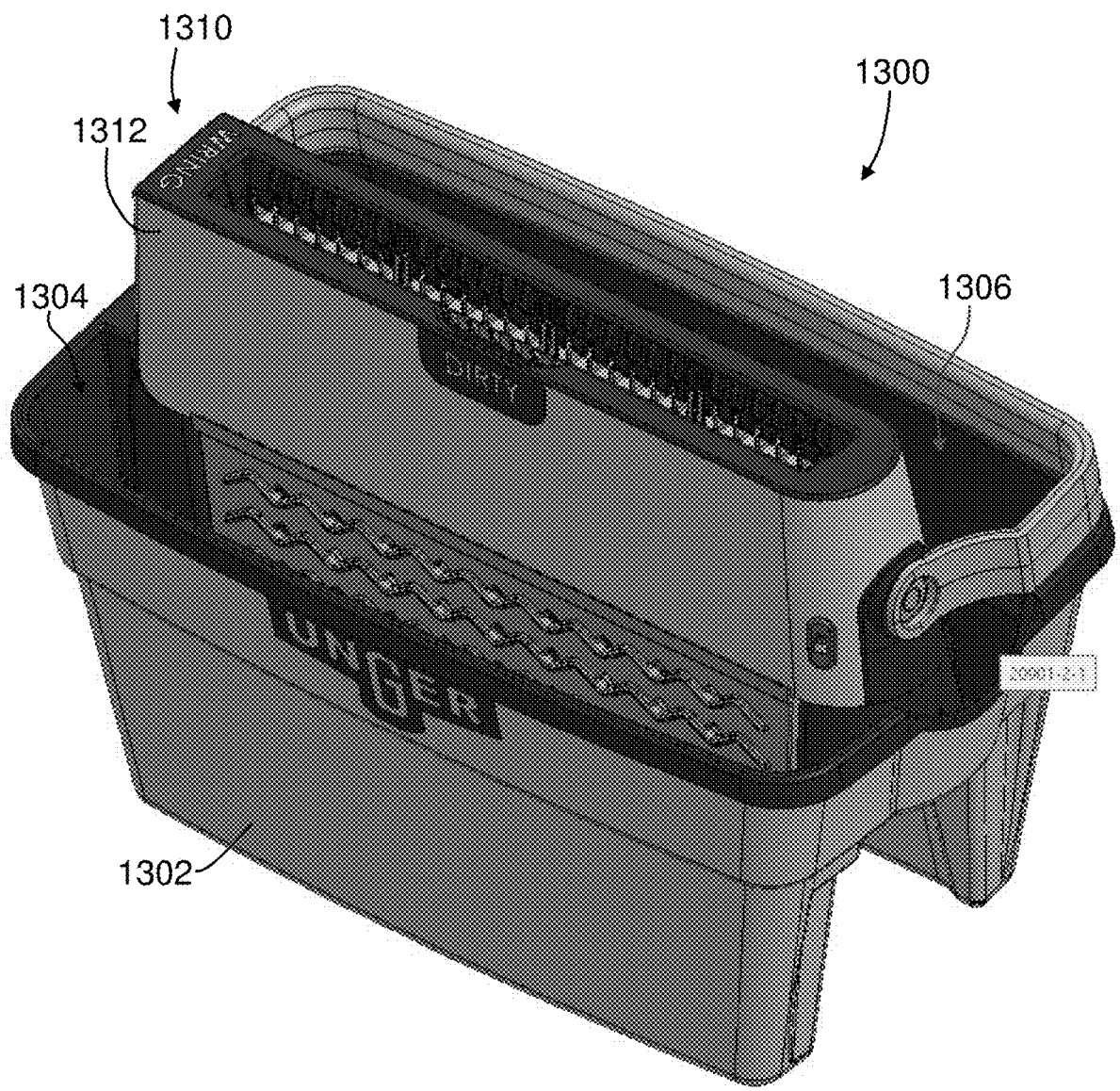
Figure 17:
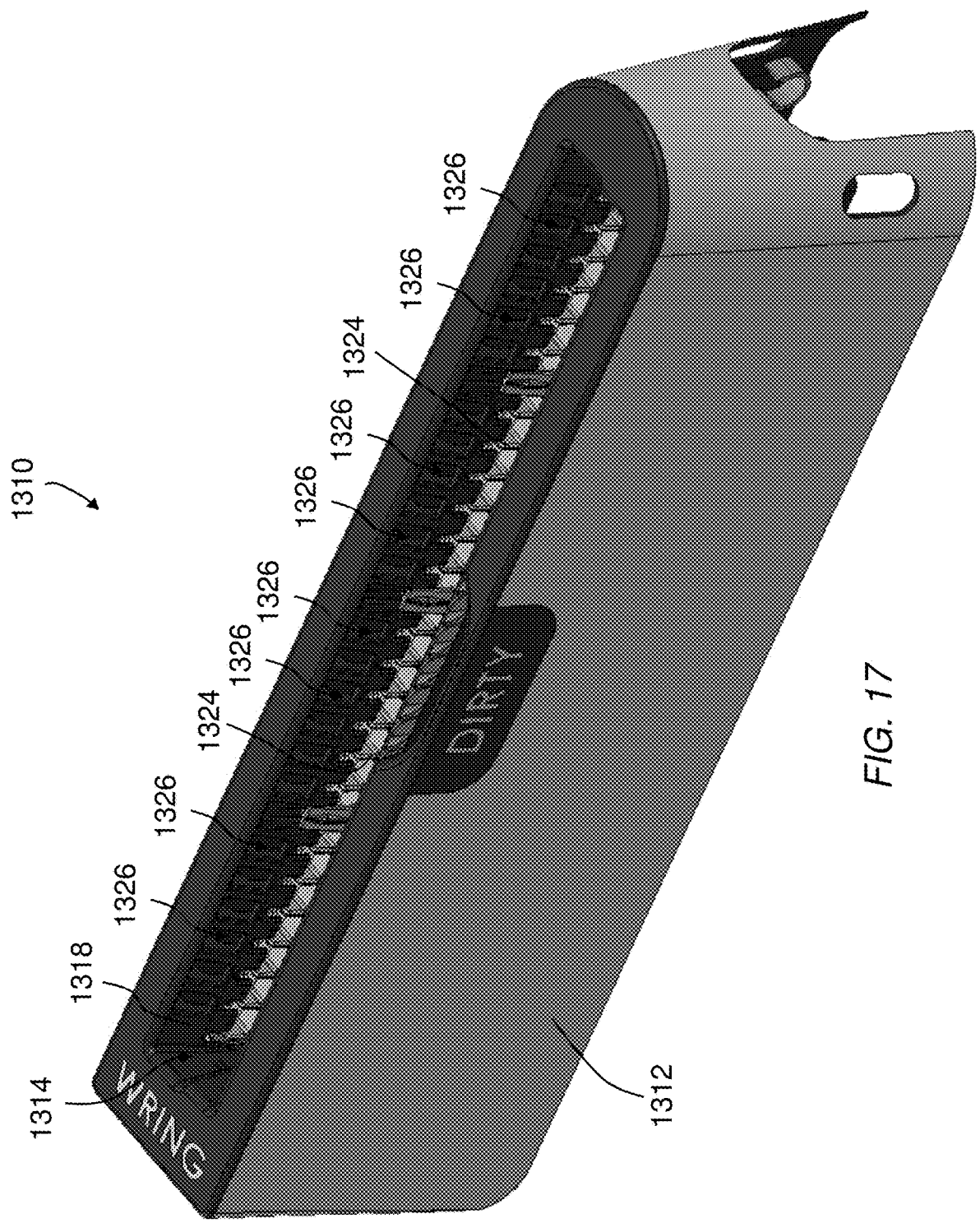

After inserting the mop head assembly, the user may withdraw the mop head assembly by reversing the direction of movement by pulling up on the mop pole. As a result, due to friction between the cover and the rollers 132, 134, the rollers 132, 134 will rotate in the direction indicated by arrow 164 (FIG. 15). As a result, the rotation of the rollers 132, 134 will cause the rollers 132, 134 to move from the first position (FIG. 13 and/or FIG. 14) to the second position (FIG. 15). Once in the second position, the rollers 132, 134 will continue to rotate as the mop head assembly is withdrawn. Once the mop head assembly is withdrawn from the bucket assembly 100, the rollers 132, 134 move back to the first position under the influence of gravity. It should be appreciated that in the event that a roller 132, 134 remains in the second position, the roller will move to the first position the next time the mop head assembly is inserted into the slot 114 and the roller contacts the mop head cover.

It should be appreciated that as the rollers 132, 134 move from the first position to the second position, in addition to moving vertically, the rollers 132, 134 move laterally in a direction away from the centerline of the slot 114. This lateral movement of the rollers 132, 134 allow the mop head 103 and hence the mop pad 156 to also move away from the blade 122 and thus reduce the amount of compression of the mop pad 156. This advantageously reduces the amount of withdrawal force by the user. It should be appreciated that this movement between the first position and second position provides advantages in providing a desired level of fluid removal or extraction during the insertion and making it relatively easy for the user to withdraw. This arrangement provides further advantages in that the lower withdrawal force places less force on the connection between the mop pad and the attachment mechanism of the mop pad 156 to the mop head 103. Thus, the reduced extraction force reduces the risk of the mop pad 156 being separated, distorted, folded or bunched-over from the mop head 103 during withdrawal.

In an embodiment, blade is positioned to compress the mop pad to extract about 30%-50% of a fluid in a saturated mop pad when the flat headed mop is inserted into the wringing assembly a first time. In an embodiment, the blade is positioned to compress the mop pad to extract about an additional 10%-30% of the fluid in the saturated mop pad when the flat headed mop is inserted into the wringing assembly a second time. In an embodiment, the blade is positioned to compress the mop pad to extract about and additional 5%-20% of the fluid in the saturated mop pad when the flat headed mop is inserted into the wringing assembly a third time. In an embodiment, the blade is positioned to compress the mop pad to extract about an additional 1%-15% of the fluid in the saturated mop pad when the flat headed mop is inserted into the wringing assembly a fourth time. It should be appreciated that the number and amount of wringing that is performed may be changed to suit the desired application. For example, it may be desired to have less liquid when cleaning a wood floor than when cleaning a tile floor for example. It should also be appreciated that the wringing assembly may be configured to extract fluid on the high end of the above ranges on the first time the mop head is inserted, and then on the lower side on the subsequent insertions. In some embodiments, the amount of fluid extracted (e.g. 20%) is the same on each insertion of the mop head.

In another embodiment, blade is positioned to compress the mop pad to extract about 20%-60% of a fluid in a saturated mop pad when the flat headed mop is inserted into the wringing assembly a first time. In an embodiment, the blade is positioned to compress the mop pad to extract about an additional 2%-30% of the fluid in the saturated mop pad when the flat headed mop is inserted into the wringing assembly a second time. In an embodiment, the blade is positioned to compress the mop pad to extract about and additional >0%-20% of the fluid in the saturated mop pad when the flat headed mop is inserted into the wringing assembly a third time. In an embodiment, the blade is positioned to compress the mop pad to extract about an additional >0%-10% of the fluid in the saturated mop pad when the flat headed mop is inserted into the wringing assembly a fourth time. It should also be appreciated that the wringing assembly may be configured to extract fluid on the high end of the above ranges on the first time the mop head is inserted, and then on the lower side on the subsequent insertions. In some embodiments, the amount of fluid extracted (e.g. 20%) is the same on each insertion of the mop head.

It should be appreciated that amount of wringing that occurs and the amount of force applied by the user during insertion of the mop head into the wringing assembly may be changed by changing the gap relationship between the rollers the blade. For example, the smaller the gap, the amount of fluid extracted, and the amount of force applied by the user, will increase. In one embodiment, the force is less than 30 pounds (133.5 Newtons), in another embodiment, the amount of force is between 26-40 pounds (155.7-178 Newtons), in still another embodiment the amount of force is between 10-15 pounds (44.5-66.7 Newtons).

Referring now to FIG. 16-FIG. 23 an embodiment of a bucket assembly 1300. The bucket assembly 1300 is similar to bucket assembly 100 having a bucket 1302, a first compartment 1304, a second compartment 1306, and a wringing assembly 1310. In this embodiment, the wringing assembly 1310 is different from the wringing assembly 110 in that the rollers 1332, 1334 are independently mounted to a housing 1312 and the blade 1322 is a separate component that is coupled to the housing 1312, such as with a fastener (e.g. a screw) or a snap fit.

Figure 18:
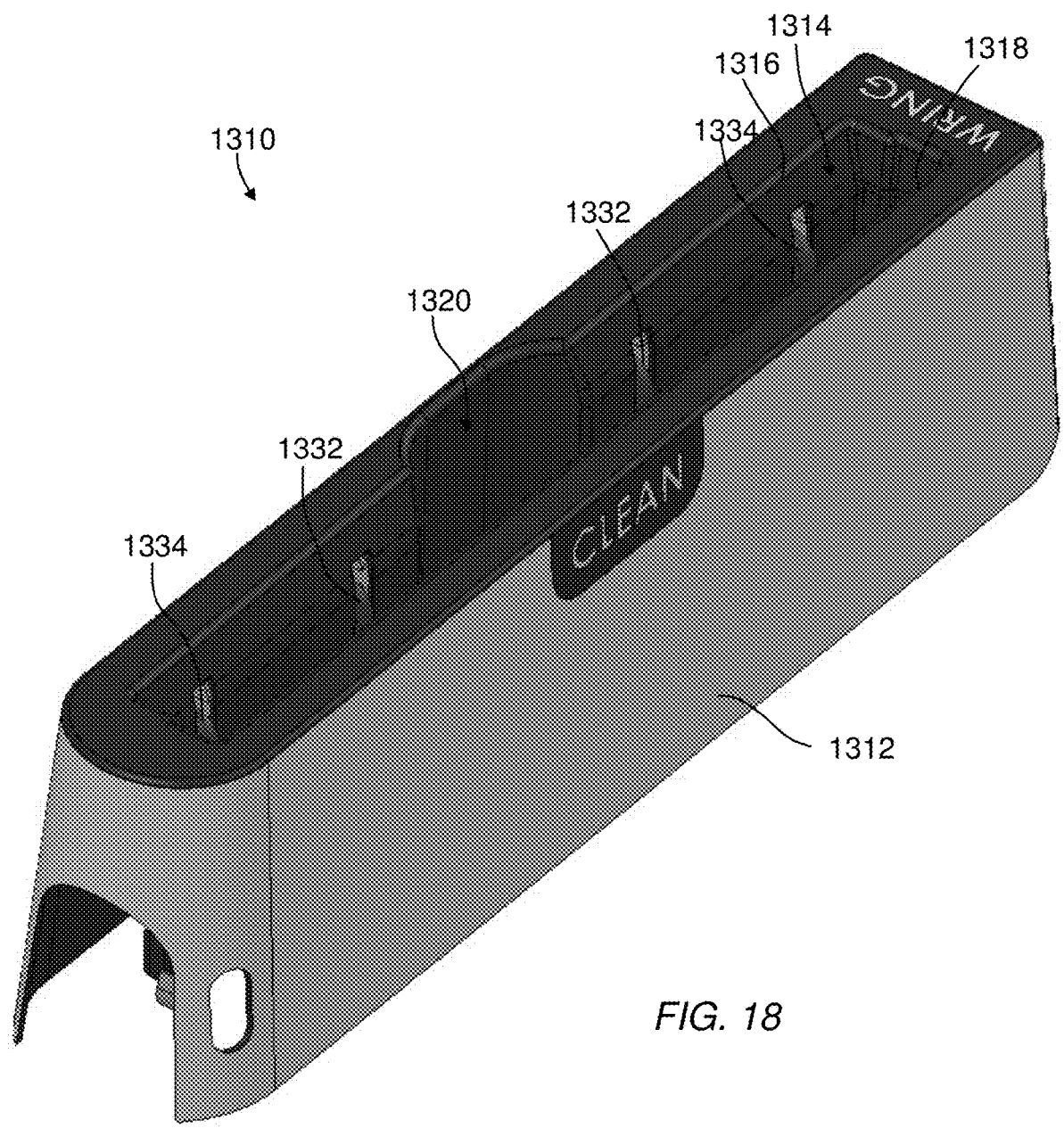
Figure 21:
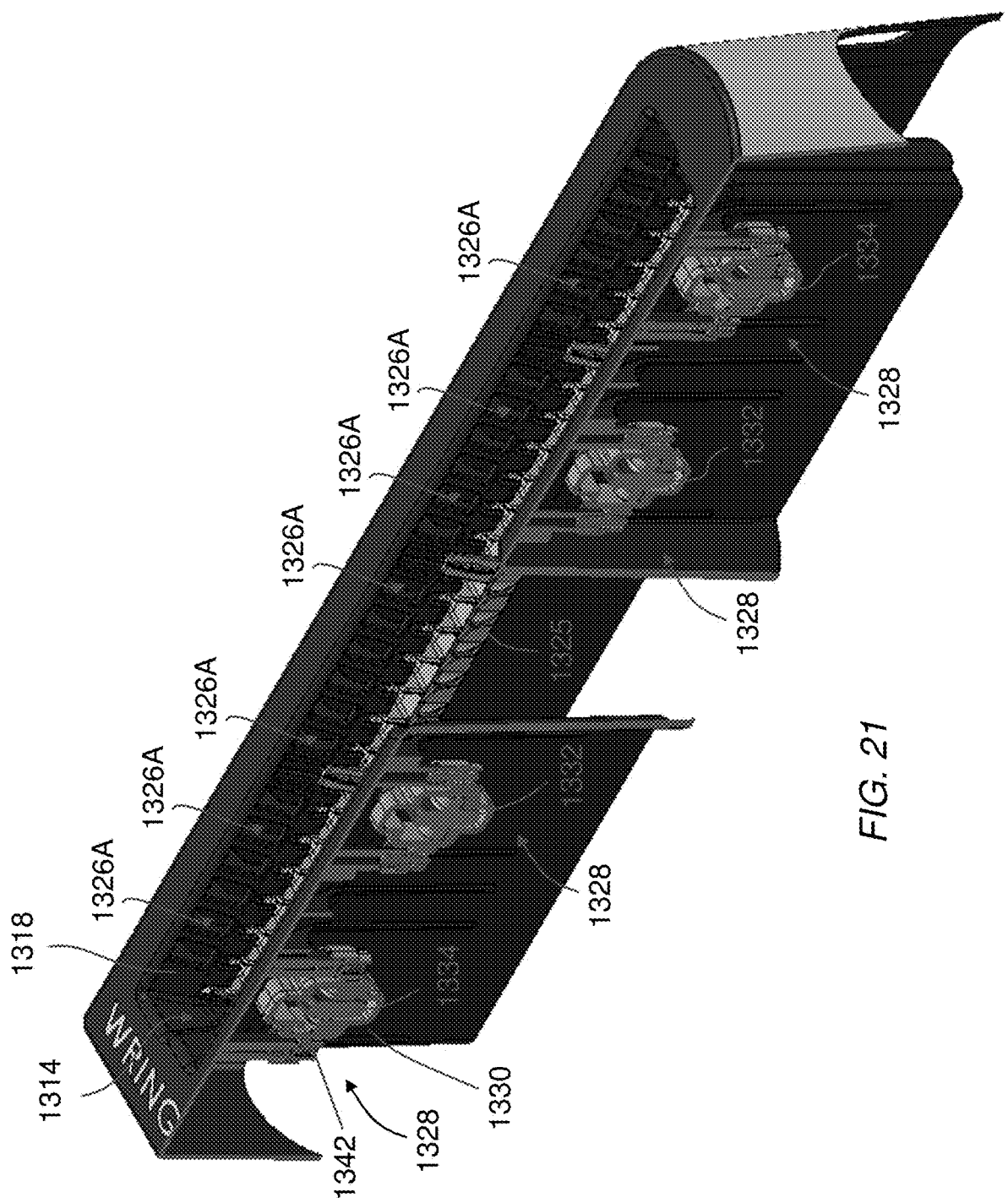

The housing 1312 includes a slot 1314 with a relief area 1320 (FIG. 18). The slot 1314 further includes a pair of opposing lead-in surfaces 1316, 1318. The lead-in surface 1318 includes a plurality of openings 1326. Similar to the slots 126, the openings 1326A define a fluid path that allows removed or extracted fluid from the mop pad caused by the lead-in surface 1318 to flow into the first compartment 1304.

The blade 1322 includes a plurality of ribs 1324 that define channels 1326B that provide additional fluid paths for removed or extracted fluids to flow into the first compartment 1304. The ribs 1324 may include an angled portion to continue the compression of the mop pad initiated by the lead-in surface 1318. The blade 1322 further includes a plurality of support members 1327 that are positioned in slots 1329 formed in the lead-in surface 1318. The support member 1327 provide lateral support between the attachment points 1331 against the forces generated by the mop head assembly as the mop pad is compressed by the blade 1322. To reduce or minimize the deformation of the blade 122 to increase or maximize the fluid removal from the pad.

Figures 22, 23:
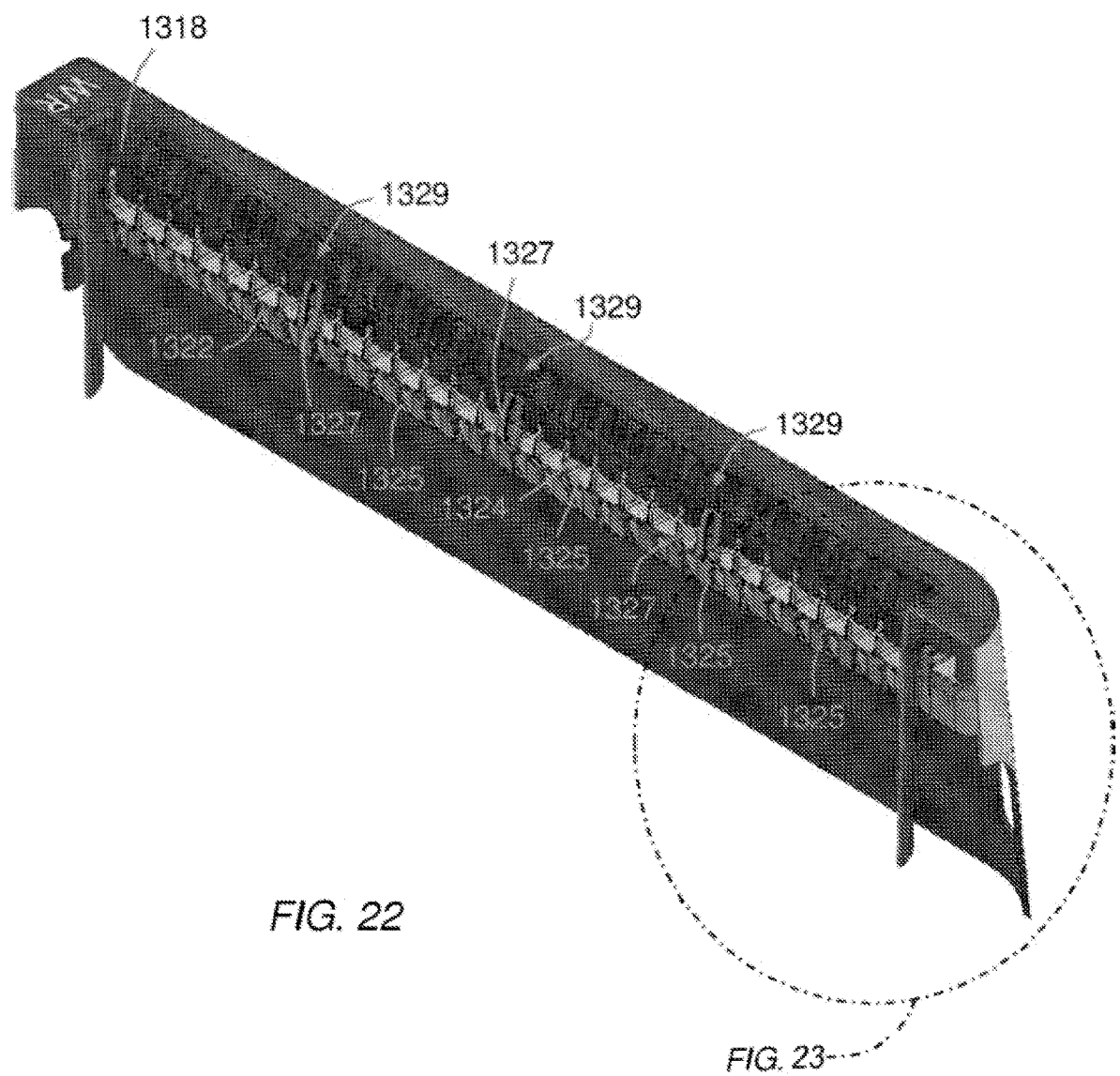
Figure 23:
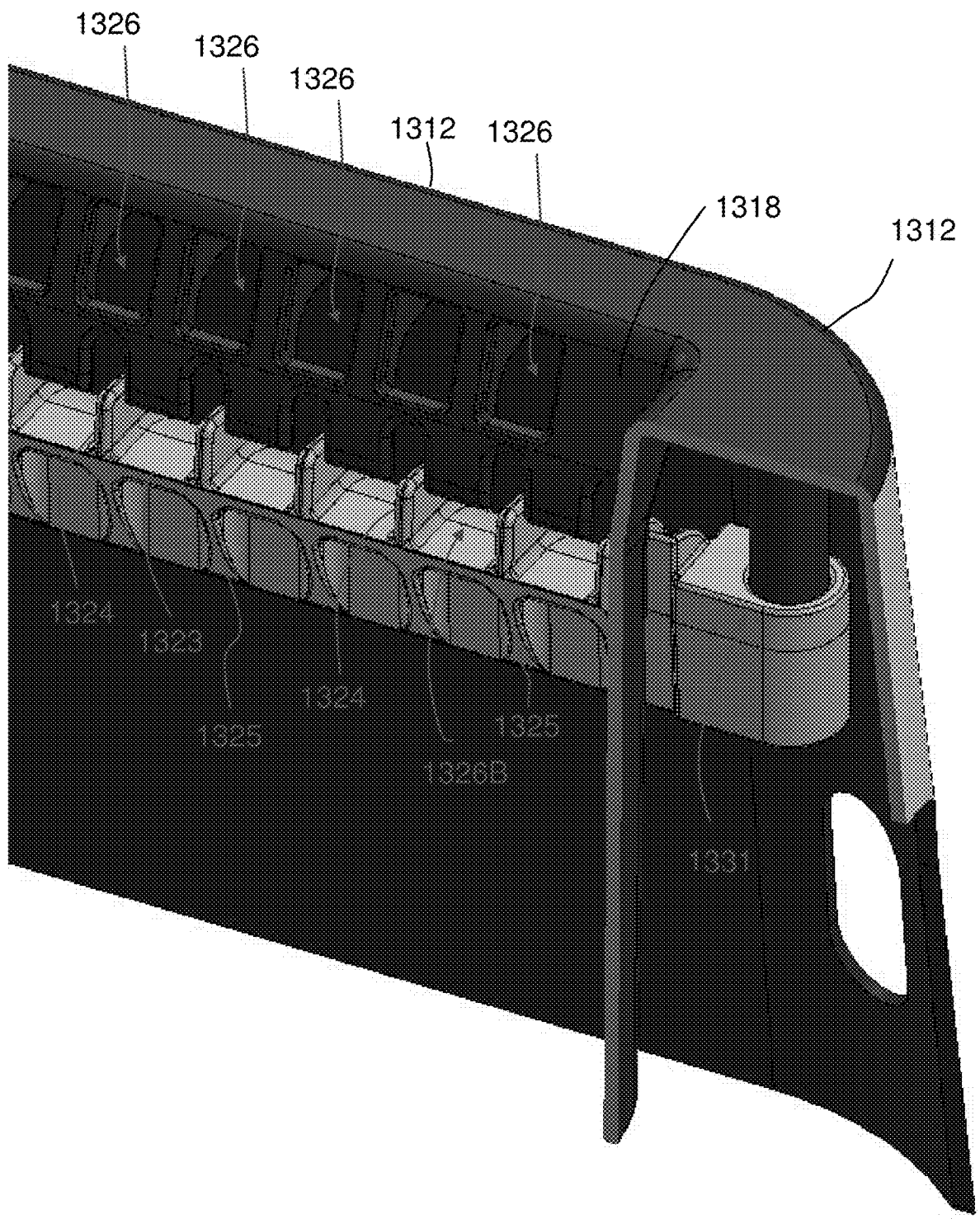
Figure 24:
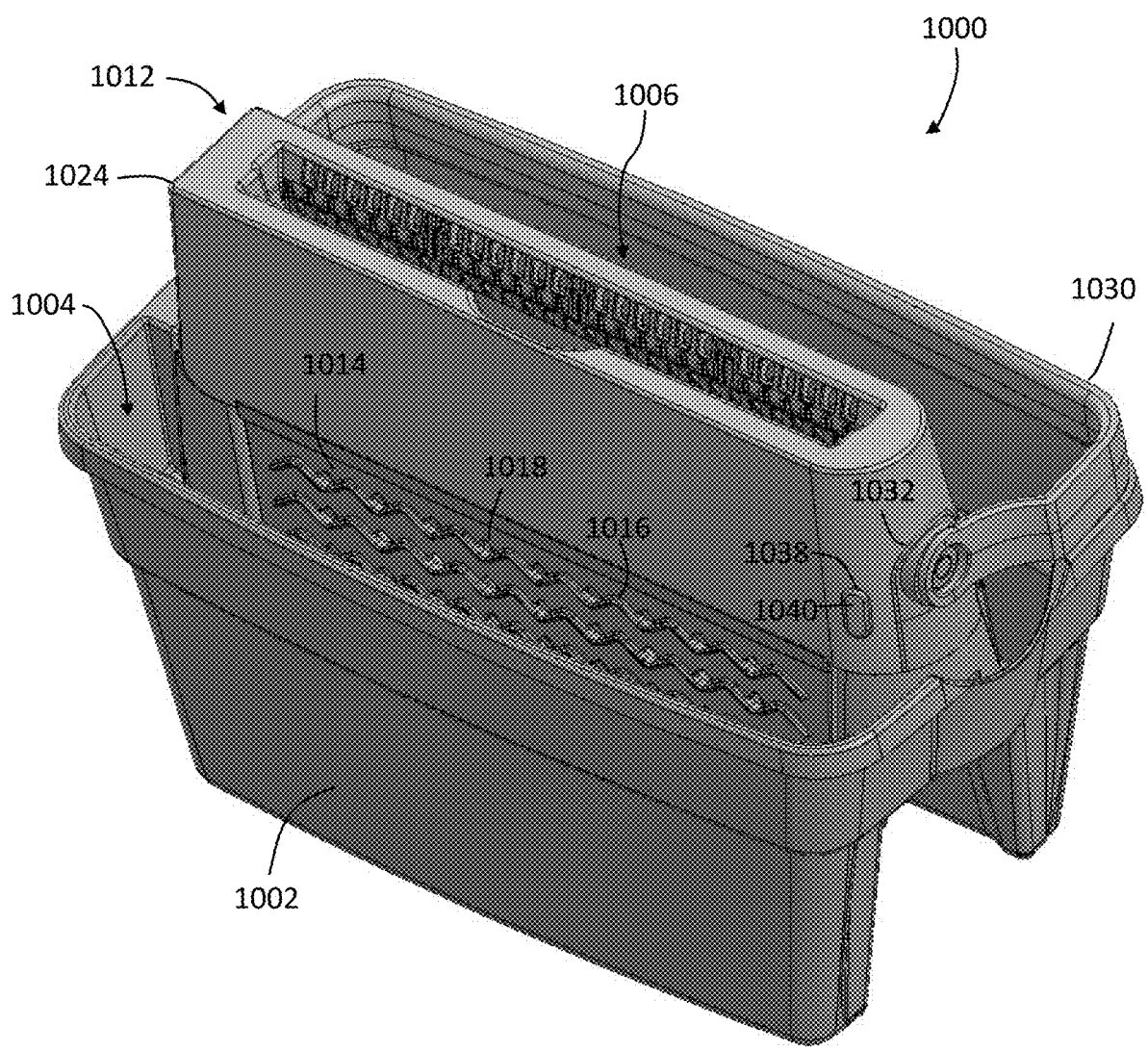
FIGS. 24-36 are various views of a two-compartment bucket for a floor cleaning system in accordance with an embodiment.
Figure 25:
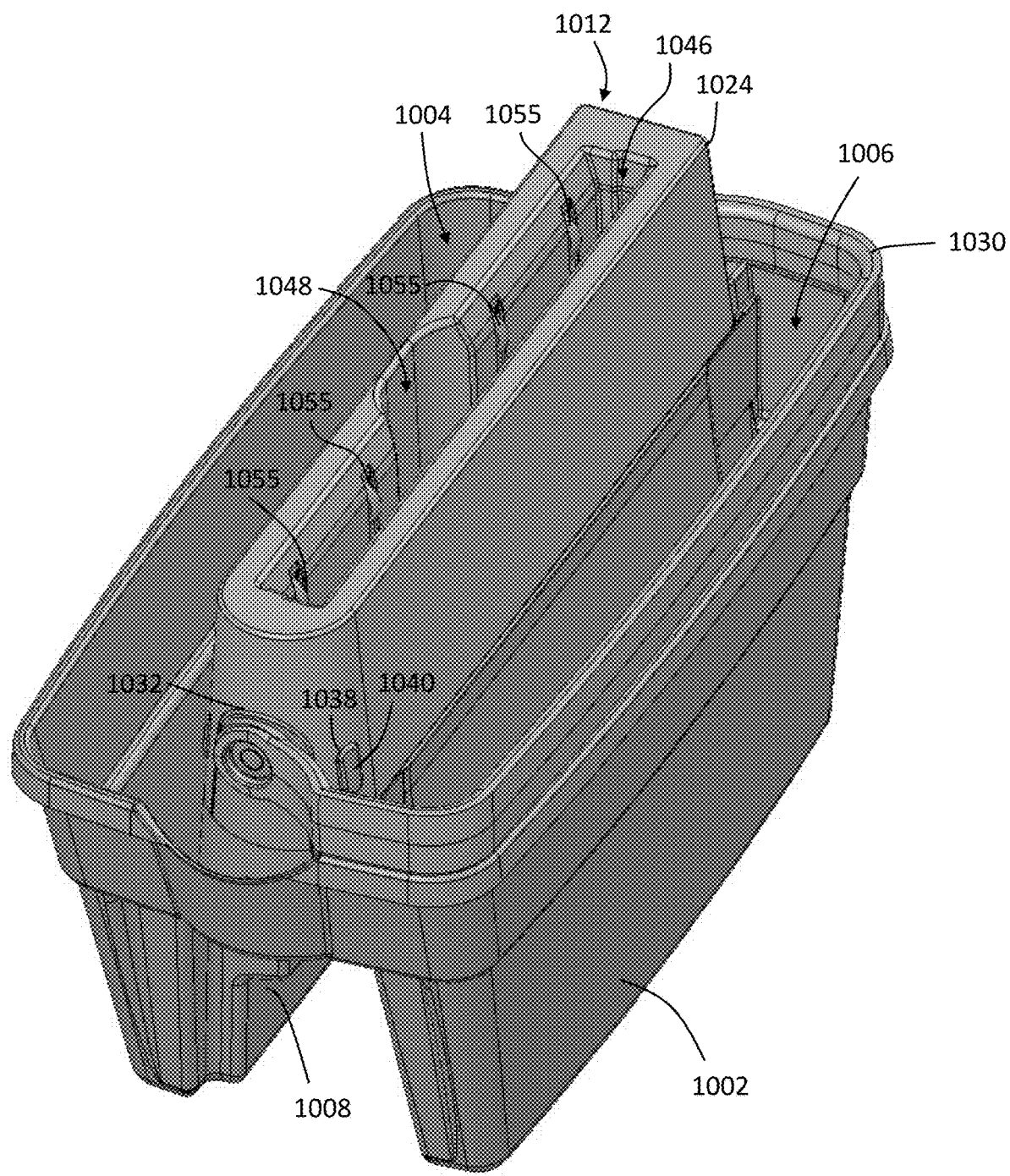
Figure 26:
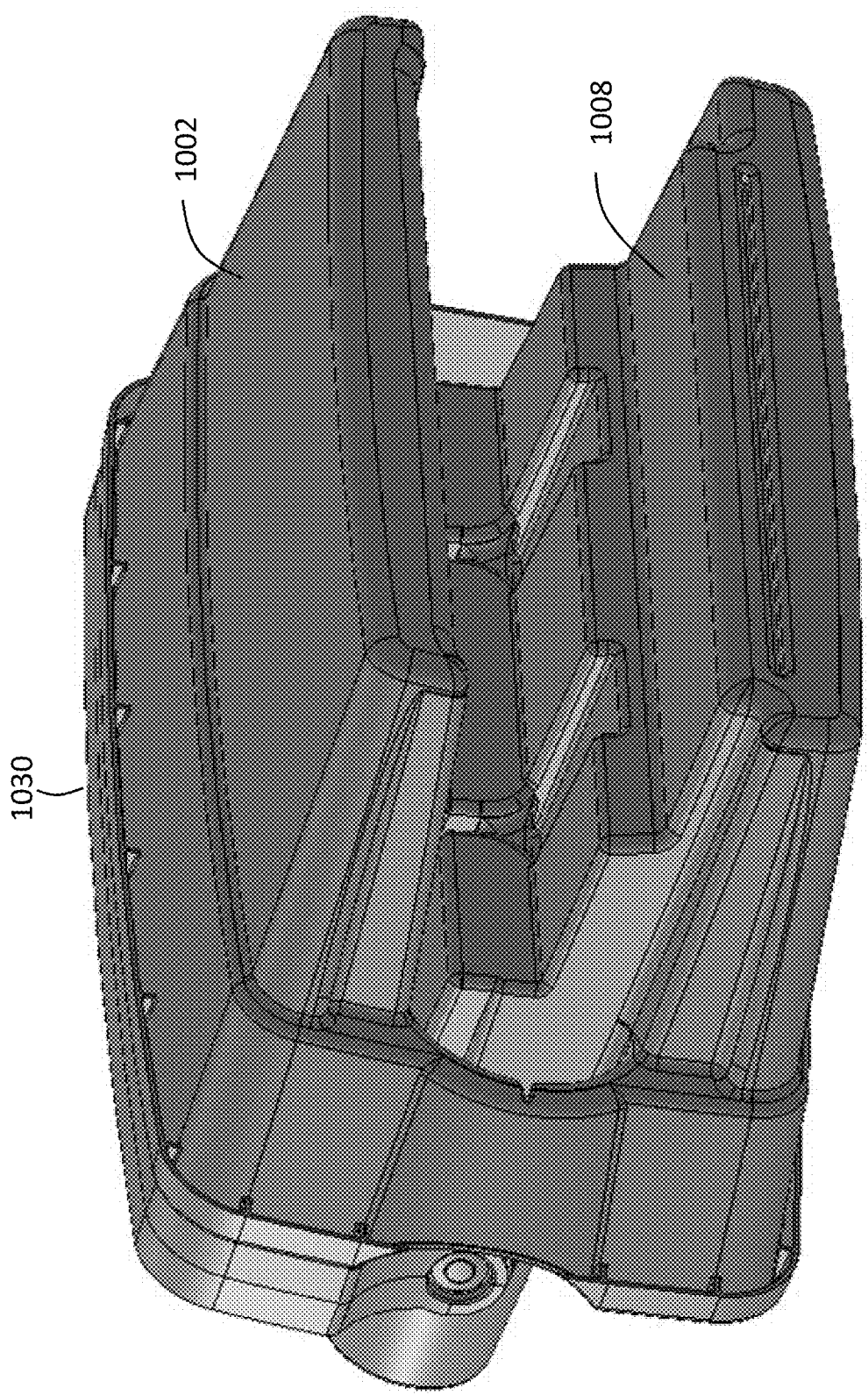
Figure 27:
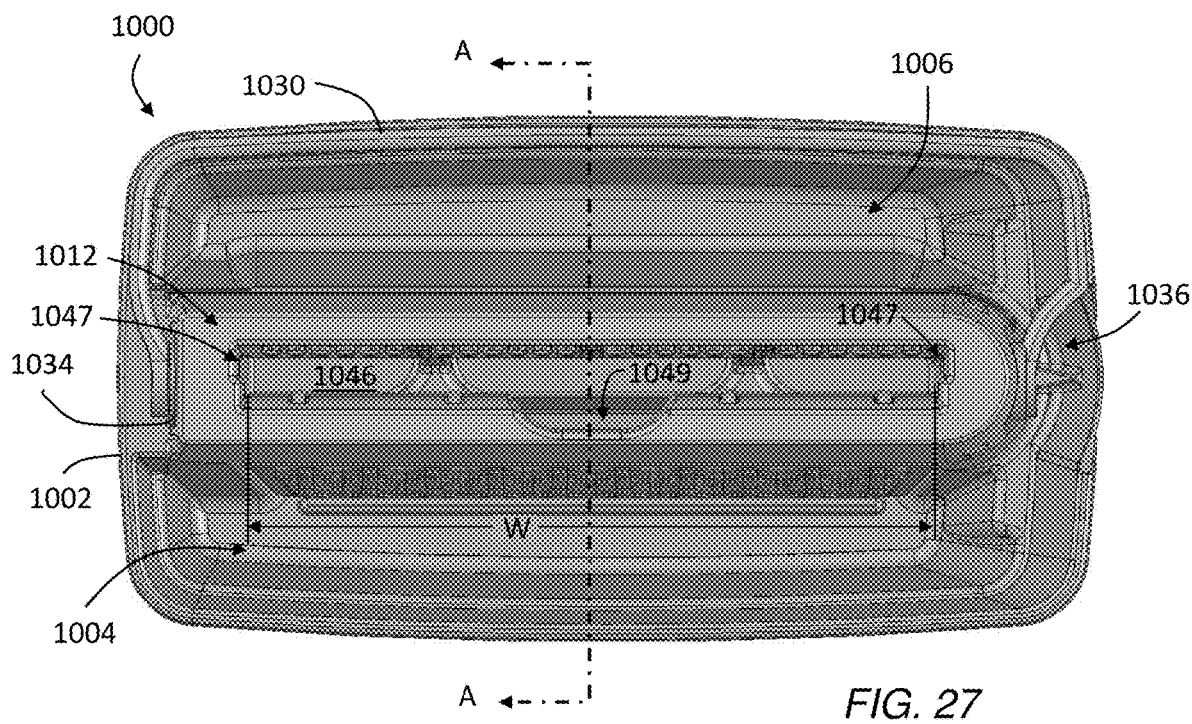
Figure 28:
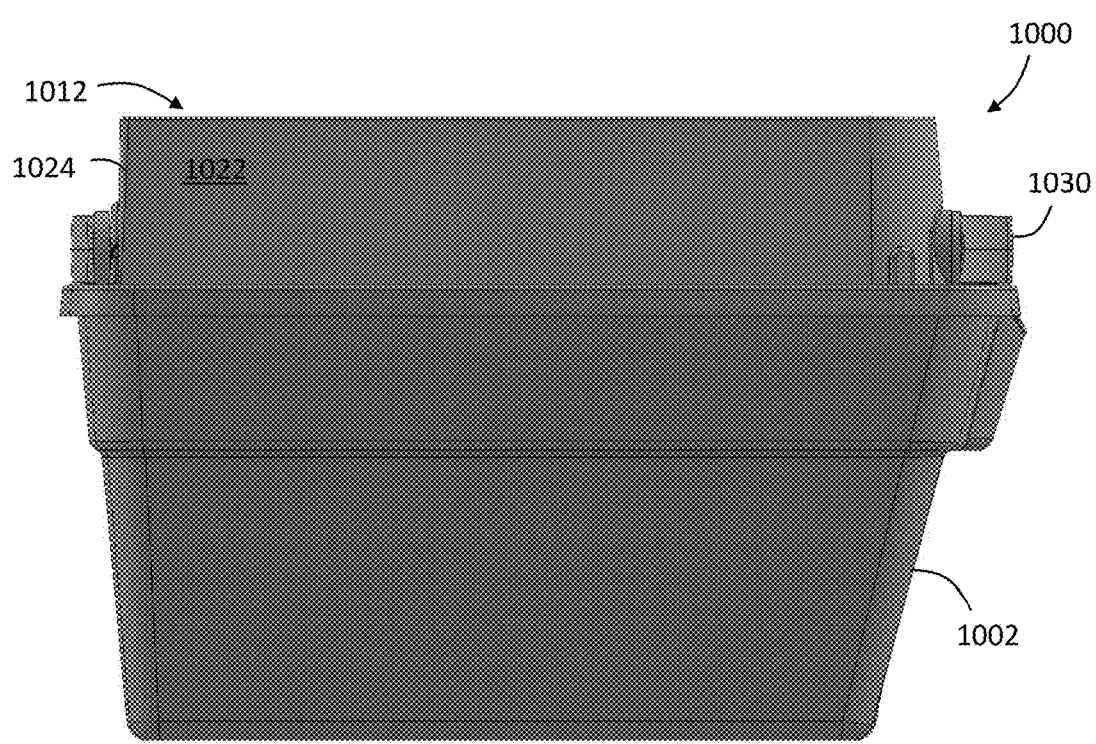
Figure 29:
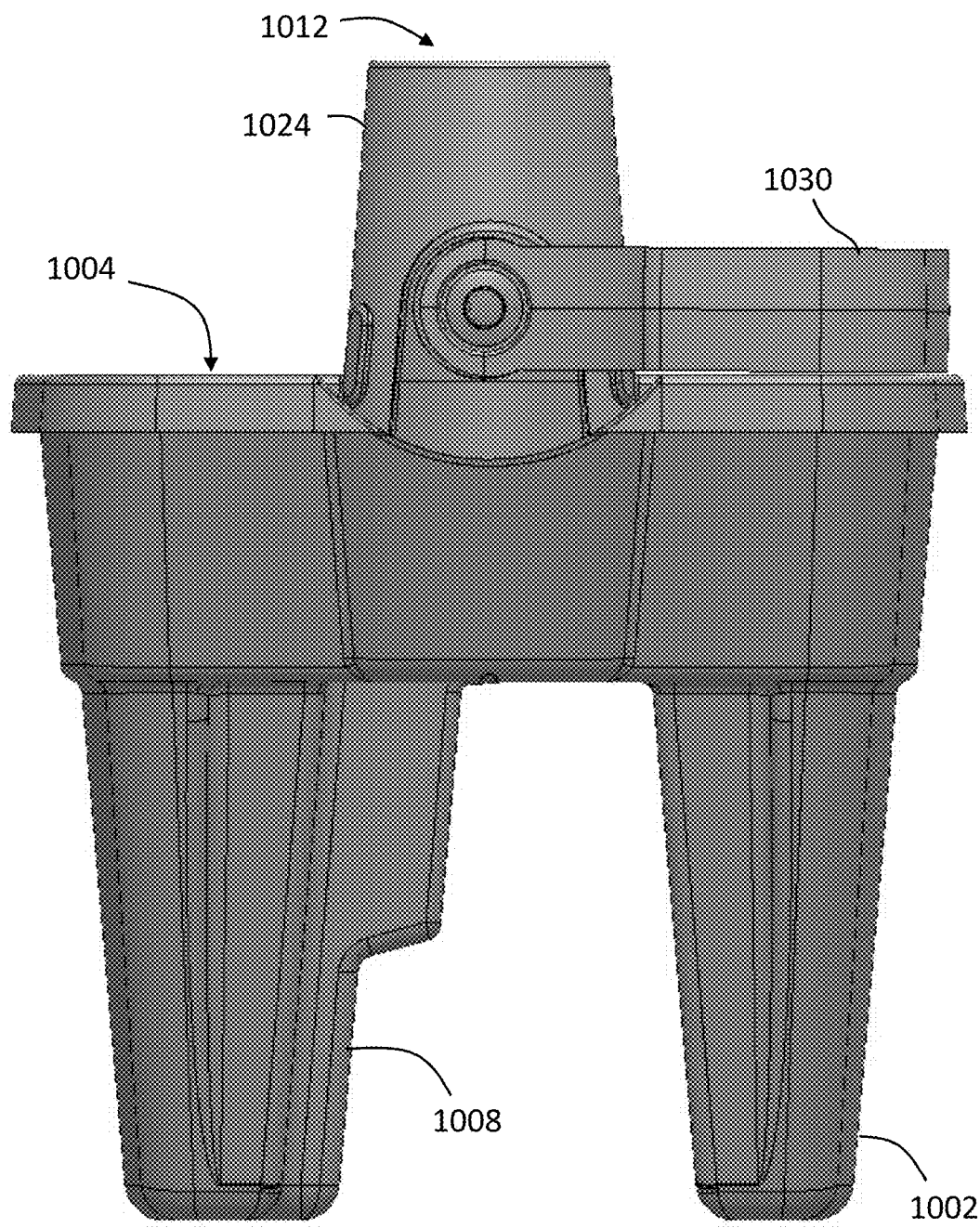
Figure 30:
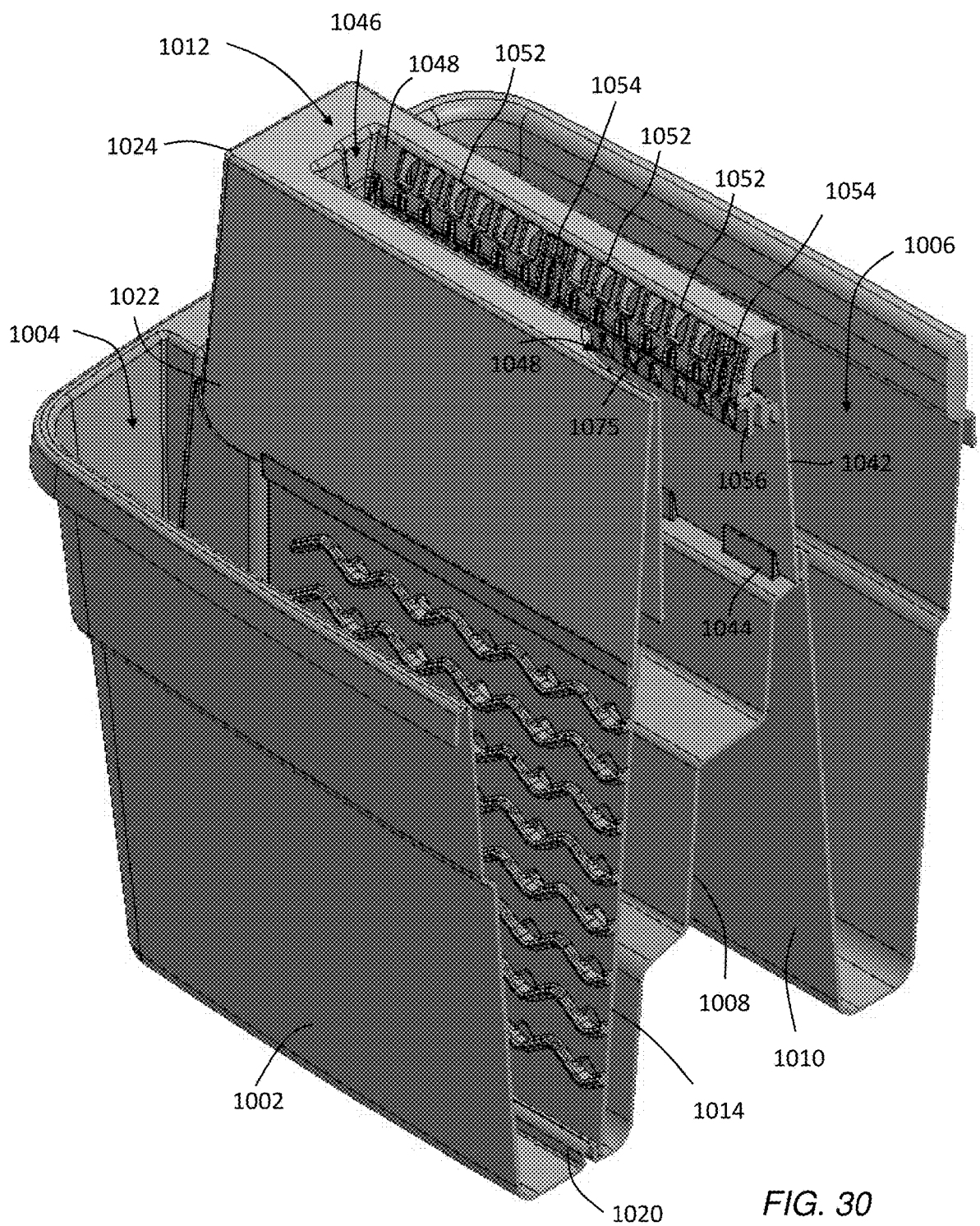

In an embodiment, the blade 1322 may include a plurality of second ribs 1325 disposed on an opposite side of an edge 1323 (FIG. 23). The second ribs 1325 are angled such that the end closer to the edge 1323 is closer to the centerline of the slot 1314 than the opposite end. The angling of the second ribs 1325 provides advantages in gradually compressing the mop pad as the mop head is withdrawn from the wringing assembly 1310. As a result, the stress on the connection between the mop head and the mop pad is reduced and the risk of the mop pad being separated, distorted, folded or bunched-over from the mop head during withdrawal is reduced. In other embodiments the ribs can be arranged tangent with the edge of the blade or slightly recessed from the edge of the blade.

In this embodiment, the wringing assembly includes a plurality of roller assemblies 1328. Each roller assembly 1328 includes a frame 1330 that includes a recess 1342 that is configured in the same manner as frame 130 and recess 142. The rollers 1332, 1334 are configured to move from a first position to a second position when the mop pad assembly is withdrawn. Thus, the wringing assembly 1310 provides the same advantages as the wringing assembly 110 in reducing the amount of force used to withdraw the mop head assembly from the slot 1314. The frames 1330 are coupled to the housing 1312, such as by fasteners (e.g. screws) or a snap fit. The frames 1330 for the roller 1334 is offset relative to the frame 1330 for the roller 1332 to accommodate the same of the mop head cover. It should be appreciated that while the illustrated embodiment shows four roller assemblies 1328, this is for exemplary purposes and the claims should not be so limited in other embodiments, the wringing assembly 1310 may have more or fewer roller assemblies. In an embodiment, the rollers 1332 can be assembled directly into the housing 1312 without having an additional frame 1330. In an embodiment, the wringing assembly 1310 may have two roller assemblies or a single long roller. Further, it should be appreciated that while the roller assemblies 1328 are shown with the rollers 1332, 1334 oriented perpendicular to the centerline of the slot 1314, this is for exemplary purposes and the claims should not be so limited. In other embodiments, the roller assemblies 1328 may be positioned on an angle similar to the roller assembly 128 so that the rollers 1332, 1334 are tangent to the mop head cover.

Referring now to FIGS. 24-36 another embodiment is shown of a two-compartment bucket assembly 1000. The bucket assembly 1000 includes a body 1002. The body 1002 includes a first compartment 1004 and a second compartment 1006. The first compartment 1004 and second compartment 1006 are separated by a pair of walls 1008, 1010 and a wringing assembly 1012. As will be discussed in more detail herein, the wringing assembly 1012 is fluidly coupled to the first compartment 1004, such that any fluid that is removed or wrung from the mop pad will flow into the first compartment 1004. The first compartment 1004 is sometimes referred to as the "dirty" side or compartment since dirt or other contaminants that are picked up by the mop pad will be washed into the first compartment 1004 when the mop pad is rubbed against a cleaning plate 1014 or wrung in the wringing assembly 1012.

In an embodiment, the cleaning plate 1014 may be configured in the same manner as described herein with respect to any of the previous embodiments. In the illustrated embodiment, the cleaning plate 1014 includes a plurality of ribs 1016 and holes 1018 that agitate the mop pad and allow fluids to flow into the first compartment 1004 when the mop pad is rubbed against the cleaning plate 1014. In an embodiment, the cleaning plate 1014 is coupled to the first compartment 1004 by being captured between a projection 1020 on the floor of the first compartment 1004 and a side wall 1022 of a housing 1024 in the wringing assembly 1012. In an embodiment, the cleaning plate 1014 includes a slot along an upper edge that receives an end of the side wall 1022. In an embodiment, the cleaning plate 1014 includes an arm 1026 (FIG. 31/FIG. 32) that includes a recess sized to receive a tab member 1028 that extends from the wall 1008. It should be appreciated that the arm 1026 and tab member 1028 cooperate to provide lateral support to the cleaning plate 1014 to reduce or prevent deflection of the plate when the mop pad is rubbed against it.

In an embodiment, the bucket assembly 1000 further includes a handle 1030 that is rotationally coupled to a pair of projections 1032, 1034 of the body 1002. In an embodiment, the body 1002 includes a pouring section 1036 (FIG. 27) that extends beyond an end of the wringing assembly 1012. The pouring section 1036 is fluidly coupled to the first compartment 1004 and the second compartment 1006. When the body 1002 is tilted, the fluids in those compartments 1004, 1006 flow through the pouring section and exits the bucket assembly 1000. In an embodiment, a wall bifurcates the pouring section 1036 to reduce or prevent the flow of liquid from one of the compartments 1004, 1006 to the other.

The wringing assembly 1012 includes a housing 1024 that is coupled to the body 1002. In an embodiment, the housing 1024 includes openings 1038 that receive tabs 1040 in the body 1002. In an embodiment, a side wall 1042 (FIG. 30) having an end that is captured between a projection 1044 in the body 1002 and the side wall 1010. The housing 1024 further includes a slot 1046 that has a width W (FIG. 27) that is sized to receive the mop plate as will be discussed in more detail herein. The slot 1046 also includes a relief area 1049 that provides a relief to avoid interference with the mop handle and mop head when the mop head is inserted into the bucket assembly 1000. In an embodiment, the slot 1046 may include a notched portion 1047 (FIG. 27) that provides space for a binding or edge portion of the mop pad 156 to pass through the slot 1046. In an embodiment, the slot 1046 is sized to allow variation in the placement of the mop pad 156 on the mop plate.

The slot 1046 further includes a first lead-in surface 1048 and an opposing second lead-in surface 1050. In an embodiment, the first lead-in surface 1048 is disposed on an angle of 14 degrees from a vertical plane. In an embodiment, the first lead-in surface 1048 includes a plurality of openings 1052 that are disposed across the length of the first lead-in surface 1048. The openings 1052 are fluidly coupled to the first compartment 1004 such that most liquid that is expressed from the mop pad as the mop head is being inserted into the slot 1046 will flow into the first compartment 1004. In an embodiment, the first lead-in surface 1048 may also include a plurality of openings or slots 1054. As will be discussed in more detail herein, the slots 1054 cooperate with a tab on a blade 1056 to maintain an alignment and the relationship of the blade to the housing edge throughout the wringing operation.

The wringing assembly 1012 further includes a blade 1056 that is slidably coupled to the housing 1024 by a cam member 1058. In an embodiment, the cam member 1058 is coupled to the housing includes a cam 1060 (FIG. 34/FIG. 35) that is arranged on an angle relative to a vertical plane. In the illustrated embodiment, the cam 1060 is disposed on the same angle as the first lead-in surface 1048. In an embodiment, the angle is between 0-75 degrees relative to a vertical plane. In another embodiment the angle is between 0 and 35 degrees. In another embodiment, the angle about 14 degrees relative to a vertical plane. The cam member 1058 further includes a wall 1062. As will be discussed in more detail herein, the wall 1062 acts a stop surface for one end of the travel of the blade 1056.

The blade 1056 includes a body 1064 having an edge or tip 1066. In an embodiment, the body 1064 may include a tip lead-in 1068 (FIG. 33) and a plurality of lower ribs 1070. In the illustrated embodiment, the tip lead-in 1068 and the lower ribs 1070 are disposed on an angle relative to a vertical plane. In an embodiment, the angle is 14 degrees from a vertical plane. The body 1064 further includes a plurality of upper ribs 1072 that are sized and disposed to engage slots 1074 in the housing 1024 when the blade 1056 is in the second or upper position. The slots 1074 may be defined by one or more portions 1075 of the housing 1024. The gaps or space between the upper ribs 1072 cooperate with the rear surface of the blade 1056 to provide a fluid communication path for fluid expressed from the mop pad by the tip 1066 when the mop head is inserted into the slot 1046.

The body 1064 still further includes a plurality of tabs 1076 that are sized and position to slide within the slots 1054. The tabs 1076 include projections 1077 that engage the housing 1024 and reduce or prevent deflection of the blade 1056 and the first lead-in surface 1048 to keep them aligned so that the edge of the mop pad does not catch and increase the insertion or removal force as the mop head is being inserted or removed. It should be appreciated that the mop pad faces the first lead-in surface 1048, as the mop head is inserted. The first lead-in surface 1048 is sized and shaped to allow for a slow compression of the mop pad as the mop head is inserted. In an embodiment, the location of highest compression is at the tip 1066 of the wringing blade. Similarly, the tip lead-in 1068 and the lower ribs 1070 are further oriented on an angle reduce resistance from the blade 1056 on the mop pad as the mop head is withdrawn. It should be appreciated that as the mop pad is withdrawn, there is lower compression of the mop pad by the blade 1056 as compared to when the mop head is being inserted.

The blade 1056 is coupled on each end to the cam members 1058. In the illustrated embodiment, each end of the blade 1056 includes a slot 1078 formed in an end wall 1080. It should be appreciated that while the illustrated embodiment shows the slot 1078 as being formed in the blade 1056 and the cam 1060 as being formed on the cam member 1058, the claims should not be so limited. In other embodiments, the slot may be formed in the cam member 1058 and the cam on the blade 1056.

Figure 31:
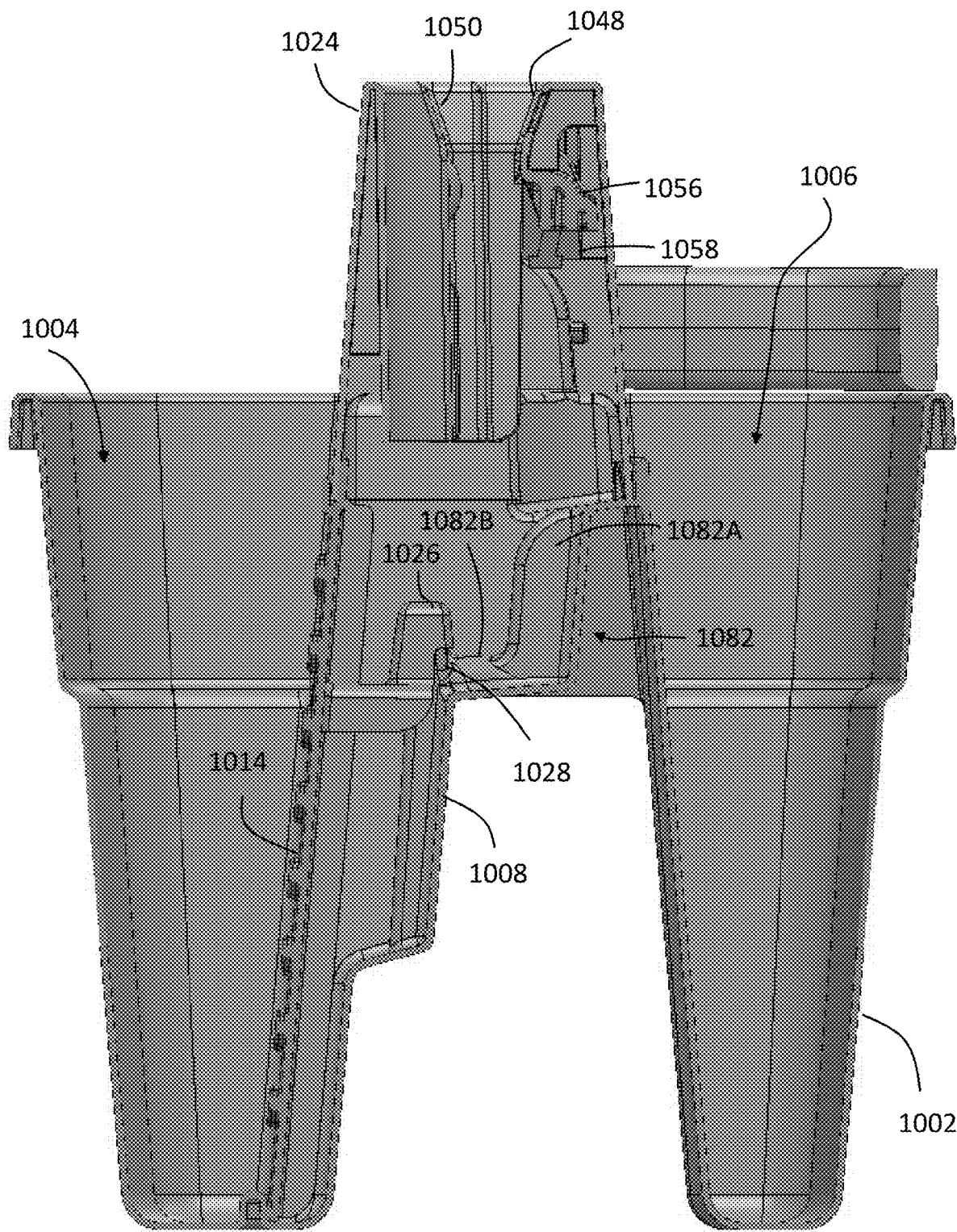
Figure 32:
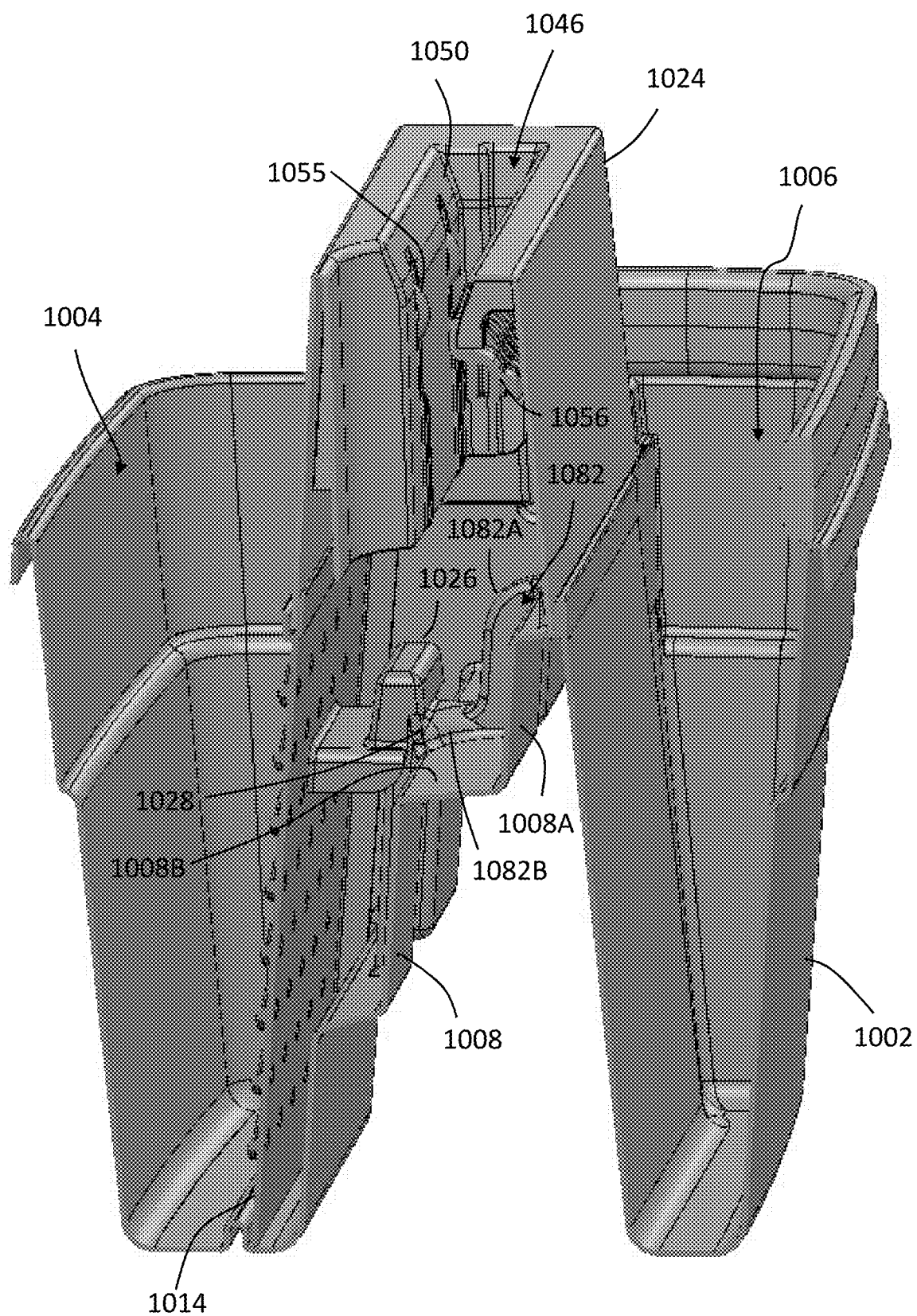
Figure 33:
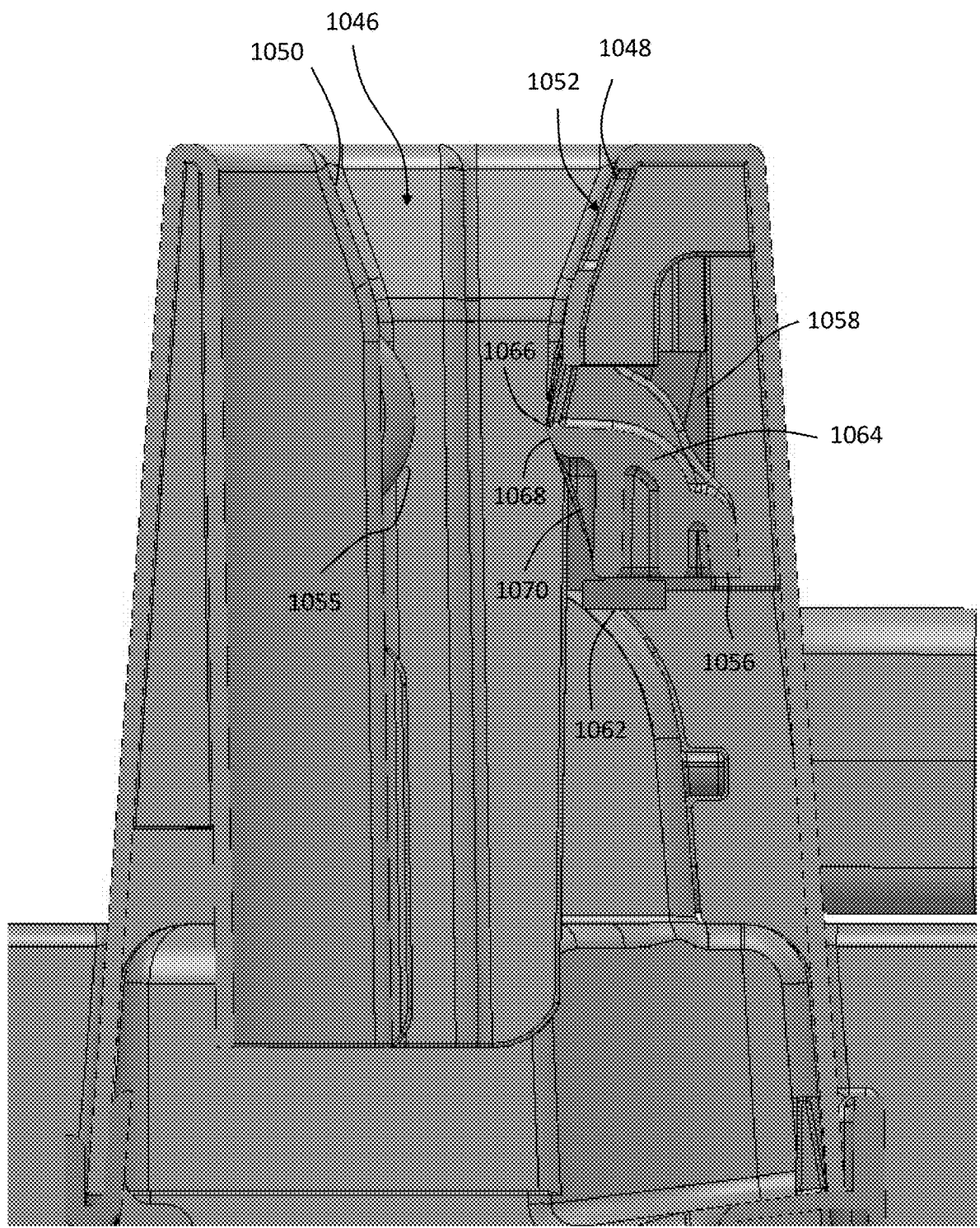
Figure 34:
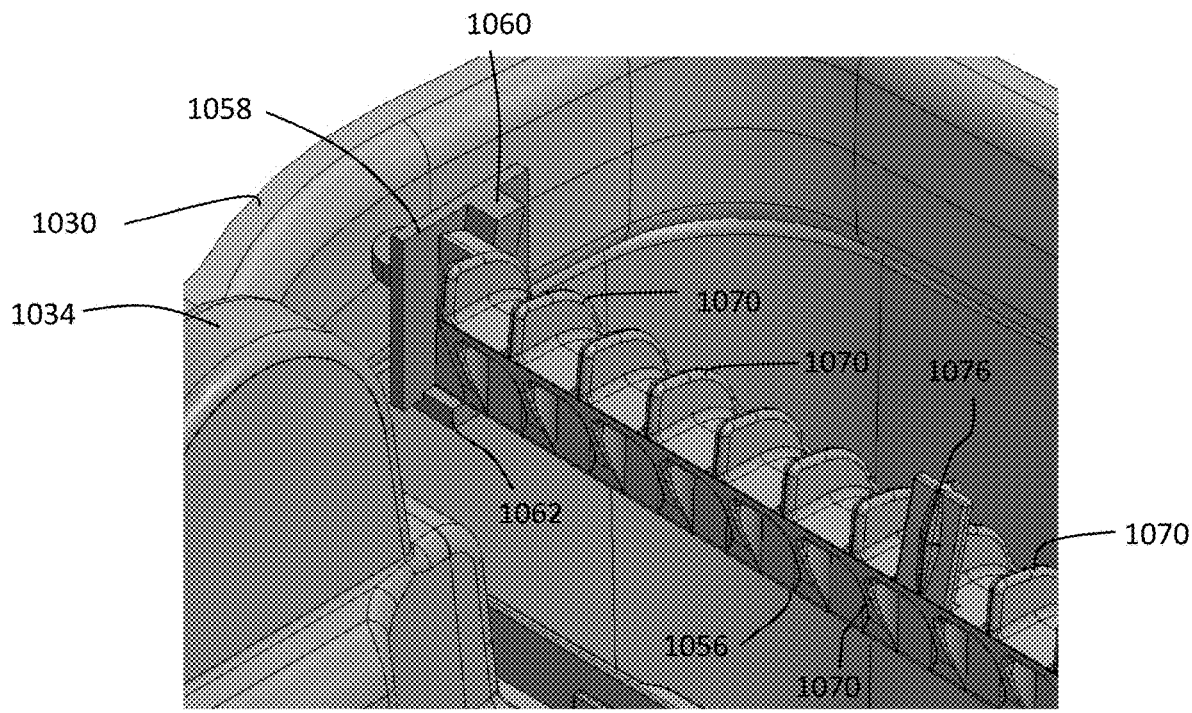
Figure 35:
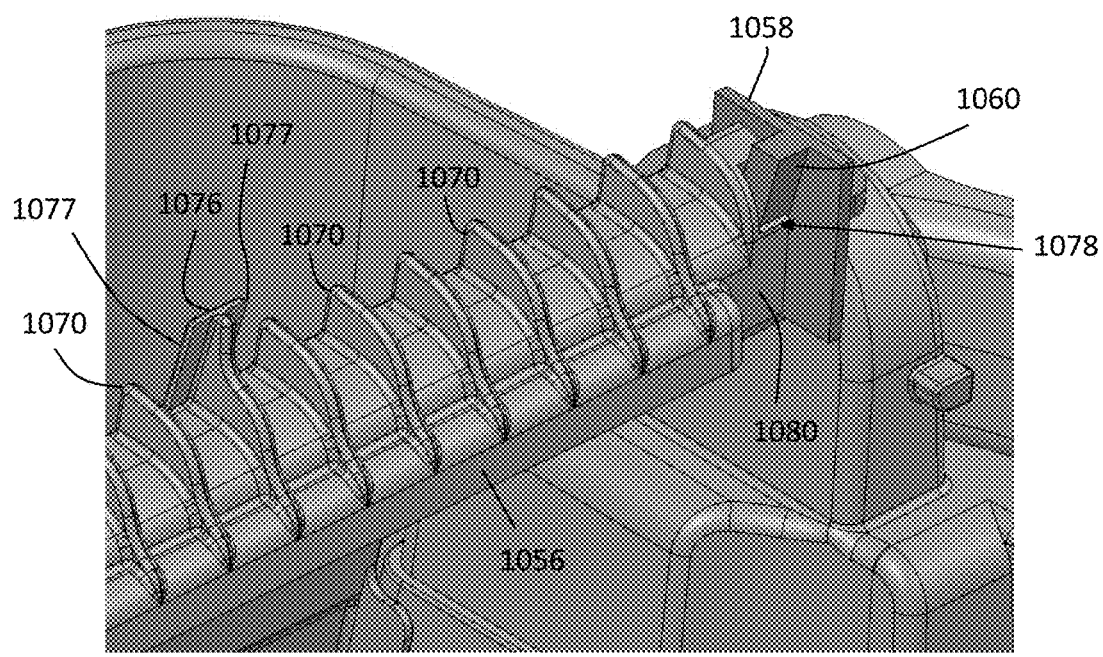
Figure 36:
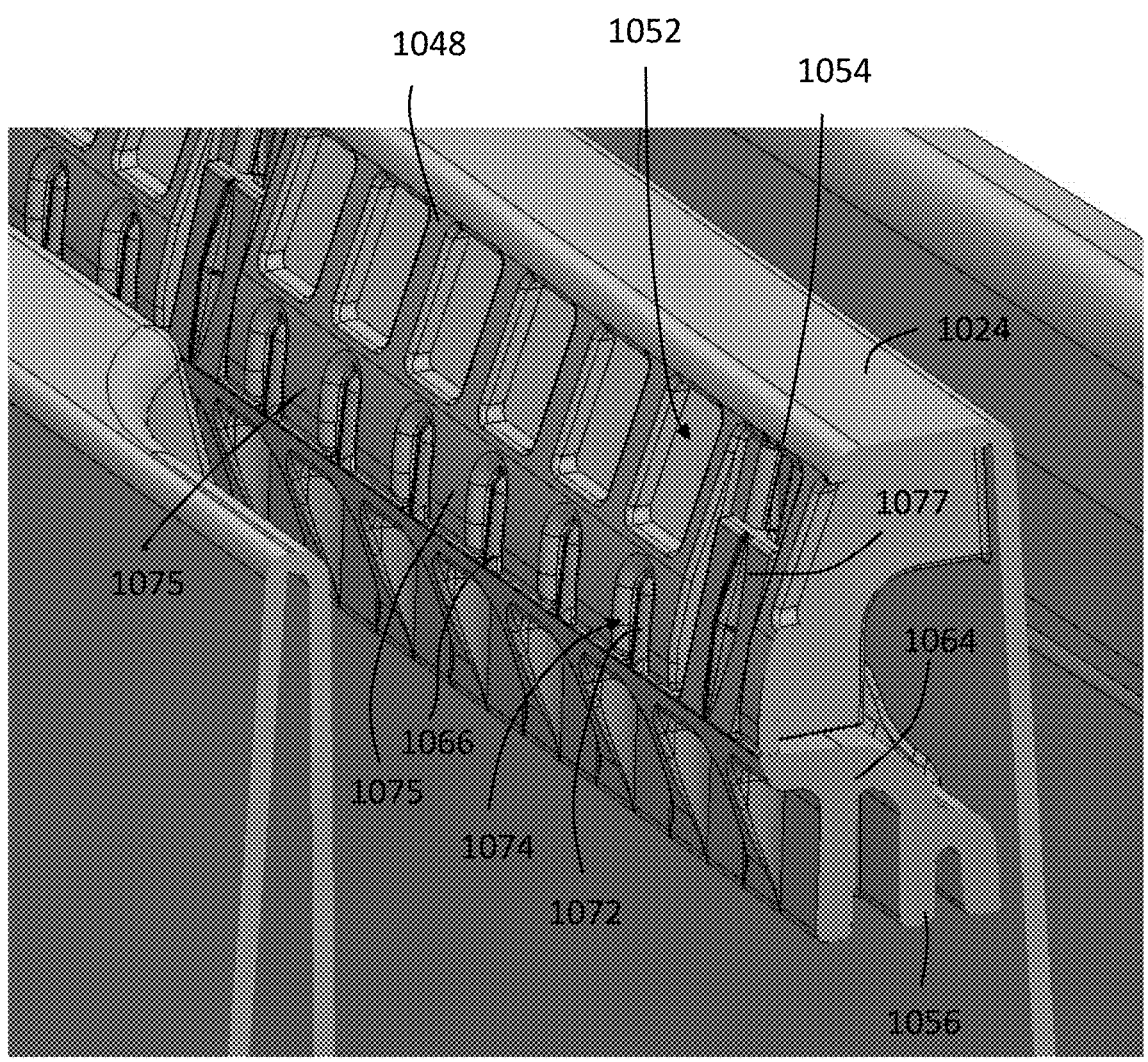
Figure 37:
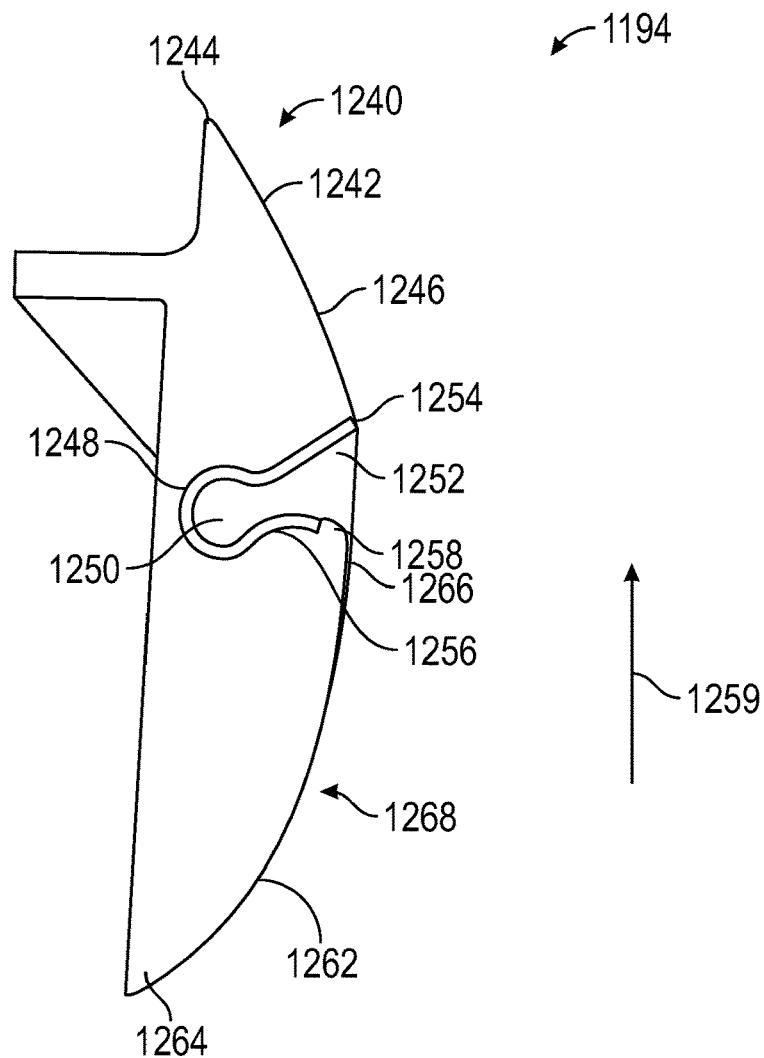
FIG. 37 is a side view of a lead-in and wiping blade in accordance with an embodiment.
Figure 38:
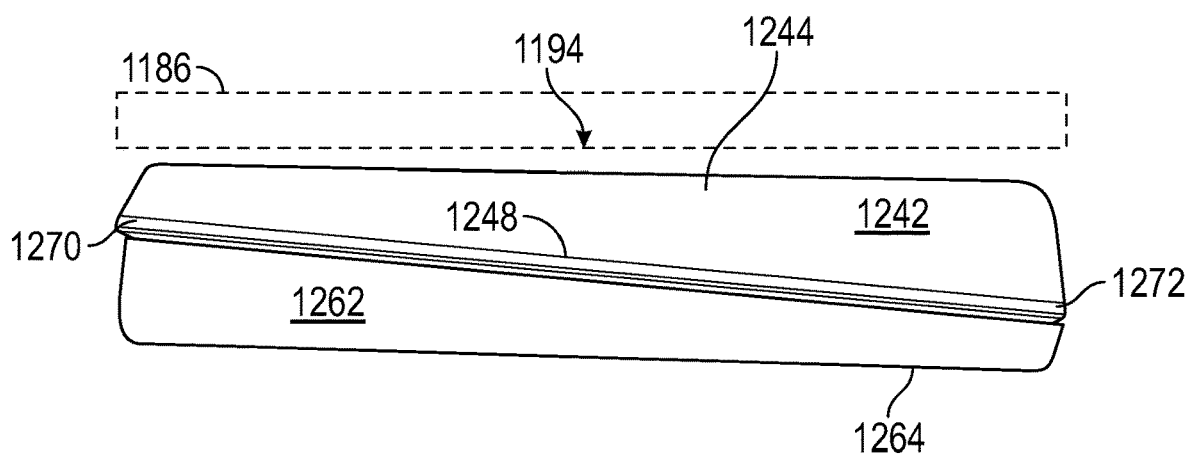
FIG. 38 is a front view of the lead-in and wiping blade of FIG. 27 with the blade disposed on an angle in accordance with an embodiment.

The blade 1056 is movable between a lower or first position (FIG. 33) and an upper or second position (FIG. 31). When in the first position, the lower surface of the blade 1056 rests on the rest pad or wall 1062 of cam member 1058. When in the second position the upper surface adjacent the tip 1066 contacts the housing 1024 adjacent the first lead-in surface 1048. Generally, the blade 1056 will move to the first position under the influence of gravity when the mop is withdrawn from the bucket assembly 1000 and/or due to contact/friction with the mop pad.

In an embodiment, the body 1002 includes at least one rib 1082 that extends from a portion 1008A (FIG. 32) of the wall 1008. In the illustrated embodiment, two ribs 1082 are provided. The rib 1082 includes a first portion 1082A and a second portion 1082B. The first portion 1082A extends from the generally vertically extending portion 1008A of wall 1008. The second portion 1082B extends from a floor portion 1008B of wall 1008. In an embodiment, the floor portion 1008B forms a bottom end of the wringing assembly 1012. As will be discussed in more detail herein, the rib 1082 defines a stop for the mop head that spaces the mop pad away from fluid paths of fluids expressed from the mop pad by the wringing assembly 1012.

In one or more embodiments, the slot 1046 further includes one or more rollers 1055 that bias the mop pad against the blade as the mop head moves through the slot 1046.

Referring now to FIG. 37-FIG. 43, another embodiment is shown of a blade member 1194. In one or more embodiments, the blade member 1194 may be used in place of the blade 122, blade 1322, or blade 1056 In this embodiment, the blade member 1194 includes a lead-in portion 1240 having a lead-in surface 1242. The lead-in surface 1242, which may be arcuate or planar, tapers from a first edge 1244 to a second edge 1246. In this embodiment, the blade member 1194 includes a blade insert 1248 having a body that defines a channel 1250. Extending from the body is a first arm 1252 having an end 1254 and a second arm 1256 with a second end 1258. The end 1254 of the first arm 1252 is offset (e.g. further away from the channel 1250) than the end 1258 of the second arm 1256. The end 1254 is directly adjacent the second edge 1246 to allow the mop pad 156 to slide over the end 1254 when the mop head 103 is inserted into the wringing portion. It has been found that the inclusion of a lead-in portion allows the mop pad 156 to be attached to the planar mop head 1218 using hook and loop type fasteners (e.g. Velcro™) without the mop pad 156 becoming separated during the wringing process. This provides an improvement over prior art mop head systems that required a physical mechanical connection (e.g. pockets that engaged tabs) that was more difficult for the user to install. Without being limited by theory, it is believed that the lead-in portion compresses the mop pad against the hook and loop fastener causing the force holding the mop pad on the mop head to be larger than the peel off force caused by the edge of the mop pad contacting the end 1254.

The blade member 1194 further includes a second lead-in portion 1268 having a second lead-in surface 1262. The second lead-in surface 1262 tapers from a first edge 1264 to a second edge 1266. The second edge is directly adjacent (near) the end 1258 such that the mop pad 156 can slide over the end 1258 when the user removes the mop head 103 from bucket assembly (e.g. when the mop head 103 is moved in the direction indicated by arrow 1259). It should be appreciated that as the mop pad 156 slides past the end 1258, it will engage the surface of first arm 1252 which will compress the fibers of the mop pad 156 causing fluid to be extracted from the mop pad 156. In an embodiment, at least a portion of the extracted fluid flows through the channel 1250 and exits through the end of blade member 1194. In an embodiment, the blade member 1194 is in fluid communication with the first or dirty water compartment of the bucket assembly. In an embodiment, the blade insert 1248 is angled across the length of the blade member 1194. In this embodiment, the blade insert has a first end 1270 that is closer to the top surface 1186 than a second end 1272. In an embodiment, the angle of the blade insert 1248 is about 4-15 degrees relative to a horizontal plane (e.g. the plane of the top surface 1186 of the wringing assembly). In an embodiment, the angle of the blade insert 1248 is 4 degrees. It has been found that placing the blade insert 1248 on an angle provides advantages in reducing the force used in moving the mop head 103 past the blade member 1194. It should be appreciated that the angle of the blade member allows a path for the fluid to move away from the mop pad rather than giving the fluid an opportunity to be absorbed back into the pad. It has been found that a minimal or small angle results in the fluid flowing down the channel. Without being limited by any theory, it is believed that the fluid extracted by the end 1254 causes the fluid to flow under capillary action along the first arm 1252 and flow, travel or drip into the space formed by the channel 1250. The fluid than flows along the channel 1250 defined by the insert 1248 and drains out the end of the blade member 1194.

It should be appreciated that in other embodiments, portions of the lead-in surfaces 1242, 1262 may have other shapes. For example, in the embodiment illustrated in FIG. 39-FIG. 41, the lead-in surfaces 1242, 1262 each have multiple surface shapes. In the illustrated embodiment, the lead-in surfaces 1242, 1162 includes a first surface section 1274, 1280, a second surface section 1276, 1282 and a third surface section 1278, 1284. In an embodiment, the lead-in surface 1242, 1262 and surface section 1274, 1280 is arcuate, while the third surface section 1278 is planar.

Figure 40:
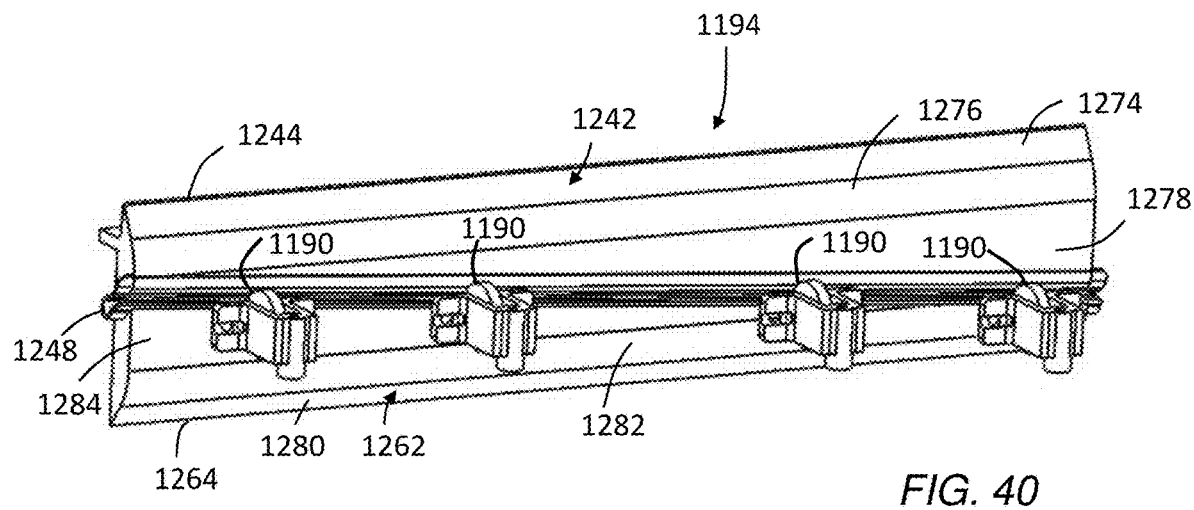
FIG. 40 and FIG. 41 are a perspective view and side view respectively of a lead-in and wiping blade having opposing pressure rollers in accordance with an embodiment.
Figure 41:
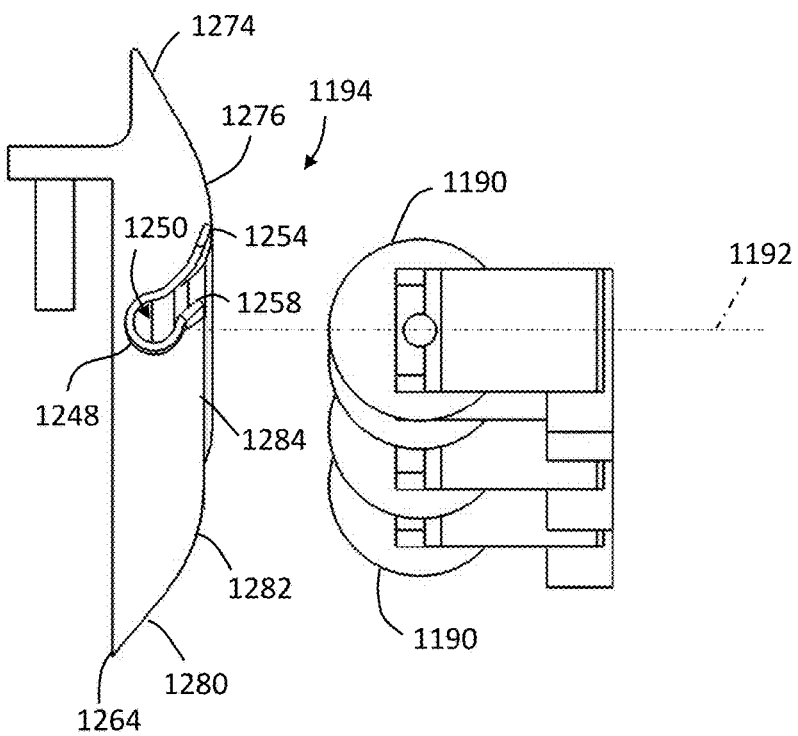

In an embodiment, a plurality of rollers 1190 are positioned adjacent the blade member 1194 as illustrated in FIG. 40 and FIG. 41. In an embodiment, the rollers 1190 are vertically offset from each other such that a horizontal plane 1192 passing through the axis of rotation for each roller 1190 remains at a same position relative to the blade insert 1248. Therefore, offset of the rollers 1190 relative to each other is configured to be substantially similar to the angle of the blade insert 1248. In an embodiment, the plane 1192 is adjacent to the end 1258. In an embodiment, the rollers 1190 may be configured to move in the same manner as the rollers 132 for example.

Figure 39:
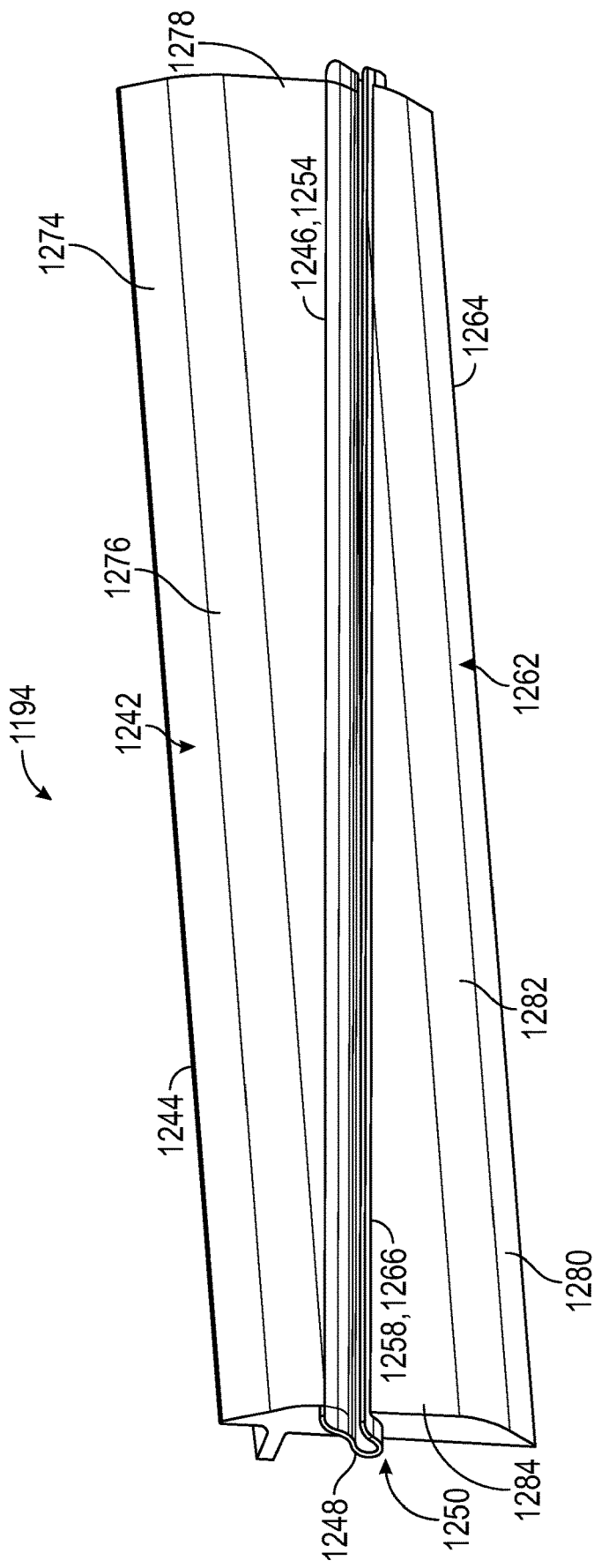
FIG. 39 is a perspective view of the lead-in and wiping blade of FIG. 10.
Figure 42:
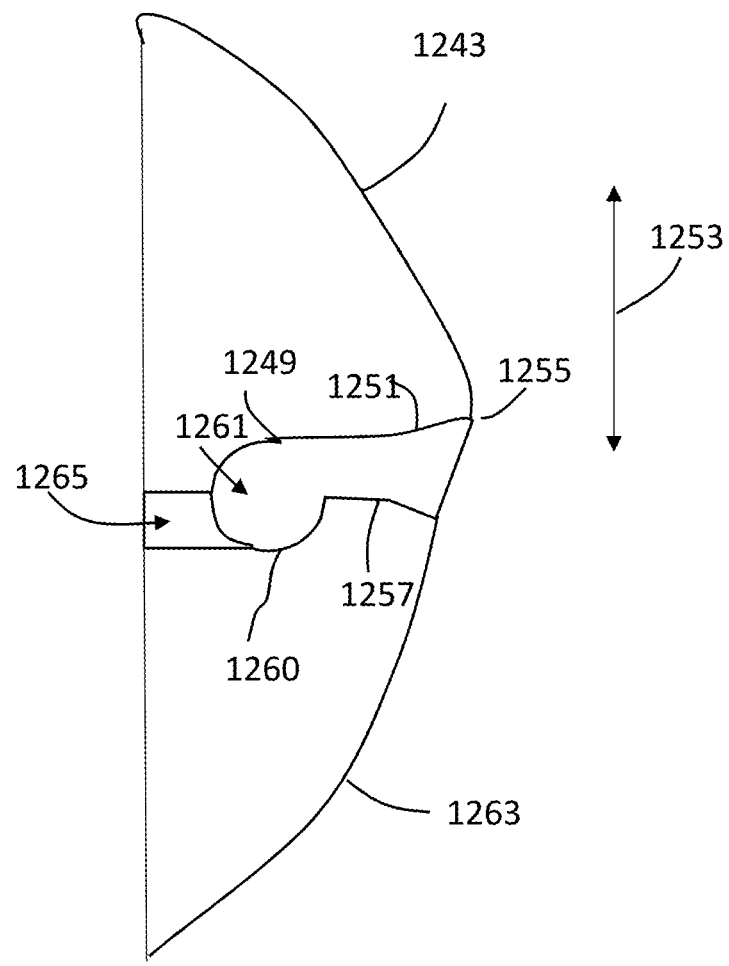
FIG. 42 and FIG. 43 are side views of a lead-in and wiping blade in accordance with another embodiment.

In another embodiment, shown in FIG. 42, the lead-in surfaces 1243, 1263 are disposed on either side of a blade insert 1249 having a first arm 1251 that is substantially horizontal (e.g. perpendicular to the direction of motion of the mop head 103 indicated by arrow 1253) or on angle (FIG. 39). In this embodiment, as the mop head 103 is withdrawn, the mop pad 156 is compressed by the end 1255 of the first arm 1251. The first arm 1251 cooperates with a second arm 1257 and a body portion 1260 to define a channel 1261 similar to the embodiment of FIG. 37. In this embodiment, holes or openings 1265 extend through the back of the channel 1261 to allow extracted fluid to drain out both the back of the blade member 1194 and through the end of the blade member 1194.

Figure 43:
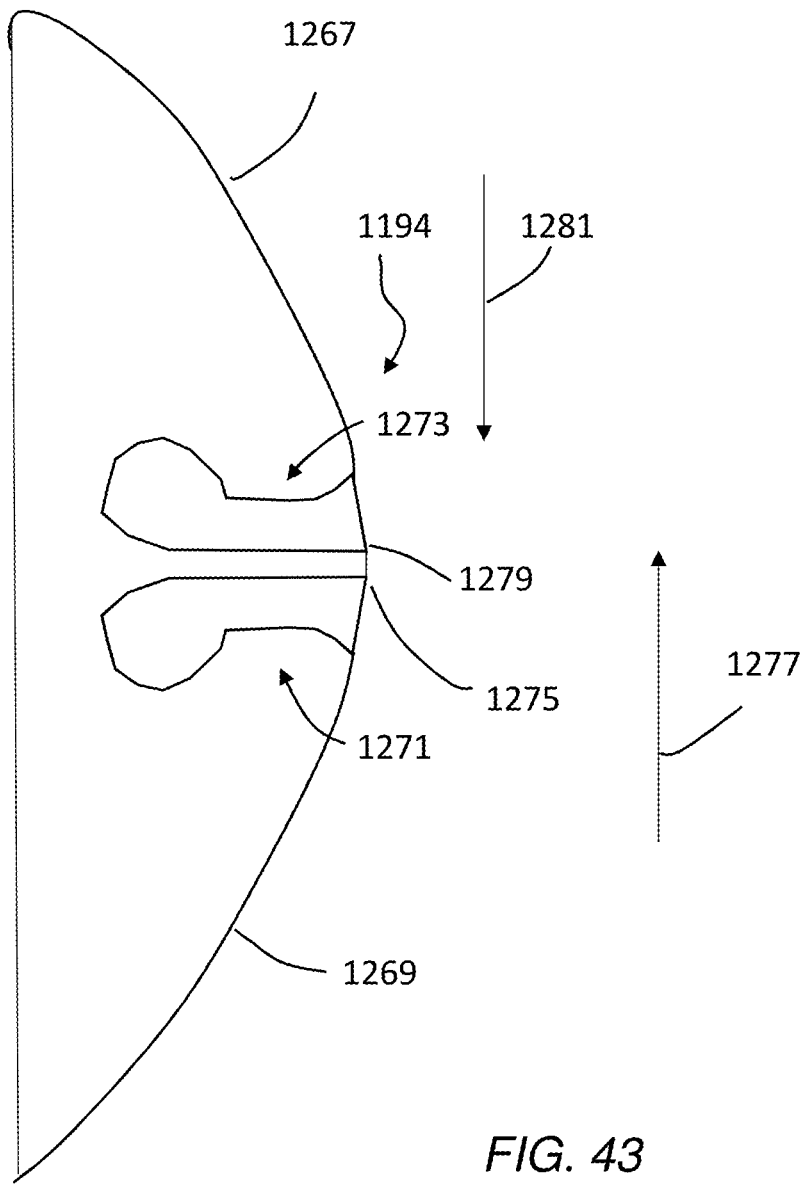

In still another embodiment shown in FIG. 43, the blade member 1194 is configured to extract fluid on both the insertion direction and when the mop head 103 is being removed or withdrawn. In this embodiment, the lead-in surfaces 1267, 1269 are disposed on either side of a pair of blade inserts 1271, 1273. In this embodiment, the blade insert 1271 is substantially similar to the blade insert 1248

(FIG. 37) having an arm portion with an end 1275 that engages the mop pad 156 as the mop head 103 is being withdrawn (e.g. the direction indicated by arrow 1277). The second blade insert 1273 is similar to the blade insert 1271 except that the orientation is reversed to that arm portion having an end 1279 is arranged to engage the mop pad 156 as the mop head 103 is being inserted (e.g. in the direction indicated by arrow 1281). It should be appreciated that the embodiment of FIG. 43 then allows fluid to be extracted on both the insertion and withdrawal motions of the mop head 103.

It should further be appreciated that the blade inserts shown in FIG. 42 and FIG. 43 may be angled such as is shown in the embodiment of FIG. 39 or horizontal. Further, the embodiments of FIG. 42 and FIG. 43 may include opposing rollers, similar to that shown in FIG. 41, that assist in maintaining the mop pad 156 engaged with the inserts by contacting and supporting the reverse side of the head member 103.

Without being limited by theory, it is believed that the embodiments having a lead-in surface provide advantages in that the lead-in portion compresses the mop pad against the hook and loop fastener causing the force holding the mop pad on the mop head to be larger than the peel off force caused by the edge of the mop pad contacting the end 1254.

Figure 44:
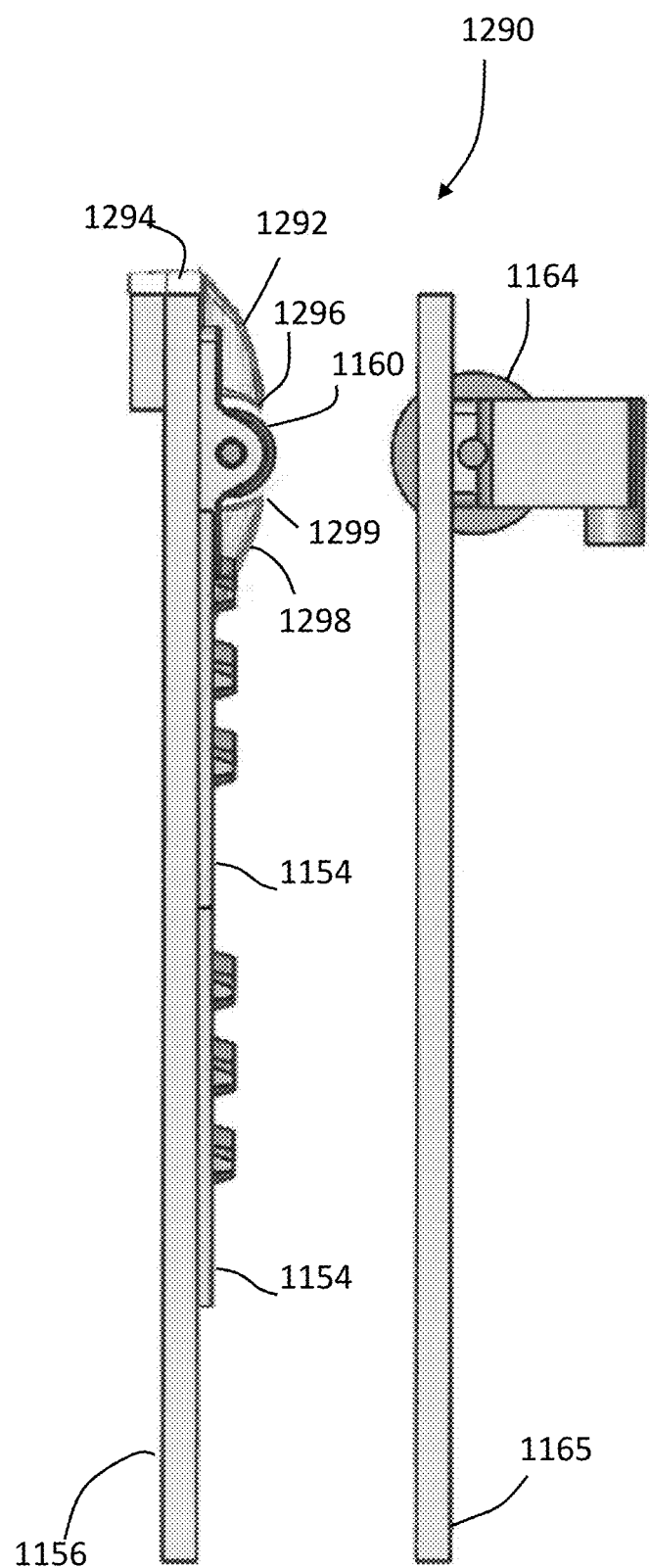
FIG. 44 is a side view of a roller wringing assembly in accordance with an embodiment.

Referring now to FIG. 44, an embodiment of a wringing portion 1290 is shown. This embodiment is similar to the embodiment of FIG. 1, FIG. 16, and FIG. 24 except that instead of having a blade, the extraction of fluid from the mop pad 156 is performed by a roller 1160 mounted to a body 1156. It should be appreciated that in one or more embodiments, the body 1156 may be integral with the wringing assembly housing. In an embodiment, one or more cleaning plates 1154 are attached to the body 1156 adjacent the roller 1160. In this embodiment, a first lead-in member 1292 is coupled to the body 1156 between the roller 1160 and a top edge 1294 of the body 1156. In this embodiment, the trailing edge 1296 is offset in a direction closer to the body 1156 than the contact point of the roller 1160.

In this embodiment, a second lead-in member 1298 is coupled to the body 1156 on a side of the roller 1160 opposite the first lead-in roller 1164. Similar to the first lead-in member 1292, the second lead-in member 1298 has an edge 1299 offset from the contact point of the roller 1160. It should be appreciated that since the roller 1160 rotates, the edges 1296, 1299 may be offset and still allow the mop pad 156 to be attached using a hook and loop type fastener. In an embodiment, the roller 1164 is coupled to a member 1165. In one or more embodiments, the member 1165 is coupled to or integral with the wringing assembly housing.

In an embodiment, the roller 1160 includes a helix groove or channel that assists in carrying fluid away from the mop pad. In another embodiment, the roller 1160 includes a double helix with the helix's spaced 1180 degrees apart. In an embodiment, the helix has a large pitch of about one-inch (2.54 cm).

Figure 45:
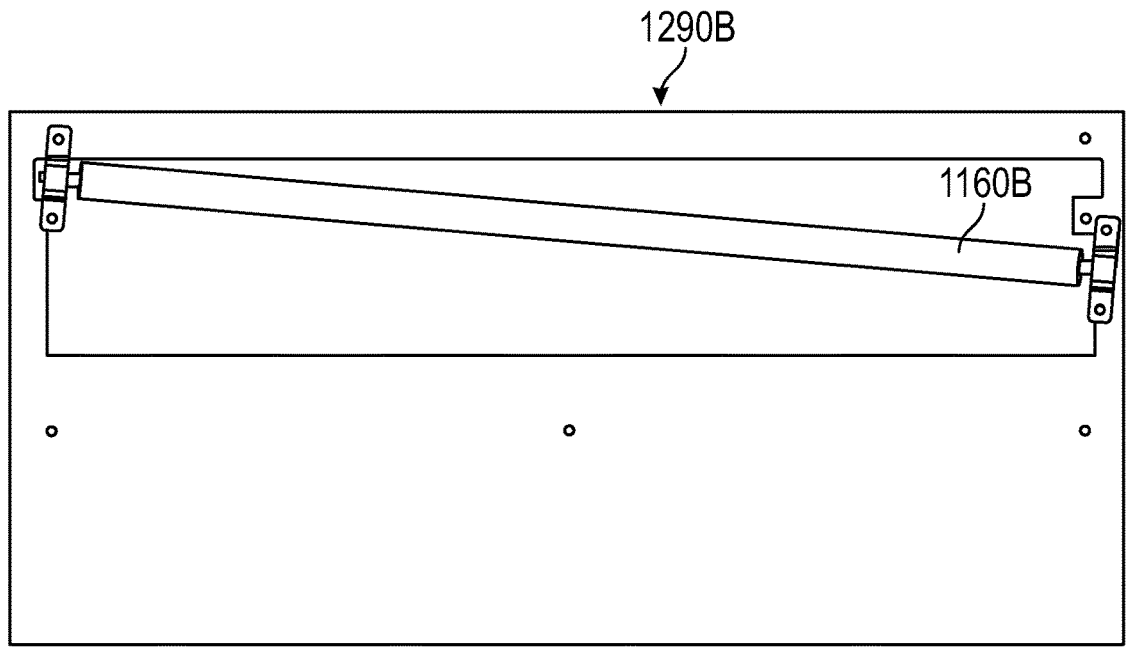
FIG. 45 is a front view of a roller wringing assembly having the roller on an angle in accordance with an embodiment.

Referring now to FIG. 45, another embodiment of a wringing portion 1290B is shown. This embodiment is similar to that of FIG. 44, except that the roller 1160B is arranged on an angle relative to a horizontal plane, in a similar manner to the blade insert 1248 (FIG. 38) is arranged on an angle. The wringing portion 1290B may also include cleaning plates (not shown) as described herein with reference to FIG. 44. In another embodiment, two or more angled rollers may be used, either in parallel or with each roller arranged symmetrically on opposite sides of the centerline of the assembly in a similar manner to the blade of 1194.

Figure 46:
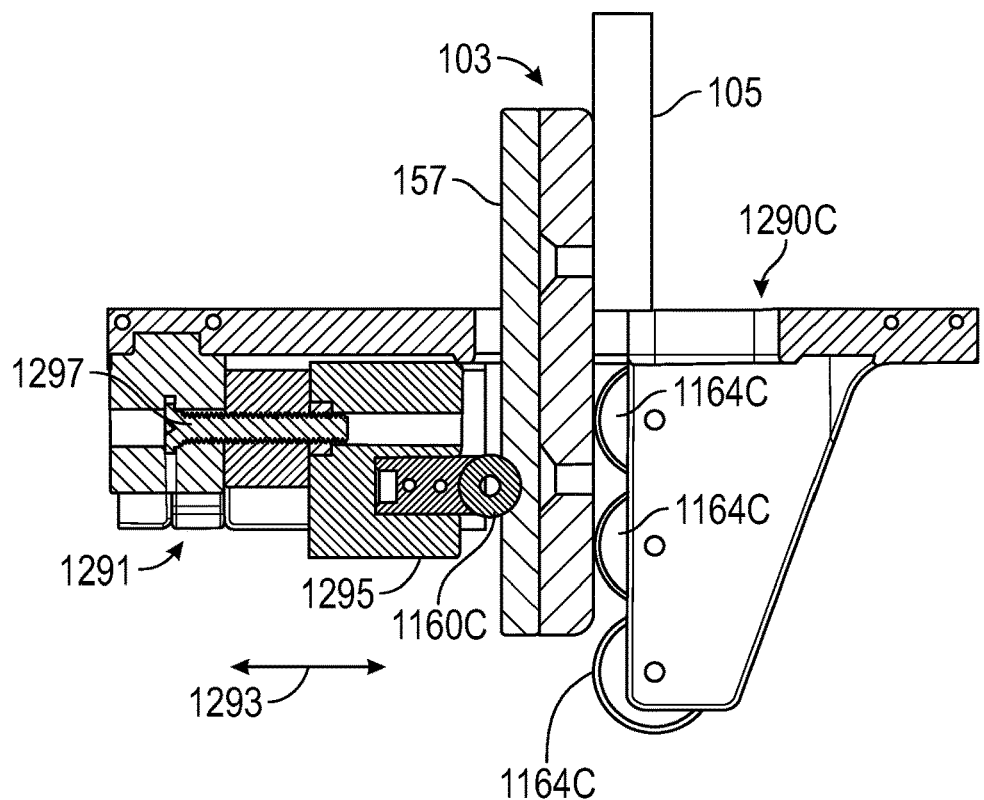
FIG. 46 is a side view of a roller wringing assembly in accordance with an embodiment.

Referring now to FIG. 46, another embodiment of a wringing portion 1290C. This embodiment a plurality of support or pressure rollers 1164C arranged in series vertically adjacent each other. In this embodiment, the compression of the fibers in the mop pad 156 is performed by an opposing roller 1160C. In an embodiment, the roller 1160C is mounted to an assembly 1291 that changes the position of the roller 1160C by moving the roller 1160C in the direction indicated by arrow 1293. In an embodiment, the roller 1160C is mounted to a frame 1295 that slides relative to the rollers 1164C, such as in response to the rotation of a set screw 1297 for example.

The detailed description explains embodiments of the disclosure, together with advantages and features, by way of example with reference to the drawings.

The term "about" is intended to include the degree of error associated with measurement of the particular quantity based upon the equipment available at the time of filing the application.

It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. A bucket for a floor cleaning system having a flat headed mop having a pole with a mop head disposed on one end, the mop head having a mop pad, the mop head movable between an operating position and a folded position, a plane of the mop pad being substantially parallel to the pole in the folded position, the bucket comprising:

at least one compartment; and a wringing assembly in fluid communication with the at least one compartment, the wringing assembly comprising at least one roller movable to a first position when the mop head is being inserted to a second position when the mop head is being withdrawn, a housing having a slot sized to receive the mop head, the at least one roller being movably coupled to the housing and is at least partially disposed within the slot, and a blade positioned to compress the mop pad as the mop head is inserted into the slot to extract fluid from the mop pad, the at least one roller being configured to move from the second position to the first position under the influence of gravity in response to the mop head being removed from the bucket.

2. The bucket of claim 1, wherein the blade is integral to the housing.

3. The bucket of claim 2, wherein the blade and the at least one roller define a gap therebetween, the amount of fluid extracted by the mop pad being based at least in part on the gap.

4. The bucket of claim 3, wherein the gap is configured to provide an insertion force of the mop head and mop pad into the wringing assembly of less than 40 pounds.

5. The bucket of claim 1, wherein the blade is positioned on an opposite side of the slot from the at least one roller.

6. The bucket of claim 1, wherein the slot further includes a first lead-in portion adjacent the at least one roller and a second lead-in portion adjacent the blade, the second lead-in portion being configured to at least partially compress the mop pad as the mop head is moved through the slot.

7. The bucket of claim 6, wherein the housing further includes a plurality of openings adjacent a surface of the blade to define a fluid flow path.

8. The bucket of claim 7, wherein the plurality of openings are at least partially formed in the second lead-in portion.

9. The bucket of claim 1, wherein the wringing assembly further includes a roller holder, the at least one roller being movably coupled to the roller holder.

10. The bucket of claim 9, wherein the wringing assembly further includes a housing, the roller holder being integral with the housing.

11. The bucket of claim 1, wherein the at least one roller extends a first distance into the slot when in the first position and a second distance into the slot when in the second position, the first distance being larger than the second distance.

12. The bucket of claim 1, wherein the at least one roller extends a first distance relative to the blade when in the first position and a second distance relative to the blade when in the second position, the first distance being smaller than the second distance.

13. The bucket of claim 1, wherein:
the at least one roller cooperates with the mop head to compress the mop pad a first amount when in the first position to extract fluid from the mop pad;
the at least one roller cooperates with the mop head to compress the mop pad a second amount when in the second position; and
the first amount is larger than the second amount.

14. A bucket for a floor cleaning system having a flat headed mop having a pole with a mop head disposed on one end, the mop head having a mop pad, the mop head movable between an operating position and a folded position, a plane of the mop pad being substantially parallel to the pole in the folded position, the bucket comprising:
at least one compartment; and
a wringing assembly in fluid communication with the at least one compartment, the wringing assembly comprising at least one roller movable to a first position when the mop head is being inserted to a second position when the mop head is being withdrawn, a housing having a slot sized to receive the mop head, the at least one roller being movably coupled to the housing and is at least partially disposed within the slot, and a blade positioned to compress the mop pad as the mop head is inserted into the slot to extract fluid from the mop pad;
wherein the wringing assembly further includes a roller holder, the at least one roller being movably coupled to the roller holder; and
wherein the roller holder includes a pair of slots and the at least one roller includes a pair of axles disposed within the pair of slots, each slot having a first portion and a second portion, the first portion arranged to position the at least one roller in the first position, the second portion arranged to position the at least one roller in the second position.

* * * * *